(12) United States Patent
Magine et al.

(10) Patent No.: US 6,856,578 B2
(45) Date of Patent: Feb. 15, 2005

(54) UNDERWATER ALERT SYSTEM

(75) Inventors: Daniel J. Magine, 2217 W. Palatine Rd., Inverness, IL (US) 60067; Kevin D. Kaschke, Hoffman Estates, IL (US)

(73) Assignee: Daniel J. Magine, Inverness, IL (US)

( * ) Notice: Subject to any disclaimer, the term of this patent is extended or adjusted under 35 U.S.C. 154(b) by 107 days.

(21) Appl. No.: 09/862,914

(22) Filed: May 22, 2001

(65) Prior Publication Data

US 2002/0176323 A1 Nov. 28, 2002

(51) Int. Cl.$^7$ .......................... H04B 11/00; H04R 11/00
(52) U.S. Cl. ...................................................... 367/134
(58) Field of Search ................................ 367/134, 132, 367/131

(56) References Cited

U.S. PATENT DOCUMENTS

| | | | |
|---|---|---|---|
| 3,469,231 A | | 9/1969 | Geiling et al. |
| 3,736,551 A | * | 5/1973 | Hirsch ........................ 367/134 |
| 4,635,242 A | | 1/1987 | Hart |
| 4,999,606 A | * | 3/1991 | Comerford et al. ......... 367/134 |
| 5,010,529 A | | 4/1991 | Maynus |
| 5,136,555 A | * | 8/1992 | Gardos ....................... 367/132 |
| 5,162,828 A | | 11/1992 | Furness et al. |
| 5,191,317 A | | 3/1993 | Toth et al. |
| 5,301,668 A | | 4/1994 | Hales |
| 5,523,982 A | | 6/1996 | Dale |
| 5,685,722 A | | 11/1997 | Taba |
| 5,899,204 A | | 5/1999 | Cochran |
| 6,054,929 A | | 4/2000 | Garofalo et al. |
| 6,125,080 A | | 9/2000 | Sonnenschein et al. |

FOREIGN PATENT DOCUMENTS

| | | |
|---|---|---|
| WO | WO 98/17526 | 4/1998 |
| WO | WO 98/45969 | 10/1998 |
| WO | WO 00/55676 | 9/2000 |

OTHER PUBLICATIONS

Cochran, Nemesis Ila, 1997,www.nitrox.com.au/nem.htm.*
Cochran, Nemesis Owners Manual; 1998, pp. 1–61.*
Rodale's "Scuba Diving" Magazine, John Fransis, Sep. 2000, p. 30, "Oceanic Lit Vision" Mask.
"Dive Training" Magazine, John Bell, Mar. 2001, p. 53, Diver Distress Alert by ACR Electroics Advertisement.
"Sport Diver" Magazine, None, Feb. 2001, 1. p. 140, "Dive Alert" Advertisement. 2. p. 142, "Sub Duck" Advertisement.
Web site: "www.aquaholic.com/divealert", None, Unknown, 9 page description of "Dive Alert" product.
Web site: "www.smartcart.com/diving/cgi/search.cgi" and enter the terms "signaling devices", 2001 Diver's Supply, 2001, 6 pages—description of 9 signaling devices.

(List continued on next page.)

*Primary Examiner*—Daniel Pihulic
(74) *Attorney, Agent, or Firm*—Kevin D. Kaschke

(57) ABSTRACT

In a first preferred embodiment, an underwater alert system (10) includes a transmitter assembly (12), carried by a first diver (14), that transmits a predetermined wireless signal (36) to a receiver assembly (16), carried by a mask (18) worn by a second diver (20), that generates an alert to gain the attention of the second diver (20). In a second preferred embodiment, the underwater alert system (10) includes a first transceiver assembly (232), carried by a mask worn by a first diver (14), communicating a predetermined wireless signal (36) with a second transceiver assembly (254), carried by a mask (18) worn by a second diver (20), to permit the first diver and second diver to gain each other's attention. In a third preferred embodiment, the underwater alert system (10) includes a transmitter assembly (12), carried by a first diver (14), that transmits a wireless signal (36), related to data about the first diver's (14) body, equipment, and/or environment, to a receiver assembly (16), carried by a second-diver (20), that communicates to the second person information related to the data.

230 Claims, 14 Drawing Sheets

Underwater Alert System

OTHER PUBLICATIONS

Web site: "www.oceantechnologysystems.com/recall.html", Michael R. Pelissier for Ocean Technology Systems, Unknown, 2 pages—description of diver recall system.

Web site: www.oceantechnologysystems.com/basic_concepts.html, Jerry Peck for Ocean Technology Systems, 2000, 4 pages—description of the basics of sound in water.

Web site: "www.divelink.net/thermo.htm", Unknown, Unknown, 2 pages—description of the transmission of sound in water.

Web site: "www.oceantechnologysystems.com/through_water.html", Michael R. Pelissier for Ocean Technology Systems, 2000, 7 pages—description of through-water communications.

Web site: "www.oceanreefgroup.com/cata_.htm"(1pg), "www.oceanreefgroup.com/system_.htm"(12pgs), Unknown, Unknown, 13 pages—description of underwater voice communication system.

Web site: "www.divelink.net", Unknown, Unknown, 20 pages—description of "Dive Link" underwater voice communication system.

Web site: "www.oceantechnologysytems.com", Unknown, Unknown, 12 pages—description of "Buddy Phone" underwater voice communication system.

Web site: "www.decadiving.com", Unknown, Unknown, 13 pages—various product descriptions.

ETG, Elettronica Drin Sub Drin Website Materials 5 pages Publication Date Unknown.

Scuba Diving Magazine having web site pages at: http://scubadiving.com/gear/computers.shtml (4 pages), http://scubadiving.com/gear/computers_ai2/ (1 page), and http://scubadiving.com/gear/computers_ai2/review.html (1 page), Jon Hardy, John Brumm, and Val Hodges–Palmer, Sep./Oct. 1994 Issue, Air–Integrated Dive Computers, Computers in Review, Cochran Nemesis model description, line 10. Retrieved Mar. 18, 2003.

Nitrox & Technical Diving Expeditions (N.T.D.E.) having web site pages at: http://www.nitrox.com.au (1 page), and http://www.nitrox.com.au/dmastr.htm (2 pages)., Published by Steve Sturgeon., Publication date unknown, © 1997, 3 pages, DiveMaster by Cochran Undersea Technology. Retrieved Mar. 18, 2003.

* cited by examiner

10

Underwater Alert System

Transmitter Assembly
12

FIG. 3
Receiver Assembly
16
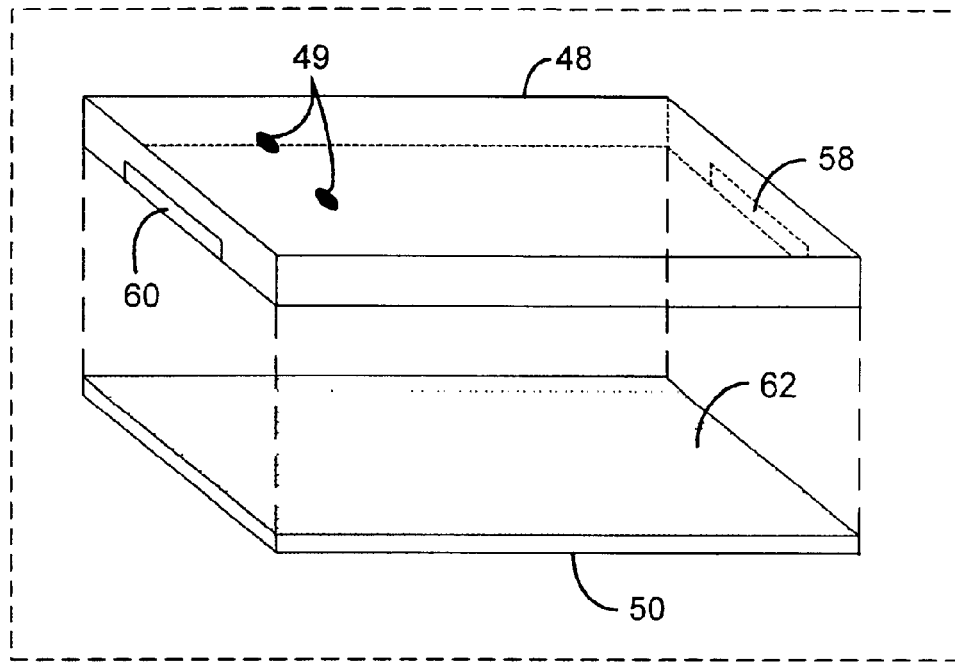
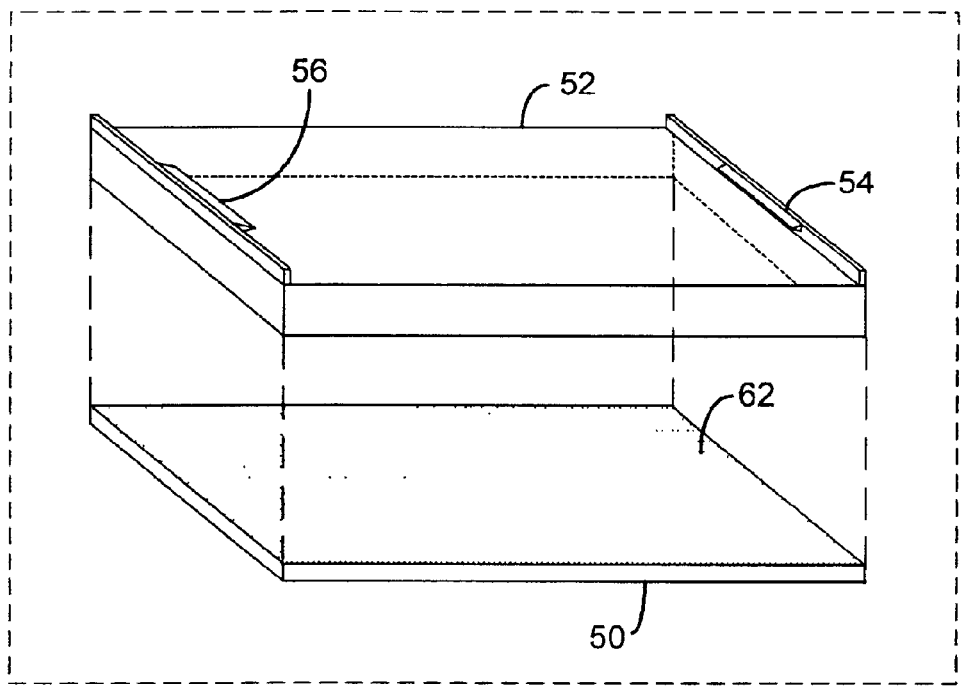

Transmitter Assembly Flowchart
170

Receiver Assembly
Flowchart
192

18

18

18

Transceiver Assembly 232

18

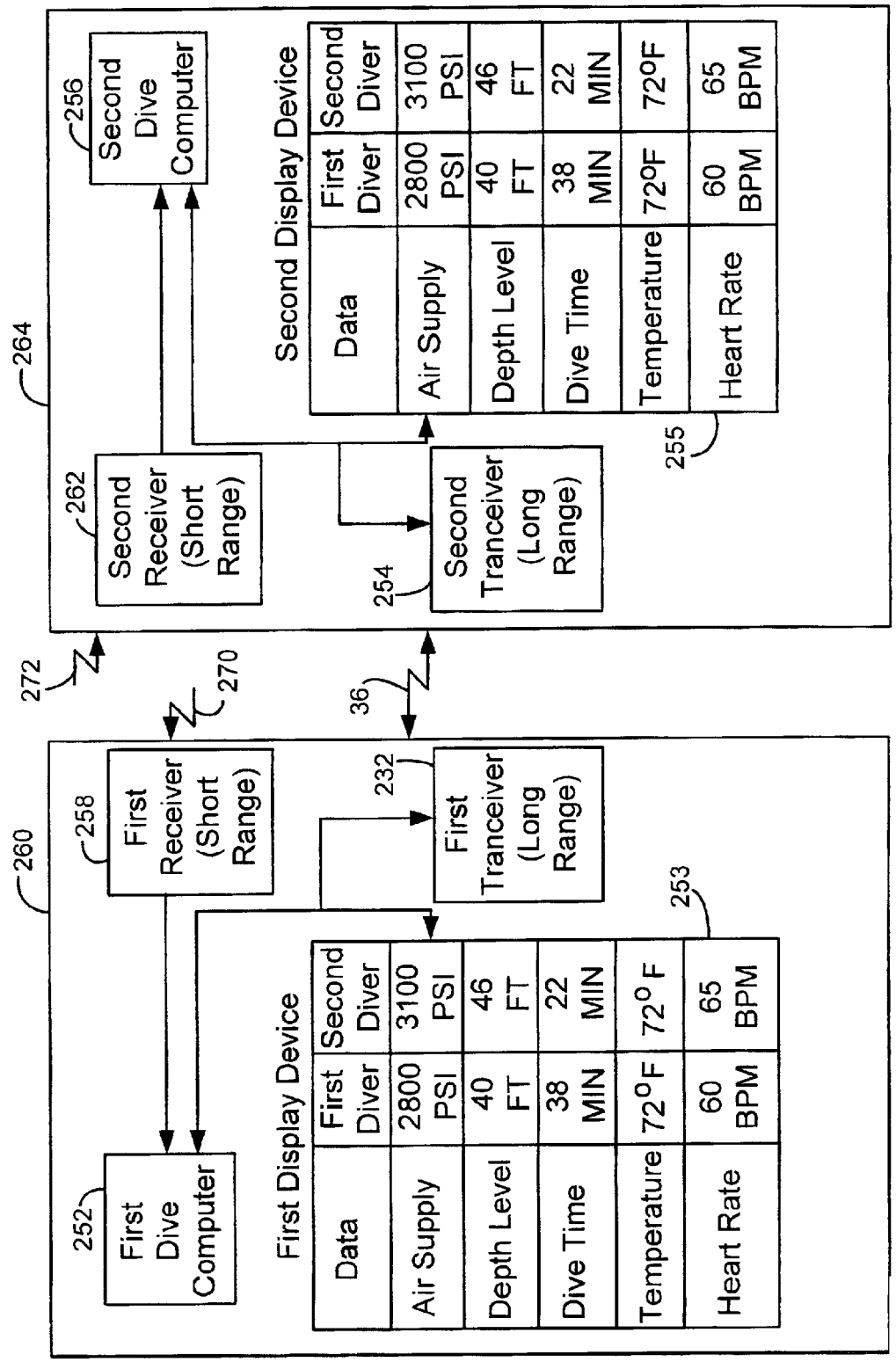

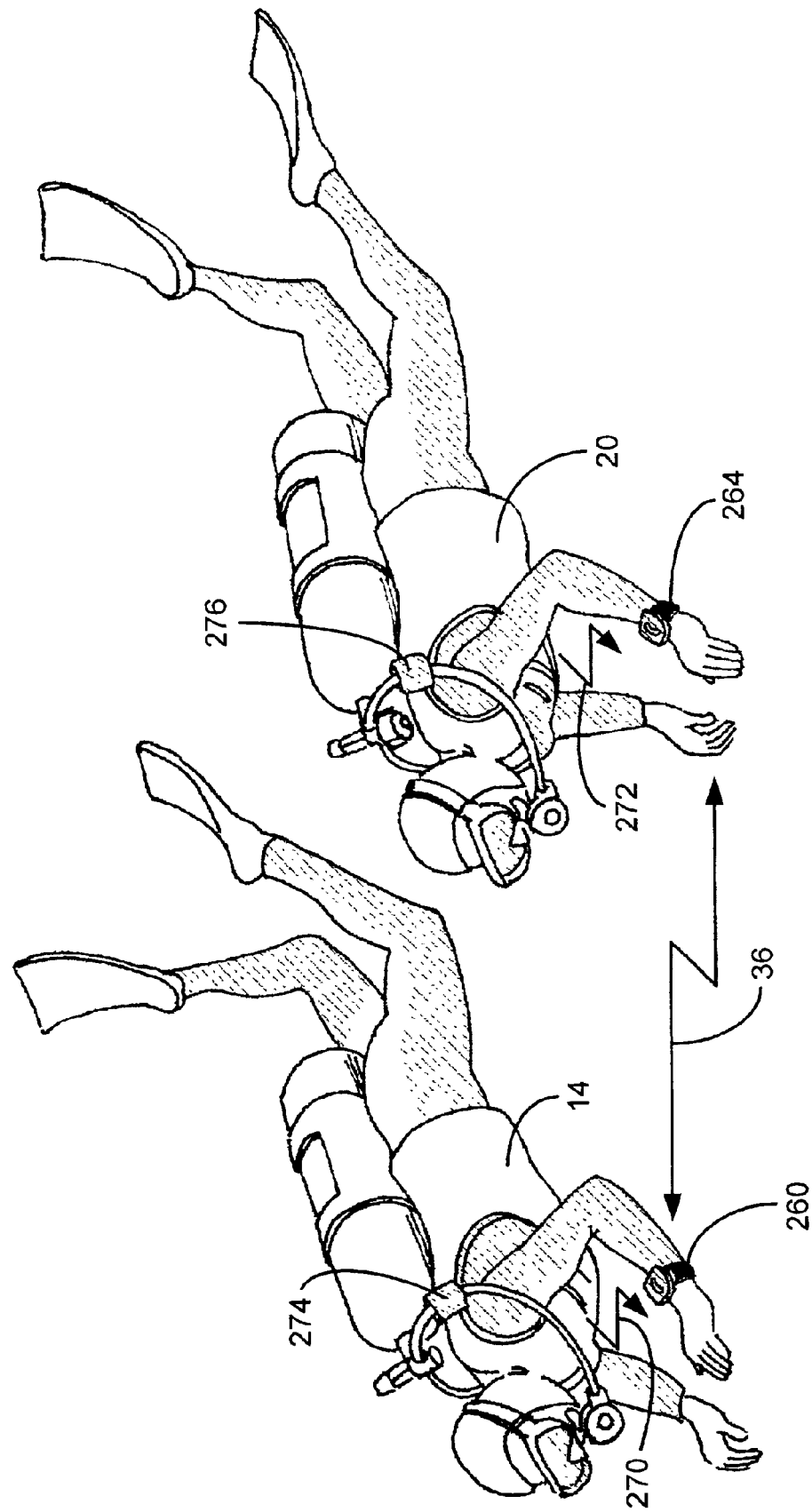

UNDERWATER ALERT SYSTEM

FIELD OF THE INVENTION

The present invention relates generally to underwater alert systems for divers, and, more particularly, to an underwater alert system including a transmitter assembly, carried by one diver, and a receiver assembly, carried by another diver.

BACKGROUND OF THE INVENTION

A. Scuba Diving's Buddy System

Scuba ("Self-Contained Underwater Breathing Apparatus") diving is a well-known activity practiced by people for applications such as sport, commercial, military, scientific, search and recovery, professional underwater photography and movie making. Because of the inherent risk and unfamiliarity associated with an underwater environment, people wishing to practice scuba diving are required to be trained and certified in diving safety, equipment, environment, communications, procedures, etc.

One of the fundamental safety practices of scuba diving is to never dive alone. A diver should always dive with another diver who remains nearby at all times. Preferably, the two divers should be separated under water by only a few feet. When divers dive in pairs, the divers are practicing what is conventionally called the "buddy system," wherein each diver is a "buddy" to the other diver. Under the buddy system, the divers have a responsibility to each other. For the buddy system to work, both divers must want it to work and must learn to apply the practices that will maximize their safety and minimize their separation underwater. Further, each diver must constantly be aware of the other diver's situation. Hence, the buddy system increases the safety, as well as the enjoyment, of diving.

The buddy system increases diving safety because a diver's responsibility is primarily to prevent and overcome problems and emergency situations encountered by the other diver, and secondarily to generally assist the other diver, as needed. The problems and emergency situations that can occur underwater include being out of air, trapped, entangled, injured, etc. The general assistance that can be provided above the water includes putting on suits and equipment, checking equipment, removing an entanglement, etc. The general assistance that can be provided underwater includes reminding the other diver of time limits, depth limits, air supply limits, direction, temperature and assent rates, surveying the area for hazards, adjusting the other diver's equipment, assisting with navigation, keeping track of each other, etc. The buddy system also provides a psychological aid to divers because the divers feel more secure, less stress and less likely to panic when another diver is present.

The buddy system increases the diving enjoyment because two divers can share experiences and witness unusual occurrences or discoveries together rather than alone. Because two divers witness more than one diver, one diver can point out something of interest under water that the other diver might have missed.

B. Traditional Scuba Diving Communication

Under water, the buddy system requires that the two divers have some way of gaining each other's attention to initiate communications and then some form of communication with each other. Divers are trained to communicate with each other by using primitive techniques such as predetermined hand signals, an underwater writing slate, making noise by banging on the air tank with a hard object, or by tugging on a line held by each diver. However, a disadvantage of both the hand signals and writing slates is that they rely almost entirely upon the divers maintaining line of sight with each other. Various unavoidable circumstances related to diving break the line of sight between the divers to render the hand signals or messages on the writing slate inadequate to gain the attention of the other diver. Such circumstances include the orientation of the divers' bodies or heads relative to each other, limited visibility through a mask or the water, separation beyond an arm's length distance, water currents, etc. A disadvantage of banging on the air tank is that a diver may not always have tools or devices for making sufficient noise under water that will attract the attention of the other diver. Further, since sound travels in all directions under water, a diver would not only gain the attention of their buddy diver, but also inadvertently gain the attention of other non-buddy divers in the vicinity of the tank. A disadvantage of tugging on a line is that the line limits the mobility between the divers and a diver's necessary mobility in the water can cause the line to be accidentally tugged. All of these circumstances can result in a breakdown of the buddy system to decrease the divers' safety and enjoyment during the dive. Over the years people have proposed various devices to improve upon these traditional communication techniques.

C. Alert Systems

1. Single Diver Alert Systems a. Single Diver Surface Alert Devices

Traditionally, scuba divers have relied on whistles to gain someone's attention on the water's surface. However, if a scuba diver is disabled and can't blow into the whistle, the whistle makes no sound at all. Further, if a scuba diver needs to attract the attention of someone who is too far away from to hear the whistle, then the whistle is of no help.

A Dive Alert™ device is a small, lightweight air horn that uses quick connect/disconnect hose fittings to become an integral part of a diver's power inflator used to inflate a scuba diver's buoyancy control device (BCD) using compressed air from the scuba diver's air tank. When the scuba diver presses a button on the Dive Alert™ device, the button engages a chrome-plated brass actuator valve stem causing a small amount of air to rush by a stainless steel diaphragm causing a piercingly loud sound to be emitted from an injection-molded thermoplastic body to gain someone's attention on the water's surface up to one mile away from the scuba diver. The Dive Alert™ device is better than the whistle when that a diver's air tank has enough air for the Dive Alert™ device to operate. However, both the Diver Alert™ device and the whistle share a disadvantage in that a diver would not only gain the attention of their buddy diver, but also inadvertently gain the attention of other non-buddy divers in the vicinity of the Dive Alert™ device.

b. Single Diver Underwater Alert Devices

A Sub Alert™ device is a small, lightweight air horn that includes a Sub Alert™ unit and a low-pressure hose to generate an underwater signal using compressed air from the diver's air tank. When the scuba diver presses a button on the Sub Alert™ device, the Sub Alert™ device generates an underwater signal that can be heard up to 25 feet away when the other diver is wearing a hood.

U.S. Pat. Nos. 4,635,242 and 5,010,529 disclose audible electronic signaling devices worn by a single diver and used to gain the attention of another diver in the vicinity. However, these patents do not teach or suggest a receiving device worn by another diver.

The Sub Alert™ device and the audible electronic signaling devices disclosed in U.S. Pat. Nos. 4,635,242 and 5,010,529 share the same disadvantage as the surface alert devices in that the alert not only gain the attention of their buddy diver, but also inadvertently gain the attention of other non-buddy divers in the vicinity. In some cases, a pair of divers or a small team of divers would like a discreet signal that will gain the attention of another diver without disturbing other divers in the vicinity.

2. Diver-to-Diver Alert Systems

U.S. Pat. Nos. 3,469,231 and 5,523,982 and publications WO 98-17526 and WO 98-45969 disclose diver-to-diver alert systems having a transmitter and a receiver, wherein each diver wears an alert system. These patent and publications disclose alerting a diver with an audible, a visual or a vibrating alert. These patent and publications also disclose that the alert system is carried on a diver's wrist, forearm, arm or waist. The patents and the publications do not teach or suggest that the transmitter, the receiver or the alert is carried on a diver's mask. The audible alert shares the same disadvantage as the surface and underwater single diver alert devices in that the audible alert not only gain the attention of their buddy diver, but also inadvertently gain the attention of other non-buddy divers in the vicinity. A disadvantage of the visual alert is that the visual alert would not immediately gain the attention of the diver if the diver does not constantly look at the visual alert on their wrist, forearm, arm or waist. Typically, divers dive with their head up to see where they are going and their arms at their sides to reduce water resistance. Hence, the diver's natural diving position is not conducive to monitoring a visual alert on their wrist, forearm, arm or waist. A disadvantage of the vibrating alert is that the vibrating alert conveys a very limited amount of information intended by the diver transmitting the alert signal, since the vibrating alert can only vibrate or not vibrate.

D. Underwater Wireless Voice Communication Systems

1. Single Diver Voice Communication Systems

Ocean Technology Systems (oceantechnologysystems.com) manufactures diver recall system called a DRS-100B Diver Recall/Hydrophone that is used on some charter dive boats. The diver recall system permits a diver on the boat to alert, to recall or to send voice communications to divers under water. The diver recall system generally includes an electronic package, a power supply, located on the boat, and a transducer, located in the water. All divers within range (e.g. 100 yards) of the transducer hear the communications with their naked ear and therefore have no need for an electronic listening device. Although the diver recall system is appropriate for general boat to diver communications, the diver recall system shares the same disadvantage as the surface and underwater single diver alert devices and the diver-to-diver audible alert devices in that the alert or voice communications gains the attention of all divers in the vicinity of the recall system.

2. Diver-to-Diver Voice Communication Systems

Various companies provide systems for underwater voice communication between two or more scuba divers. Ocean Technology Systems, Inc. (http://www.oceantechnologysystems.com) provides underwater communication systems including hard-wire, through-water, sonic, wireless, diver recall systems, Buddy Phone®, Aquacom®, Hot Mic®, and Buddy Line®. Another company, Ocean Reef (http://oceanreefgroup.com), provides an underwater communication system, called "Neptune", having a mask, called a Neptune II, integrated with a regulator, called a NIRA (Neptune integrated regulator adapter), and a communication system, including a GSM (Global submarine messenger) ultrasound transceiver/receiver, a model M101A receiver unit, and a model M105 surface unit. Yet another company, Stone electronics ltd. of B.C. Canada using distributor, Scubapro (http://www.scubapro.com), provides an underwater communication system, called "Dive-Link®" (http://www.divelink.net), including a surface unit, a two way diver communicator, a diver listen only model and communication options for various full face masks provided by other companies. The Dive-Link® system includes a headpiece, having a transceiver, a battery, a switch, an audible signal generator and mask straps, and a mouth piece electrically coupled to the headpiece. The mask straps attached to a conventional mask. The switch has an on, off and emergency position. When the switch is in the emergency position, the audible signal generator produces a loud beep that can be heard by all divers in the vicinity of the audible signal generator. Although these voice communication systems provide improved underwater voice communications over those of the past, these systems remain relatively expensive due to relatively complicated voice communication circuitry. For example, for sport divers, the Buddy Phone® system model XT-100 is advertised at a price of $340.00 and the Dive-Link® system is advertised at a price of $649.00.

E. Underwater Wireless Data Communication Systems

1. Single Diver Wireless Data Communication Systems

U.S. Pat. Nos. 5,191,317, 5,899,204 and 6,054,929 disclose data communication system including a transmitter, carried by a diver's air tank, and receiver, carried by the same diver's wrist or mask, for communicating data from the diver's air tank to the same diver's wrist or mask. However, these patents do not teach or suggest a data communication system including a transmitter, carried by a first diver, and receiver, carried by a second diver.

2. Diver-to-Diver Wireless Message Communication Systems

U.S. Pat. No. 6,125,080 discloses diver-to-diver message communication device having a transmitter and a receiver, wherein each diver wears a message communication device. The message communication devices, carried by each diver, forms a communication network in which each diver can communicate preset data messages with any one of the other divers in the network or with a base station. The message communication device has belts (shown as straps with buckles) for attaching the device to a diver's hand, to another part of his body, his diving suit, or his own equipment. The message communication device also has a liquid crystal display (LCD) and a buzzer or vibrator for notifying a diver of an incoming message. However, this patent does not teach or suggest that the belts attach the data communication device to the receiving diver's mask in a manner that permits the receiving diver to view the LCD.

F. Dive Mask, Swimmer's Goggles or Eyeglasses Having a Visual Display or Indicator U.S. Pat. No. 4,999,606 (dive mask), U.S. Pat. No. 5,191,317 (dive mask), U.S. Pat. No. 5,301,668 (dive mask), U.S. Pat. No. 5,685,722 (swimmer's goggles), U.S. Pat. No. 5,162,828 (eyeglasses), and publication WO 00/55676 (eyeglasses) disclose a display or indicator carried on a dive mask, swimmer's goggles or eyeglasses, respectively. However, these patents and the publication do not teach or suggest that the display or indicator is controlled or activated responsive to a signal transmitted by a transmitter carried by another diver.

G. Conclusion

Accordingly, scuba divers, practicing the buddy system, have a long-felt but unsolved need for an underwater alert system that increases the safety, as well as the enjoyment, of diving. The underwater alert system would be a practical, safe, inexpensive, simple, easy to use and reliable system. The underwater alert system would provide a substantial improvement over the traditional scuba diving communication techniques and yet cost much less than the underwater wireless voice communication systems. The underwater alert system would permit one scuba diver to discreetly and immediately gain the attention of another scuba diver, unlike many of the conventional underwater alert systems, and yet not be as complicated as the underwater wireless data communication systems. Alternatively, the underwater alert system would be a two-way system to permit each scuba diver to discreetly and immediately gain the attention of the other scuba diver. Further, alternatively, the underwater alert system would interface with a scuba diver's dive computer to permit dive computer data to be communicated from one scuba diver to another scuba diver.

BRIEF DESCRIPTION OF THE DRAWINGS

FIG. 3 illustrates a front, top and left side perspective mechanical view of the first receiver assembly; shown being carried by the second diver in FIG. 1, in accordance with the first preferred embodiment of the present invention.

FIG. 13 illustrates a schematic diagram of an underwater alert system including the first transceiver assembly, electrically coupled to a first dive computer carried by the first diver, and a second transceiver assembly, electrically coupled to a second dive computer carried by the second diver, in accordance with a third preferred embodiment of the present invention.

FIG. 14 illustrates the underwater alert system, shown in FIG. 13, carried by the first diver and the second diver, in accordance with the third preferred embodiment of the present invention.

DETAILED DESCRIPTION OF THE PREFERRED EMBODIMENTS

A. Overview of the Underwater Alert System of the Preferred Embodiments

1. General Overview

Figure 11:
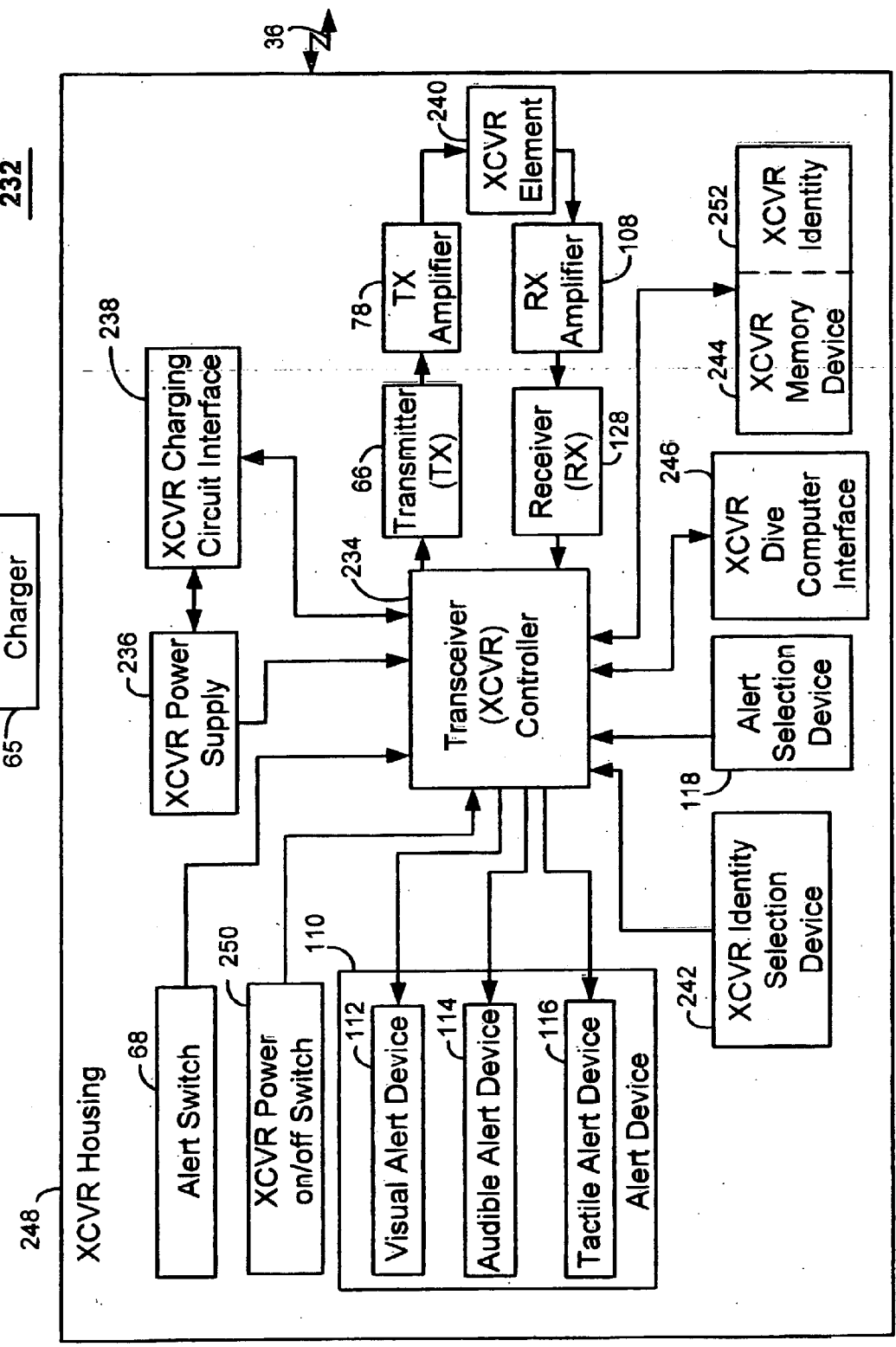
FIG. 11 illustrates a schematic diagram of a first transceiver assembly, in accordance with a second preferred embodiment of the present invention.
Figure 12:
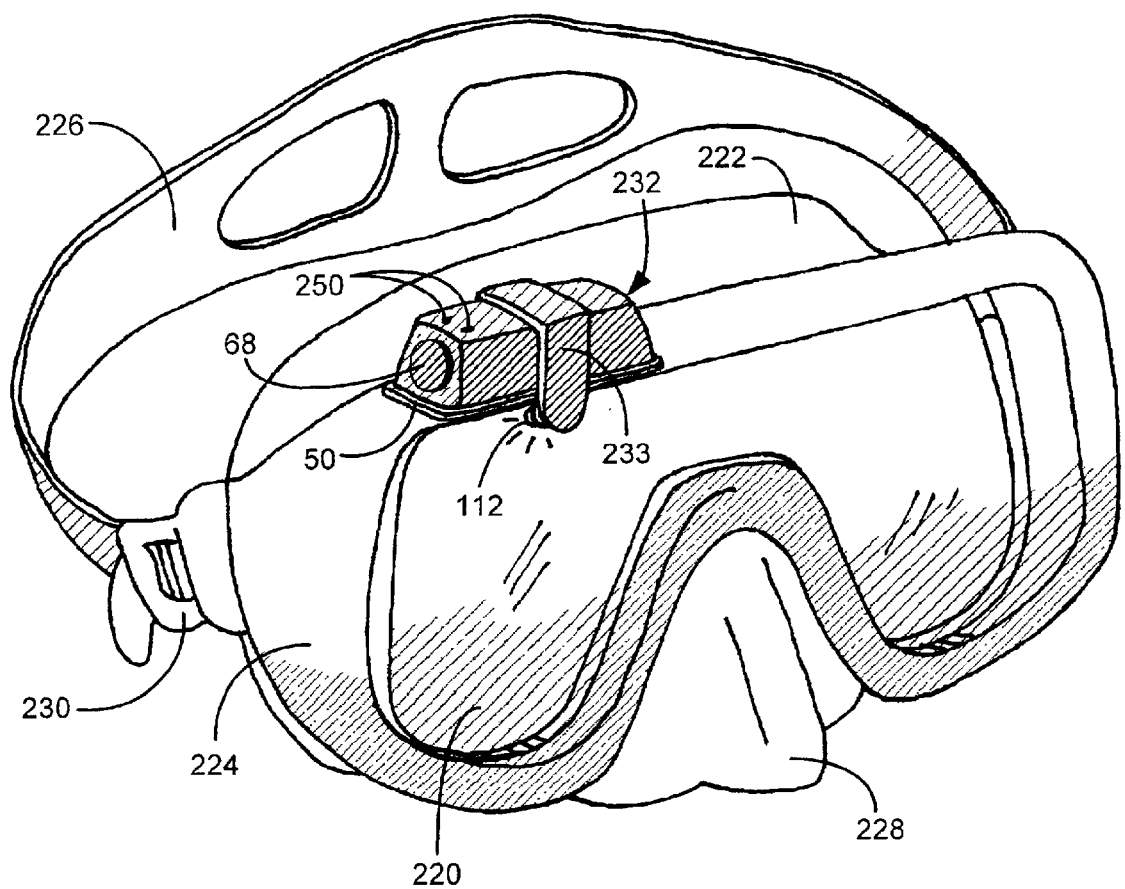
FIG. 12 illustrates a front, top and left side perspective view of the first transceiver assembly, as shown in FIG. 11, attached to a frame of a mask, in accordance with the second preferred embodiment of the present invention.

FIGS. 1 through 10 illustrate an underwater alert system in accordance with a first preferred embodiment of the present invention. In the first preferred embodiment of the present invention, the underwater alert system 10 includes a first transmitter assembly 12, carried by a first diver 14, and a first receiver assembly 16, carried by a first mask 18 worn by a second diver 20. The underwater alert system 10, according to the first preferred embodiment of the present invention, permits the first diver 14 to discreetly and immediately gain the attention of the second diver 20. FIGS. 11–12 illustrate an underwater alert system 10 in accordance with a second preferred embodiment of the present invention. In the second preferred embodiment of the present invention, the underwater alert system 10 includes a first transceiver assembly 232, carried by a second mask worn by the first diver 14, and a second transceiver assembly 254, carried by the first mask 18 worn by the second diver 20. The underwater alert system 10, of the second preferred embodiment of the present invention, provides a two-way system to permit each diver to discreetly and immediately gain the attention of the other diver. FIGS. 13 and 14 illustrate an underwater alert system 10 in accordance with a third preferred embodiment of the present invention. In the third preferred embodiment of the present invention, the underwater alert system 10 includes the first transceiver assembly 232, electrically coupled to a first dive computer 252 carried by the first diver 14, and a second transceiver assembly 254, electrically coupled to a second dive computer 256 carried by the second diver 20. The underwater alert system 10, of the third preferred embodiment of the present invention, provides a two-way system to permit dive computer data to be discreetly and periodically shared between two or more divers. Each of the first, second and third preferred embodiments of the present invention advantageously provides scuba divers, practicing the buddy system, with an underwater alert system 10 that increases the safety and the enjoyment of diving.

2. Particular Overview

More particularly, in the first preferred embodiment of the present invention, the underwater alert system 10 comprises the first transmitter assembly 12, the first receiver assembly 16 and the first mask 18. The first transmitter assembly, carried by the first diver, has a waterproof transmitter housing 38 for carrying an alert switch 68, a transmitter 66 and a transmitting element 80. The alert switch 68 generates an electrical alert actuation signal 86 responsive to the alert switch 68 being actuated, either manually by the first diver 14 or automatically by the first diver's equipment. The transmitter 66 generates a predetermined electrical transmit signal 98 responsive to receiving the electrical alert actuation signal 86. The transmitting element 80 generates a predetermined wireless signal 36 responsive to receiving the predetermined electrical transmit signal 98. The first receiver assembly 16, carried by the second diver 20, has a waterproof receiver housing 48 for carrying a receiving element 126, a receiver 128 and an alert device 110. The receiving element 126 generates an electrical receive signal 152 responsive to receiving the predetermined wireless signal 36. The receiver 128 generates a predetermined electrical alert attention signal 135 responsive to receiving the electrical receive signal 152. The alert device 110, such as a visual 112, an audible 114 or a tactile 116 alert device, generates a predetermined alert 161, such as light 162, sound 164 or vibration 166, respectively, responsive to receiving the predetermined electrical alert attention signal 135. The first mask 18 carries the first receiver assembly 16, either separate from or integral with the first mask 18, in a way that permits the predetermined alert 161 to gain the attention of the second diver 20 when the first mask 18 is worn on the second diver's head. The first transmitter assembly 12 and the first receiver assembly 18 each have a power switch 70 and 120, such as a water-activated switch, and a power supply 82 and 132 for providing power to the electrical circuits carried therewith. Preferably, the first transmitter assembly 12 and the first receiver assembly 14 share a common electrical identity 77 and 125, such as a frequency channel or a signal address, to provide discreet communications between the divers.

In the second preferred embodiment of the present invention, the underwater alert system 10 includes all of the preferred and alternative features described with reference to the first preferred embodiment of the present invention. In the second preferred embodiment of the present invention, a second transmitter assembly, a second receiver assembly and a second mask, adapted to be worn on the first diver's head, permits the second diver 20 to gain the attention of the first diver 14 in an analogous, reverse manner. In this case, the first transmitter assembly 12 and the second receiver assembly, each carried by the first diver 14, may be combined into a first transceiver assembly 232 to be carried, either separate from or integral with, the second mask. Likewise, the second transmitter assembly and the first receiver assembly 16, each carried by the second diver 20, may be combined into a second transceiver assembly to be carried, either separate from or integral with, the first mask 18. Hence, the underwater alert system of the second preferred embodiment of the present invention advantageously permits two-way communications between the first diver 14 and the second diver 20.

In the third preferred embodiment of the present invention, the underwater alert system 10 includes all of the preferred and alternative features described with reference to the first and/or the second preferred embodiments of the present invention. In the third preferred embodiment of the present invention, the first transmitter assembly 12 is electrically coupled to the first diver's dive computer to permit dive computer data, associated with the first diver 14, to be transmitted to the receiver assembly 16, carried by the seconds diver 20. Likewise, the second transmitter assembly is electrically coupled to the second diver's dive computer to permit dive computer data, associated with the second diver 20, to be transmitted to the receiver assembly, carried by the first diver 14. Hence, the underwater alert system of the third preferred embodiment of the present invention advantageously permits dive computer data to be transmitted from the first diver 14 to the second diver 20 or to be exchanged between the first diver 14 and the second diver 20.

B. Underwater Alert System of the First Preferred Embodiment

1. Practical Example

Figure 1:
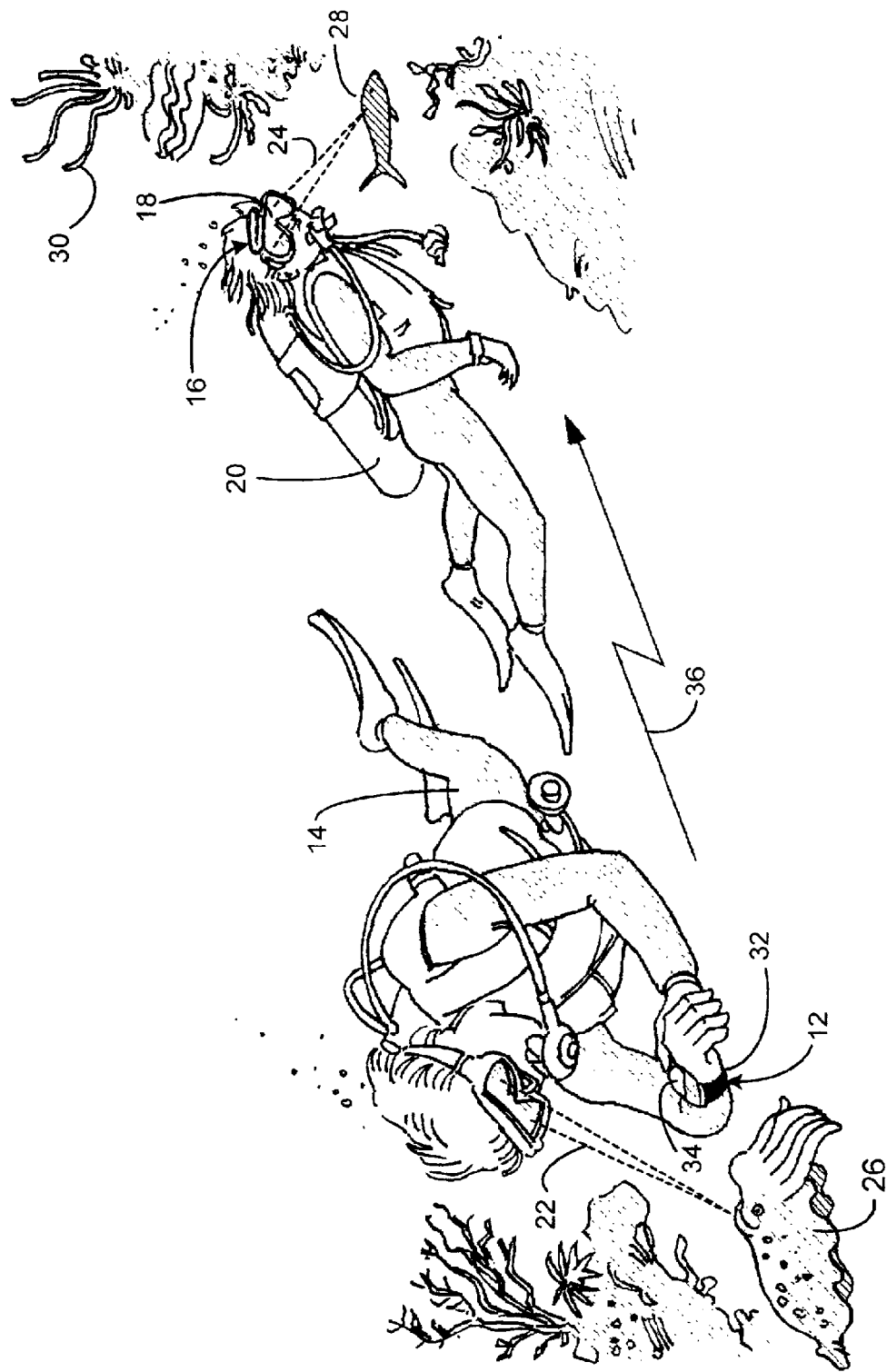
FIG. 1 illustrates an underwater alert system including a first transmitter assembly, carried by a first diver, and a first receiver assembly, carried by a first mask worn by a second diver, in accordance with a first preferred embodiment of the present invention.

FIG. 1 illustrates an underwater alert system 10 including a first transmitter assembly 12, carried by a first diver 14, and a first receiver assembly 16, carried by a first mask 18 worn by a second diver 20, in accordance with a first preferred embodiment of the present invention. The first diver 14 and the second diver 20 are shown as scuba divers practicing the buddy system during an underwater dive to increase the safety and enjoyment of their dive. Although the first diver 14 and the second diver 20 are separated from each other by only a short distance, such as one or two meters, the orientation of their bodies in the water causes the line of sight 22 of the first diver to be in one direction and the line of sight 24 of the second diver 20 to be in another, different, direction. Because each diver has a line of sight extending in a different direction, the divers do not have eye contact with each other. While diving, the first diver 14 discovers an octopus 26. The second diver 20 does not see the octopus 26 and observes ordinary underwater fish 28 and plant life 30. The first diver 14 is excited about the discovery of the octopus 26 and wants to share the discovery of the octopus 26 discreetly, without disturbing the octopus 26 and other wildlife or other divers in the vicinity, and immediately, before the octopus 26 swims away or hides.

The first diver 14 preferably carries the first transmitter assembly 12 on his right wrist using a wristband 32. The first diver 14 alerts the second diver 20 of the discovery of the octopus 26 by pressing a pushbutton 34 on the first transmitter assembly 12 using his left hand. The first transmitter assembly 12 transmits a predetermined wireless signal 36 through the water.

The second diver 20 carries the first receiver assembly 16 on the first mask 18. The first receiver assembly 16 receives the predetermined wireless signal 36 and causes an alert to be generated to alert the second diver that the predetermined wireless signal 36 was received. The alert is preferably visual, such as light, but may also be vibration or sound. The generation of the alert gains the attention of the second diver 20.

After the first diver 14 gains the attention of the second diver 20, various conventional forms of underwater communication may be used to further convey a message or an intention. The second diver 20 knows that the first diver 14 caused the alert to be generated, so the second diver 20 responds by looking at the first diver to see why the first diver 14 gained his attention. The first diver 14 may or may not make eye contact with the second diver 20 depending on the particular situation. In this example, the first diver 14 may keep the octopus 26 within his line of sight and merely point to the octopus 26 with his hand to indicate to the second diver 20 the reason for the alert. Alternatively, the first diver 14 may make eye contact with the second diver 20 and motion with his hand for the second diver 20 to come closer to his area. The second diver 20 enjoys the opportunity to view the octopus before the octopus swims away or hides and both divers were able to share their discovery in further detail after the dive. Hence, the underwater alert system 10 advantageously permits the first diver 14 to discreetly and to immediately gain the attention of the second diver 20.

2. Transmitter Assembly—Mechanical a. Overview

Figure 2:
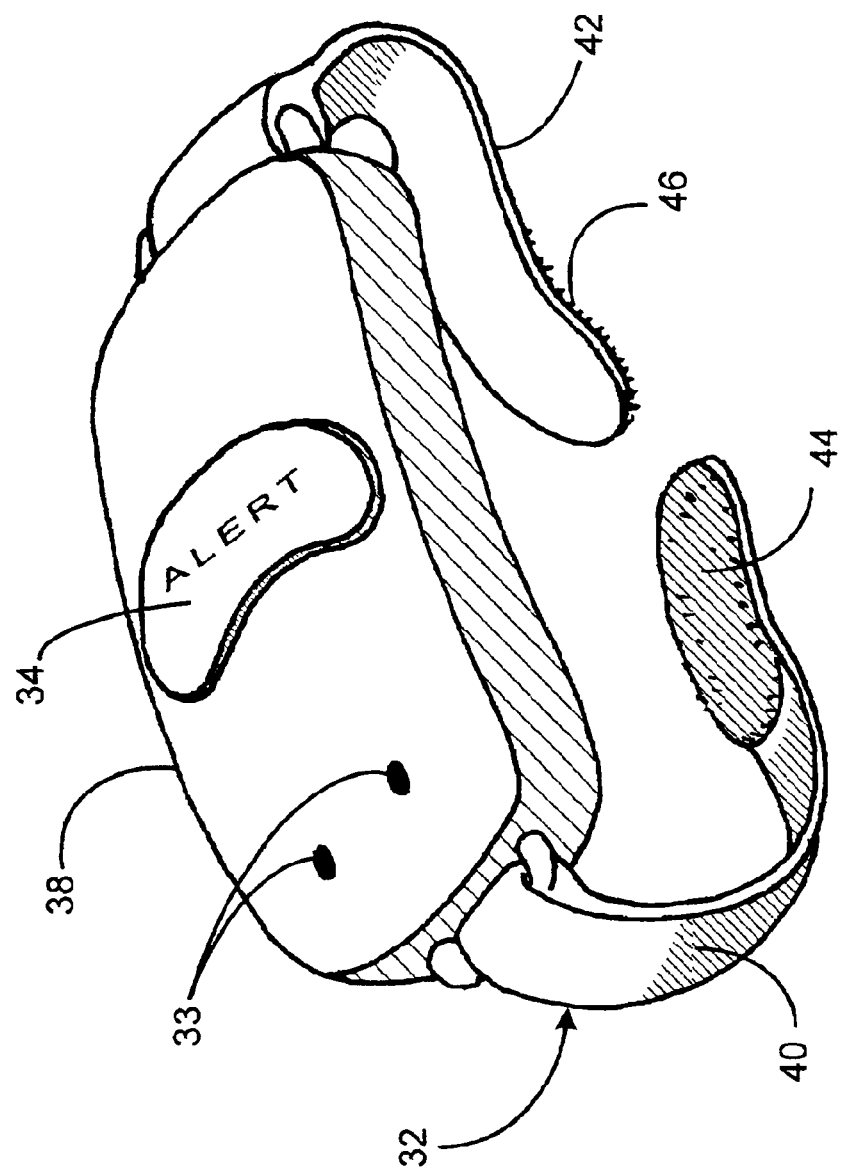
FIG. 2 illustrates a front, top and right side perspective mechanical view of the first transmitter assembly, shown being carried by the first diver in FIG. 1, in accordance with the first preferred embodiment of the present invention.

FIG. 2 illustrates a front, top and right side perspective mechanical view of the first transmitter assembly 12, shown being carried by the first diver 14 in FIG. 1, in accordance with a first preferred embodiment of the present invention. The first transmitter assembly 12 of FIG. 2 generally includes a transmitter housing 38, the pushbutton 34, the wristband 32 and a power switch 33. The transmitter housing 38 has sufficient volume and dimensions to carry the electronic components and circuitry illustrated in FIG. 4. The transmitter housing 38 is preferably waterproof or otherwise suitable for being submerged underwater at depths of up to 50 to 100 meters, without causing damage to the electronic components and circuits contained inside the transmitter housing 38. The transmitter housing 38 is made using conventional molding techniques and using conventional plastic molding materials. Preferably, the transmitter housing 38 is made so that the bottom side of the transmitter housing 38, facing the first diver's wrist or forearm, is slightly convex to permit a more comfortable fit around and against the first diver's wrist or forearm.

b. Attachment Mechanism

The wristband 32 preferably comprises two straps, one strap attached to and extending from each opposite end of the transmitter housing 38. One strap 40 preferably has hook fasteners 44 attached thereto and the other strap 42 preferably has loop fasteners 46 attached thereto. The hook and loop fasteners, otherwise known as a Velcro™ fastener, provide a convenient mechanism to secure the straps to each other. The straps each have a length sufficient to secure the transmitter housing 38 to the first diver's wrist or forearm. Alternatively, any other mechanism may be used to secure the transmitter housing 38 to any body part of the first diver 14 or to the first diver's equipment. Body parts of the first diver for locating the transmitter housing 38 include, without limitation, the first diver's hand, wrist, forearm, upper arm, foot, ankle, lower leg, upper leg, waist, torso, neck and head. The first diver's equipment that may carry the transmitter housing 38 include, without limitation, a mask, a snorkel, a wet suit including a body suit, a hood and gloves, a bathing suit, a buoyancy compensation device including a vest, a compressed air tank, a regulator, air hoses, and a weight belt. For example, the wristband 32 may be one continuous elastic strap for securing the transmitter housing to the first diver's wrist or forearm. Further, the transmitter housing 38 may be attached to a cord or strap to permit the transmitter housing 38 to hang around the first diver's neck, like a pendant, or may be attached to a band or belt to permit the transmitter housing 38 to be located on the first diver's waist. Further, the transmitter housing 38 may be attached to a spring-loaded clip or clamp to permit the transmitter housing 38 to be clipped to the first diver's equipment.

c. Pushbutton

The pushbutton 34 is located on the top side of the transmitter housing 38 and has sufficient dimensions to permit the first diver to easily find and press the pushbutton 38. The pushbutton 34 is preferably waterproof or otherwise suitable for being submerged underwater without causing damage to the electronic components and circuits contained inside the transmitter housing 38. The pushbutton 34 is made using conventional molding techniques and using conventional plastic molding materials. The pushbutton may be illuminated by a light source, such as a light emitting diode (LED) or an incandescent bulb, which is also carried by the transmitter housing 38. Preferably, the light source would be disposed underneath the pushbutton 38. In this case, the pushbutton 38 would be made from a transparent or translucent material to permit the light from the light source to illuminate the pushbutton 38. Alternatively, the light source may illuminate a perimeter of the pushbutton 38 made from an opaque, or otherwise light blocking, material. Preferably, the pushbutton 38 bears an inscription or other suitable logo or design conveying the purpose of the pushbutton 38. In FIG. 2, the pushbutton 38 bears the inscription "Alert." Alternative inscriptions may include, without limitation, "Emergency," "Attention," "Buddy."

d. Power Switch

The power switch 33 of the first transmitter assembly 12 turns the electronic components and circuitry that are located inside the transmitter housing 38 on and off. Preferably, the power switch 33 is implemented as a water-activated or wet switch, as is well known in the art, that turns the power on when the transmitter housing 38 is under the water and that turns the power off when the transmitter housing 38 is above the water.

3. Receiver Assembly—Mechanical a. Overview

FIG. 3 illustrates a front, top and left side perspective mechanical view of the first receiver assembly 16, shown being carried by the second diver 20 in FIG. 1, in accordance with a first preferred embodiment of the present invention. The first receiver assembly 16 of FIG. 3 generally includes a receiver housing 48 having a power switch 49. The receiver housing 48 has sufficient volume and dimensions to carry the electronic components and circuitry illustrated in FIG. 5. The receiver housing 48 is preferably waterproof or otherwise suitable for being submerged underwater at depths of up to 50 to 100 meters without causing damage to the electronic components and circuits contained inside the receiver housing 48. The receiver housing 48 is made using conventional molding techniques and using conventional plastic molding materials.

b. Attachment Mechanism

FIG. 3 also illustrates an attachment mechanism for securing the receiver housing 48 to any body part of the second diver 20 or to the second diver's equipment. The second diver's body parts and equipment are the same as mentioned with reference to FIG. 2 for the first diver 14. In the first embodiment of the present invention, the receiver housing 48 is carried by the second diver's mask, as shown and described with reference to FIGS. 8, 9, 10 and 11.

Preferably, the attachment mechanism comprises a thin, planar carrier 50, made from a material such as tape or a foam pad, and having an adhesive 62 disposed on opposite sides of the carrier having the majority of the surface area. In this case, the adhesive 62 disposed on a top side of the carrier 50 is attached to a bottom side of the receiver housing 48 and the adhesive (not shown) disposed on a bottom side of the carrier 50 is attached to the second diver's equipment, such as the second diver's mask. Using the carrier 50<with adhesive 62 results in a semi-permanent attachment of the receiver housing 48 to the second diver's equipment because the receiver housing 48 is not meant to be removed but may be removed by tearing the receiver housing 48 away from the second diver's equipment and thereby damaging the carrier and/or the adhesive 62.

Alternatively, the attachment mechanism comprises a bracket 52 having spring-loaded clips 54 and 56 disposed at opposite ends of the bracket 52. A bottom side of the bracket is attached to the second diver's equipment, such as the second diver's mask, using the carrier 50 with adhesive 62 as described above with reference to FIG. 3. A top side of the bracket 52 is attached to the bottom side of the receiver housing 48 using the spring-loaded clips 54 and 56. In this case, the spring-loaded clip 54 is adapted to fit into recess 58 on one side of the receiver housing 48 and the spring-loaded clip 56 is adapted to fit into recess 60 on another opposite side of the receiver housing 48. The second diver 20 attaches the receiver housing 48 to the bracket 52 by aligning the recesses 58 and 60 on the receiver housing 48 with the spring-loaded clips 54 and 56, respectively, on the bracket 52 and pressing the receiver housing 48 against the bracket 52. The force of the receiver housing 48 against the bracket 52 produces a bias force on the spring-loaded clips 54 and 56 thereby causing the spring-loaded clips 54 and 56 to deflect away from each other. Preferably, the spring-loaded clips 54 and 56 on the bracket 52 each have a beveled or otherwise contoured top edge to facilitate receiving the receiver housing 48 with minimum interference. When the recesses 58 and 60 on the receiver housing 48 are disposed opposite to the spring-loaded clips 54 and 56, respectively, on the bracket 52 the spring-loaded clips 54 and 56 return to their original unbiased position inside the recesses 58 and 60 of the receiver housing 48 thereby securing the receiver housing 48 to the bracket 52. Using the bracket 52 and the carrier 50 with the adhesive 62 permits the receiver housing 48 to be attached to and removed from the second diver's equipment. The bracket 52 and the carrier 50 with the adhesive 62 remain attached to the second diver's equipment as a semi-permanent attachment. Alternatively, any other type of attachment mechanism may be used to permit the receiver housing 48 to be attached to and removed from the second diver's equipment. Such other attachment mechanisms include, without limitation, hook and loop fasteners, such as a Velcro™ fastener, straps and bands, and clips or clamps, as described herein with reference to FIG. 3. A removable attachment mechanism advantageously permits the receiver assembly 16 to be used on different masks, separate from the second diver's mask, and on land-based eyewear or other land-based applications, such as, without limitation, a belt, wristband, neck strap, a pocket, and the like.

c. Power Switch

The power switch 49 of the first receiver assembly 16 turns the electronic components and circuitry that are located inside the receiver housing 48 on and off. Preferably, the power switch 49 is implemented as a water-activated or wet switch, as is well known in the art, that turns the power on when the receiver housing 48 is under the water and that turns the power off when the receiver housing 48 is above the water.

4. Transmitter Assembly—Electrical a. Overview

Figure 4:
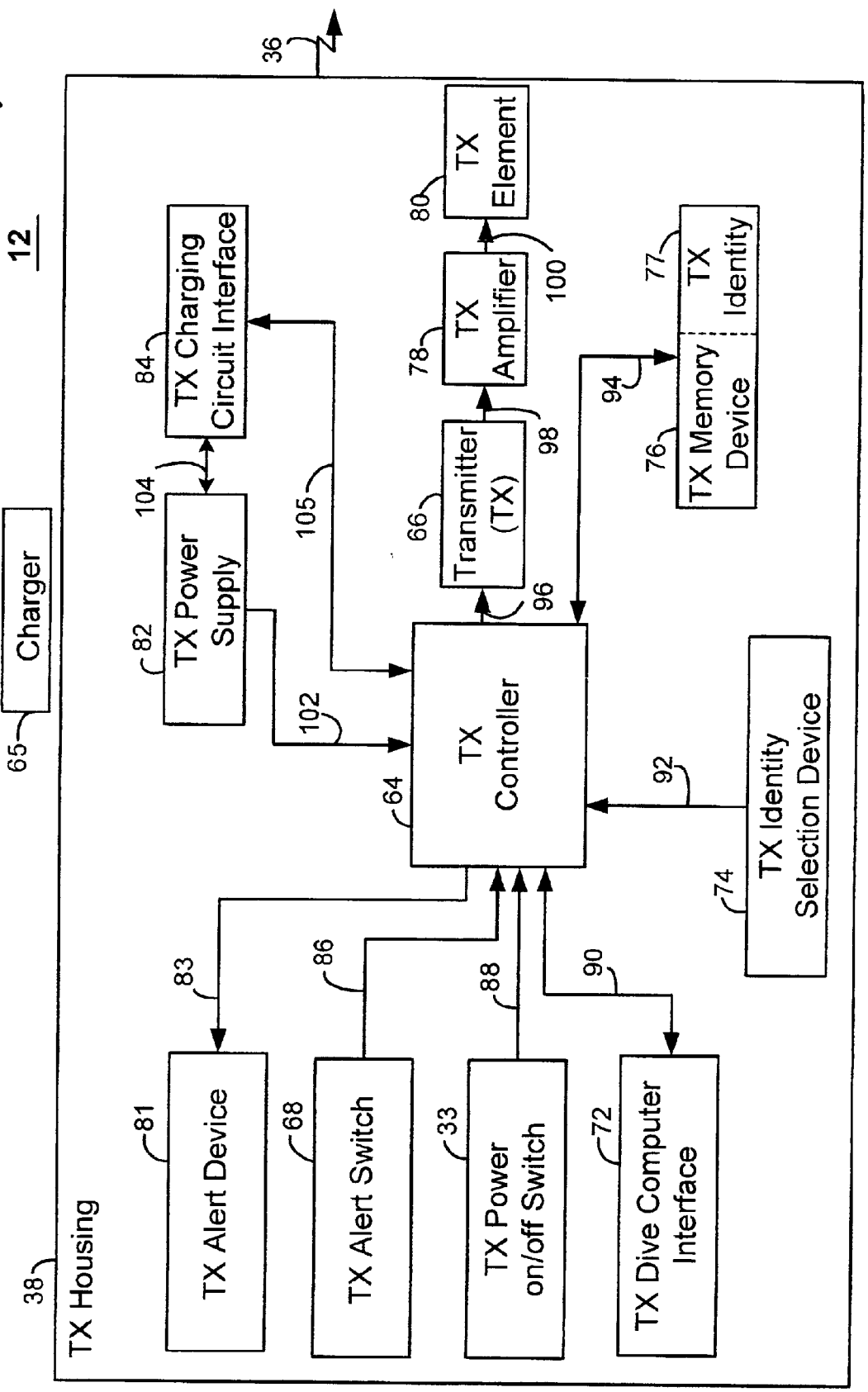
FIG. 4 illustrates a schematic diagram of the first transmitter assembly, shown in FIGS. 1 and 2, in accordance with the first preferred embodiment of the present invention.

FIG. 4 illustrates a schematic diagram of the first transmitter assembly 12, shown in FIGS. 1 and 2, in accordance with the first preferred embodiment of the present invention. The first transmitter assembly 12 generally includes the transmitter housing 38, a transmitter controller 64, a transmitter 66, an alert switch 68, a transmitter power on/off switch 70, a transmitter dive computer interface 72, a transmitter identity selection device 74, a transmitter memory device 76, a transmitter amplifier 78, a transmitting element 80, an alert device 81, a transmitter power supply 82, and a transmitter charging circuit interface 84. The transmitter memory device 76 further includes a transmitter identity 77.

b. Transmitter Controller

Generally, the transmitter controller 64 receives various input signals from and generates various output signals to the various electrical circuitry and components shown and described responsive to a predetermined set of commands or instructions forming a computer program stored in the transmitter memory device 76.

c. Transmitter Power Switch

The transmitter power switch 33 of the first transmitter assembly 12 turns on and off power to the various shown and described electronic components and circuitry. Preferably, the transmitter power switch 33 is electrically coupled to the transmitter controller 64 via power signal 88, as shown in FIG. 4, but may alternatively be electrically coupled directly to the transmitter power supply 82, each construction being well known in the art. Preferably, the power switch 33 is actuated automatically. Types of automatically activated power switches include, without limitation, the water-activated or wet switch, as described hereinabove, a motion sensitive switch responsive to the diver's physical motion, or a location sensitive switch responsive to a location of the transmitter assembly 12, such as being secured to a bracket. Alternatively, the power switch 33 may be actuated manually. Types of manually activated power switches include, without limitation, a push-type, lever-type, twist-type or slide-type switch, as are well known in the art.

d. Transmitter Power Supply

The transmitter power supply 82 provides electrical power 102 to the various shown and described electronic components and circuitry. Generally, the transmitter power supply 82 is a storage device that stores electrical power or the potential for electrical power for later or concurrent use by the electronic components and circuitry. Preferably, the power supply 82 is a conventional battery. The battery is preferably a conventional nine volt battery, but may have a lower voltage if it is sufficient to power the circuitry for a reasonable period of time. Preferably, the battery is non-rechargeable, but may be rechargeable by a charger 65 via the transmitter charging circuit interface 84. The transmitter charging circuit interface 84 provides a charging signal 104 to the transmitter power supply 82 implemented as a rechargeable battery, as is well known in the art. The transmitter charging circuit interface 84 also communicates with the transmitter controller 64 via a bi-directional charge control signal 105 to permit the transmitter controller 64 to monitor and/or control the charging and discharging process of the transmitter power supply 82, as is well known in the art. Preferably, the transmitter controller 64 monitors the transmitter power supply 82 for a low voltage condition and provides the first diver 14 with an appropriate alert, such as visual, audible or tactile, when the transmitter power supply 82 reaches a predetermined voltage. The predetermined voltage preferably corresponds to a level when the first transmitter assembly 12 could not transmit a signal 36 strong enough to reach the first receiver assembly 16 over a predetermined distance for a predetermined amount of time. These various factors may be determined during the engineering process of the first transmitter assembly 12 and the first receiver assembly 16, as are well known in the art. Moreover, the first diver 14 may actually test the first transmitter assembly 12 and the first receiver assembly 16 together to verify proper operation, either under the water or above the water.

e. Alert Switch

The alert switch 68 generally is a device for making, breaking or changing the connections in an electrical circuit and, more particularly, is a device adapted to generate an electrical alert actuation signal 86 responsive to the alert switch 68 being actuated. Actuation of the alert switch preferably causes a closed circuit condition to generate the electrical alert actuation signal 86, but may also cause an open circuit condition to generate the electrical alert actuation signal 86, as is well known in the art.

Preferably, the alert switch 68 is a pushbutton switch adapted to generate the electrical alert actuation signal 86 responsive to the pushbutton switch being manually actuated by the first diver 14. In this case the pushbutton 34, such as a small button or knob, as shown in FIG. 2, overlays the pushbutton switch to permit the pushbutton 34 to actuate the underlying pushbutton switch responsive to the first diver 14 manually pressing the pushbutton 34. As an alternative to a push-type switch, any other type of switch may be used including, without limitation, a lever-type, twist-type or slide-type switch, as is well known in the art.

Preferably, the first transmitter assembly 12 has one alert switch 68 that generates one electrical alert actuation signal 86 responsive to the one alert switch 68 being actuated. For example, one "Discovery" alert switch preferably generates a first electrical alert actuation signal, indicative of a discovery by the first diver 14 that the first diver 14 obtained sight or knowledge of for the first time or found out what he did not previously know, as related to his exploration, investigation or a chance encounter during the dive.

Alternatively, the first transmitter assembly 12 may have multiple alert switches that generate multiple electrical alert actuation signals, respectively, responsive to the multiple alert switches, respectively, being actuated. In this case, each alert switch generates a different electrical alert actuation signal. For example, a "Discovery" alert switch may generate a first electrical alert actuation signal, as described hereinabove. Then, an "Emergency" alert switch may generate a second electrical alert actuation signal, different from first the electrical alert actuation signal, indicative of an emergency situation, associated with the first diver 14, caused by an unforeseen combination of circumstances or the resulting state that calls for immediate action or an urgent need for assistance or relief. Hence, this first alternative advantageously permits the first diver 14 to easily recognize and remember that one switch generates one electrical alert actuation signal and another switch generates another electrical alert actuation signal.

Still alternatively, the first transmitter assembly 12 may have one alert switch that generates multiple electrical alert actuation signals responsive to the one alert switch being actuated in different ways. For example, one alert switch may generate a first electrical alert actuation signal, indicative of a discovery by the first diver 14, responsive to the alert switch being actuated once within a predetermined period of time, such as five seconds. Then, the alert switch may generate a second electrical alert actuation signal, different from first the electrical alert actuation signal, indicative of an emergency situation associated with the first diver 14, responsive to the alert switch being actuated more than once within the predetermined period of time, such as the five seconds. Hence, this second alternative advantageously reduces the number of switches required to generate the multiple electrical alert actuation signals.

Preferably, the first diver 14 manually actuates the alert switch 68. Alternatively, the alert switch 68 may be automatically actuated. In this case, the first diver 14 conditions associated with the first diver's body, equipment or environment automatically actuates the alert switch 68. Conditions associated with the first diver's body include, without limitation, the first diver's heart rate and breathing rate. Conditions associated with the first diver's equipment include, without limitation, information and data associated with the first diver's dive computer or gauges, such as dive table time limits, depth limits, air supply limits, direction, distance, and assent rates. Conditions associated with the first diver's environment include, without limitation, any parameter of the water, such as temperature, density, opacity, etc.

f. Dive Computer Interface

The dive computer interface 72 permits the information and data associated with the first diver's dive computer or gauges to be received by the transmitter controller 64. The dive computer interface 72 generates a dive computer signal 90 representative of the information and data associated with the first diver's dive computer or gauges. The dive computer interface 72 may be a wired interface or a wireless interface, such as radio frequency, infrared, acoustic, ultra-acoustic, sonic, or ultrasonic.

g. Transmitter Memory Device

The transmitter memory device 76 stores the predetermined set of commands or instructions forming the computer program for first transmitter assembly 12. The transmitter controller 64 and the transmitter memory device 76 exchange memory control signals 94. The memory control signals 94 from the transmitter memory device 76 to the transmitter controller 64 are representative of the instructions of the computer program instructing the transmitter controller 64 of what to do next. The memory control signals 94 from the transmitter controller 64 to the transmitter memory device 76 are representative of the state or condition of the circuitry of the first transmitter assembly 12 being reported back to the computer program. The transmitter memory device 76 is preferably read only memory (ROM), but may alternatively be random access memory (RAM), electrically erasable programmable read only memory (EEPROM), firmware, and the like, as are well known in the art.

h. Transmitter Identity Selection Device and Transmitter Identity

The transmitter identity selection device 74 provides a mechanism for providing first transmitter assembly 12 with the transmitter identity 77 stored in the transmitter memory device 76. As will be described in further detail herein below with reference to FIG. 5, the first receiver assembly 16 includes a receiver identity selection device 122 adapted to provide the first receiver assembly 16 with a receiver identity 125 that matches the transmitter identity 77 to permit the first receiver assembly 16 to receive the predetermined wireless signal 36 from the first transmitter assembly 12. Practically, the first transmitter assembly 12 and the first receiver assembly 16 are electronically matched or mated so that only those two assemblies will work together. This matching advantageously provides discreet electronic communications between the first diver 14 and the second diver 20 without alerting other divers in the vicinity having the same transmitter and receiver assemblies.

Any type of electronic identity scheme may be used for the transmitter identity 77 and the receiver identity 125. Preferably, the electronic identity is a frequency channel. The frequency channel is the frequency at which the first transmitter assembly 12 communicates with the first receiver assembly 16. The first transmitter assembly 12 is designed to generate the predetermined wireless communication signal 36 at the designated frequency. The first receiver assembly 16 is designed to receive the predetermined wireless communication signal 36 at the same designated frequency.

Alternatively, the electronic identity may be an address assigned to the first transmitter assembly 12 and the first receiver assembly 16. The address is a label that precedes the predetermined wireless communication signal 36 transmitted from the first transmitter assembly 12 to the first receiver assembly 16. The first transmitter assembly 12 is designed to generate the predetermined wireless communication signal 36 with a designated address. The first receiver assembly 16 is designed to receive the predetermined wireless communication signal 36 having the same designated address.

Still alternatively, the electronic identity may be a code for encoding the predetermined wireless communication signal 36 transmitted by the first transmitter assembly 12. The first receiver assembly 16 uses the same code to decode the predetermined wireless communication signal 36 received by the first receiver assembly 16. The first transmitter assembly 12 is designed to generate the predetermined wireless communication signal 36 encoded with a designated code. The first receiver assembly 16 is designed to receive the predetermined wireless communication signal 36 decoded with the same designated code.

For any electronic identity scheme, including the frequency channel, the address, and the code, preferably multiple electronic identities are provided for the first transmitter assembly 12 and the first receiver assembly 16. The multiple electronic identities advantageously permit pairs of the first transmitter assembly 12 and the first receiver assembly 16 to be matched and at the same time distinguished from other pairs of the same first transmitter assembly 12 and the first receiver assembly 16. For example, four divers include two sets of buddy divers. One set of buddy divers set their first transmitter assembly 12 and first receiver assembly 16 to be matched to a first electronic identity, and the other set of buddy divers set their first transmitter assembly 12 and first receiver assembly 16 to be matched to a second electronic identity, different from the first electronic identity. In this example, one set of buddy divers may discreetly and immediately gain attention without disturbing the other set of buddy divers.

The electronic identity scheme, including the frequency channel, the address and the code, having multiple electronic identities preferably requires a method or mechanism for changing the electronic identity associated with the first transmitter assembly 12 and the second transmitter assembly 16. Preferably, the transmitter identity selection device 74 provides the method or mechanism to do this by generating an electronic identity signal 92 for the transmitter controller 64. The method or mechanism may be embodied in hardware or software. Hardware embodiments include, without limitation, switches, such as dip or micro switches, carried by each of the first transmitter assembly 12 and the first receiver assembly 16. For example, two switches provide for up to four electronic identities (i.e., binary 0–3) and a set of three switches provides for up to eight electronic identities (i.e., binary 0–7). In the preferred embodiment of the present invention, hardware switches are used to set the electronic identity. Software embodiments include, without limitation, commands or instructions transmitted from the first transmitter assembly 12 to the first receiver assembly 16 over a communication link, such as physical wire or wirelessly, such as radio frequency, infrared frequency, acoustic frequency or ultrasonic frequency. The wireless communication link is preferably an infrared communication link, as specified by the Infrared Data Association (IRDA), having a communication distance of one meter.

Transmitter and receiver assemblies, having multiple electronic identities, and a way to select one of the multiple electronic identities may be used in a variety of beneficial ways to increase the safety and enjoyment of diving. For example, one transmitter assembly may be electronically matched with one receiver assembly, as described hereinabove with reference to the two pairs of buddy divers. In a second example, one transmitter assembly may be electronically matched to multiple receiver assemblies. In this second example, a dive instructor, carrying the transmitter assembly, may be teaching or leading a group of students, each carrying a receiver assembly, on a dive. In yet a third example, multiple transmitters may be electronically matched to one receiver. In this third example, a group of students, each carrying a transmitter assembly, may need to gain the attention of one dive instructor, carrying a receiver assembly. In a fourth example, multiple transmitter assemblies may be electronically matched to multiple receiver assemblies. In this fourth example, a small group of six divers go diving as three sets of buddy divers. However, all six divers dive relatively close to each other and they desire to be alerted to any discovery or emergency actuated by one of the divers.

i. Transmitter

The transmitter controller 64 generates a predetermined electrical information signal responsive to receiving the electrical alert actuation signal 86, in a manner that is well known in the art. The transmitter 66 generates a predetermined electrical transmit signal 98 responsive to receiving the predetermined electrical information signal 96. The transmitter 66 generally causes a signal to be conveyed through space or a medium, such as water, from one location, such as from the first diver 14, to another location, such as to the second diver 20.

j. Transmitter Amplifier

The transmitter amplifier 78 generates a transmit amplified signal 100 responsive to receiving the predetermined electrical transmit signal 98 from the transmitter 66. The transmitter amplifier 78 advantageously increases the power or the amplitude level of the predetermined electrical transmit signal 98 so that the predetermined electrical transmit signal 98 will have enough energy to be carried through the space or the medium, such as water, to reach the first receiver assembly 16.

k. Transmitting Element

The transmitting element 80 generates the predetermined wireless signal 36 responsive to receiving the transmitter amplified signal. The transmitting element 80 is conventionally called a source or a transducer. The transmitting element 80 is preferably implemented as a hydrophone, as is well known in the art.

The predetermined wireless signal 36 is wireless in the sense that it is generally an electromagnetic wave defined as being one of the waves that are propagated by simultaneous periodic variations of electric and magnetic field intensity. The frequency of the predetermined wireless signal 36 is preferably one of a sonic, ultrasonic, acoustic, ultra-acoustic frequency, and the like. In this case, "sonic" means operated by or using sound waves. "Acoustic" means operated by or using sound waves. Further, "ultra" means beyond the range or limits of, on the other side of, or beyond what is ordinary, proper or moderate. The frequency ranges of each of these types of sound waves are well known in the art. The predetermined wireless communication signal 36 having any one of these frequency ranges can be efficiently sent through a medium, such as water. Thus, sound transmission is very good under water, since water is a non-compressible medium. Sound waves are longitudinal pressure waves in any material medium, such as water, regardless of whether they constitute audible sound. The predetermined wireless signal 36 is radiated from the transmitting element 80 as sound vibrations in an omni-directional pattern, otherwise described as a spherical pattern. By contrast, the transmission of radio frequency waves through water is limited to relatively short distances, since water effectively "shorts out" radio waves. Hence, although sound frequency waves are preferred, radio frequency waves may alternatively be used in the present invention.

The word "predetermined" in the phrase predetermined wireless signal 36 generally means to impose a direction or tendency on beforehand. In the preferred embodiment of the present invention, the predetermined wireless signal 36 is determined before the alert switch 68 is actuated. The word "predetermined" may otherwise be called preset, preselected, and the like. Characteristics of the predetermined wireless signal 36 that may be predetermined include amplitude, frequency and modulated information. When the predetermined wireless signal 36 is an alert signal or a data signal, each of the amplitude, frequency and modulated information is predetermined. By contrast, underwater voice communication systems transmit wireless signals that are not predetermined because the modulated information changes with the diver's voice.

Various factors detrimentally affect the propagation of the predetermined wireless signal 36 in water. The predetermined wireless signal 36 can bounce off the bottom of the dive zone, the surface of the water, a thermocline (i.e., an abrupt change in the temperature of the water at a particular depth), and large natural or man-made objects. Further, the sound intensity of the predetermined wireless signal 36 from the transmitting element 80 varies inversely with the square of the distance from the transmitting element 80 (i.e. sound intensity is proportional to $1/(distance)^2$). Still further, as the predetermined wireless signal 36 passes through water, some of the energy associated with the signal is absorbed and converted into heat to cause attenuation of the signal, and some of the energy of the signal is scattered by objects, such as seaweed and bubbles, to cause diffraction of the signal. Still further, the temperature of the water may cause the predetermined wireless signal 36 to bend and the density of the water also affects the predetermined wireless signal 36. All of these various factors are taken into account during the design of the transmitter assembly 12 and receiver assembly 16 to produce a reliable system. Practically, since buddy divers preferably use the underwater alert system 10, several meters typically separate the buddy divers. Commercially, the underwater alert system 10 would be designed so that the transmitter assembly 12 and the receiver assembly 16 would operate at a separation distance of fifty meters, but may be designed to operate at other separation distances. The factors related to bounce, attenuation, diffraction and bending do not significantly affect the design of the underwater alert system 10. The factor related to the sound intensity is considered when determining the power output requirement of the transmitter assembly 12.

1. Transmitter Alert Device

The transmitter alert device 81 generates an alert to the first diver 14 carrying the transmitter assembly 12 related to any function of the transmitter assembly 12. Various alerts that may be generated by the transmitter alert device 81 include, without limitation, low voltage warning, verification of operation, confirmation of transmitter identity selection, confirmation of activation of the alert switch 68 or the transmitter power on/off switch 33, conditions of the charging circuit 84, and the like. The transmitter alert device 81 may be implemented in an analogous manner as a visual, audible or tactile alert devices explained in more detail below with reference to the receiver assembly 16.

5. Receiver Assembly—Electrical a. Overview

Figure 5:
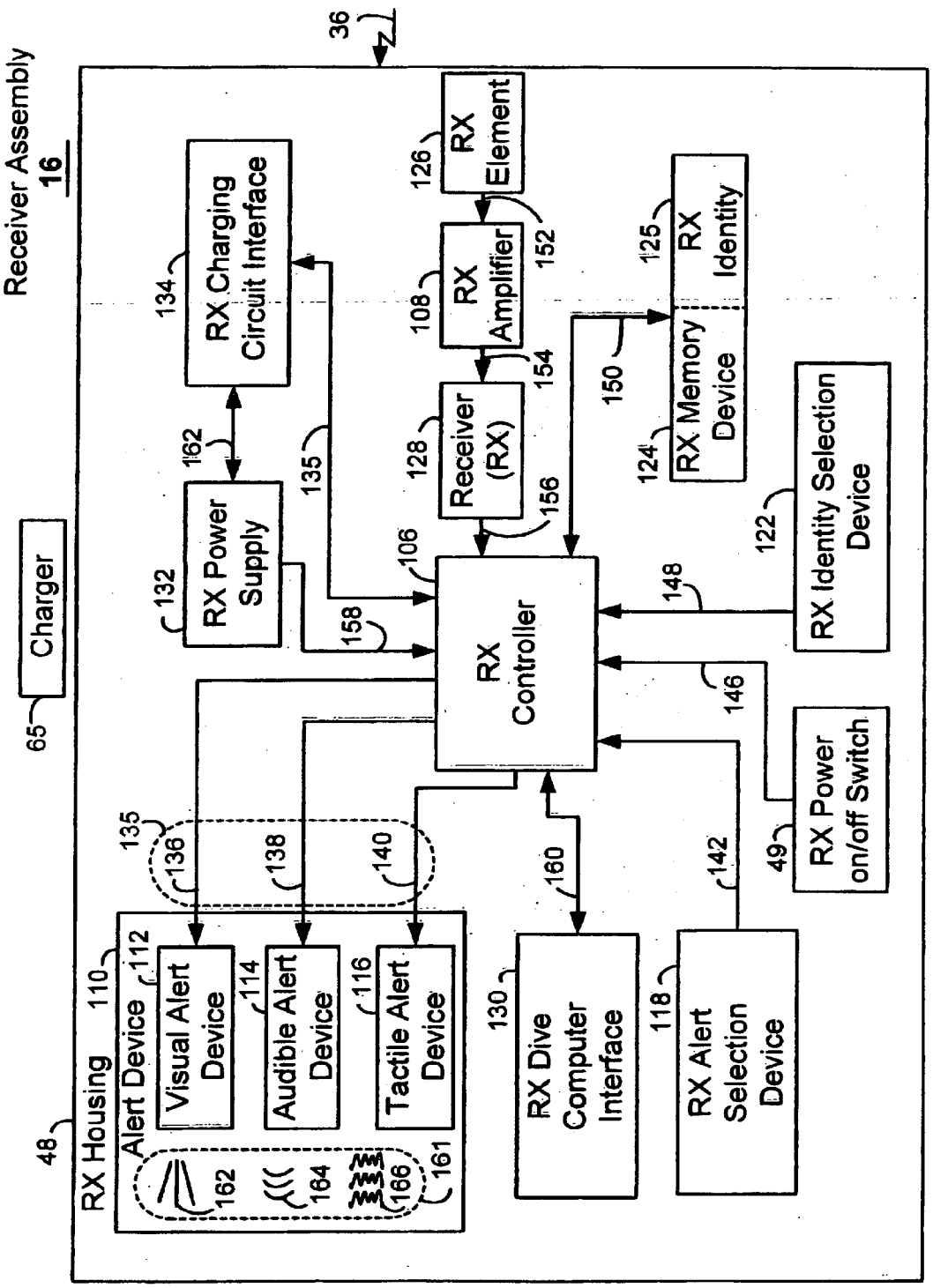
FIG. 5 illustrates a schematic diagram of the first receiver assembly, shown in FIGS. 1 and 3, in accordance with the first preferred embodiment of the present invention.

FIG. 5 illustrates a schematic diagram of the first receiver assembly 16, shown in FIGS. 1 and 3, in accordance with the first preferred embodiment of the present invention. The first receiver assembly 16 generally includes the receiver housing 48, a receiver controller 106, a receiver 128, an alert device 110, an alert selection device 118, a receiver power on/off switch 49, a receiver identity selection device 122, a receiver memory device 124, a receiving element 126, a receiver amplifier 108, a receiver dive computer interface 130, a receiver power supply 132, a receiver charging circuit 134. The alert device 110 generally includes at least one of a visual alert device 112, an audible alert device 114 and a tactile alert device 116. The receiver memory device 124 further includes a receiver identity 125.

The receiver controller 106, the receiver power on/off switch 49, the receiver identity selection device 122, the receiver memory device 124, the receiver power supply 132, and the receiver charging circuit 134 are generally made and operate in an analogous manner as the transmitter controller 64, the transmitter power on/off switch 33, the transmitter identity selection device 74, the transmitter memory device 76, the transmitter power supply 82, and the transmitter charging circuit 84, respectively, as shown and described with reference to FIG. 4. All of the features, construction, function, examples, alternatives, and the like that are described hereinabove for these transmitter elements shown in FIG. 4 also apply to these receiver elements shown in FIG. 5. Hence, a corresponding description for these receiver elements will not be duplicated with reference to FIG. 5. However, the receiver 128, the alert device 110, the alert selection device 118, the receiving element 126, the receiver amplifier 108, and the receiver dive computer interface 130 have characteristics that are unique to the first receiver assembly 16 and are described in further detail below.

b. Receiving Element

The receiving element 126 generates an electrical receive signal 152 responsive to receiving the predetermined wireless signal 36. Practically, the receiving element 126 senses or detects the electromagnetic sound waves traveling through the water in the vicinity of the receiving element 126. The receiving element 126 is conventionally called a receiver or a hydrophone. The receiving element 126 is preferably implemented as a hydrophone, as is well known in the art.

c. Receiver Amplifier

The receiver amplifier 108 generates a receive amplified signal 154 responsive to receiving the electrical receive signal 152 generated by the receiving element 126. The receiver amplifier 108 advantageously increases the power or amplitude level of the electrical receive signal 152 so that the electrical receive signal 152 will have enough energy to be recognized, identified or detected by the receiver 128.

d. Receiver

The receiver 128 generates a predetermined electrical alert attention signal 156 responsive to receiving the receive amplified signal 154 from the receiver amplifier 108. The receiver 128 is generally a device that receives a signal and causes the signal to be converted from one form into another.

e. Receiver Controller

The receiver controller 106 generates a predetermined electrical alert attention signal 135 responsive to receiving the predetermined electrical alert attention signal 156 from the receiver 128.

f. Alert Device

The alert device 110 generates a predetermined alert 161 responsive to receiving the predetermined electrical alert attention signal 135 from the receiver controller 106. The alert device 110 is generally a device that alerts the second diver 20. The word "alert" generally means to call to a state of readiness, to make aware of, or to warn.

The alert device 110 may be any type of alert and includes, without limitation, at least one of a visual alert device 112, an audible alert device 114 and a tactile alert device 116. Hence, with these three categories of alert devices, there is a potential for eight combinations of the three alert devices to be implemented in the receiver assembly (i.e., binary 000=no alert devices, binary 111=all three alert devices). The: particular combination of alert devices implemented in the receiver assembly 16 depends on engineering factors including, without limitation, size, weight, power, complexity, functionality, and the like, as are well known in the art, as well as business or marketing factors including, without limitation, customer preferences, price, application, and the like, as are well known in the art. Preferably, each of the three types of alert devices are included in the receiver assembly 16 to permit a diver to mount the receiver assembly according to his preference and to be alerted according to his preference.

When multiple alert devices are implemented in the receiver assembly 16, various combinations of the generated alerts may be configured. In the preferred case where each of the three types of alert devices are included in the receiver assembly 16, there is a potential for eight combinations of the three alerts to be generated by the three alert devices (i.e., binary 000=no alert devices, binary 111=all three alert devices). For example, a vibrating alert and a visual alert may be generated at the same time. Further, the various alerts may be interspersed among each other. For example, the visual alert may be generated for a first predetermined period of time, such as 5 seconds, followed by the vibrating alert for a second period of time, such as 5 seconds. Hence, multiple variations of alerts may be generated depending on the particular application. The multiple variations of alerts may be preset by the manufacturer of the receiver assembly 16 or may be programmed by the user of the receiver assembly 16.

The alert device 110 may be located outside, inside or integrated with the second diver's mask 18, depending on the desired implementation. The location of the alert device 110 may be determined by the manufacturer of the receiver assembly 16 or by the user of the receiver assembly 16, depending on the anticipated application of the receiver assembly 16 when the receiver assembly 16 was manufactured.

The alert device 110 may generate the predetermined alert 161 as a continuous or pulsed signal, depending on the particular application. For example, the predetermined alert 161 may be continuous within a predetermined period of time, such as five seconds, to represent a discovery by the first diver 14, and may be pulsed within the predetermined period of time, such as the five seconds, to represent an emergency associated with the first diver 14.

The alert device 110 may also provide an indication of the range or distance of the second diver 20 relative to the first diver 14.

The visual alert device 112 generates a predetermined visual alert 162, as the predetermined alert 161, responsive to receiving a predetermined electrical visual alert attention signal 136, as the predetermined electrical alert attention signal 135. The receiver assembly 16 is mounted on the second diver's mask 18 in such a manner that the second diver 20 can see the predetermined visual alert 162 generated by the visual alert device 112 when the second diver 20 is wearing the mask 18.

Preferably, the visual alert device 112 is a light source adapted to generate a predetermined visible light signal, as the predetermined visual alert 162. The light source may include, without limitation, a light emitting diode (LED), an incandescent bulb, and the like, as is well known in the art. Preferably, the light source is a LED. The light source is the preferred visual implementation when the predetermined wireless signal 36 is representative of a discovery or an emergency by the first diver 14. The light source may have one or more colors to indicate various conditions of the alert. For example, a light source emitting green light may be representative of a discovery by the first diver 14 and the same or different light source emitting a red light may be representative of an emergency associated with the first diver 14.

A light guide may be used to guide the predetermined visual alert 162 in a manner that is pleasing or noticeable to the second diver 20 when the second diver is wearing the mask 18. The light guide includes, without limitation, optical fibers, lens covers, and the lens on the mask itself, and the like. For example, one or more optical fibers may be disposed along at least a portion of the perimeter of the lens of the mask, either on the outside or the inside of the mask. In another example, the light source may enter a side edge of the lens of the mask to illuminate at least a portion of the lens.

Alternatively, the visual alert device 112 is a display device including, without limitation, a LED display, a liquid crystal display (LCD), and the like, as is well known in the art. Preferably, the display device would be a LCD display because of its low power requirements or an organic LED display because of its small size. The display device is the preferred implementation when dive computer data is received. The display device visually presents the dive computer data in format that the second diver can recognize and interpret, such as for example and without limitation, alpha characters, numeric characters and alphanumeric characters.

The audible alert device 114 generates a predetermined audible alert 164, as the predetermined alert 161, responsive to receiving a predetermined electrical audible alert attention signal 138, as the predetermined electrical alert attention signal 135. The receiver assembly 16 is mounted on the second diver's mask 18 in such a manner that the second diver 20 can hear the predetermined audible alert 164 generated by the audible alert device 114 when the second diver 20 is wearing the mask 18. The audible alert device 114 may otherwise be called a buzzer or a beeper.

Preferably, the audible alert device 114 is an electro-acoustic transducer adapted to generate a predetermined audible acoustic signal, as the predetermined audible alert 164. The electro-acoustic transducer may otherwise be called a speaker. The electro-acoustic transducer is a preferred audible implementation when the predetermined wireless signal 36 is representative of a discovery or an emergency by the first diver 14.

The tactile alert device 116 generates a predetermined tactile alert 166, as the predetermined alert 161, responsive to receiving a predetermined electrical tactile alert attention signal 140, as the predetermined electrical alert attention signal 135. The receiver assembly 16 is mounted on the second diver's mask 18 in such a manner that the second diver 20 can feel the predetermined tactile alert 166 generated by the tactile alert device 116 when the second diver 20 is wearing the mask 18.

Preferably, the tactile alert device 116 is a vibrator adapted to generate a predetermined vibration signal, as the predetermined tactile alert 166. The vibrator is preferably constructed of a small motor having a small weight asymmetrically attached to the motor's shaft. When the motor spins the shaft, the weight also spins, but because of its asymmetrical position, the spinning weight consequently causes the motor to move. When the motor is secured to the receiver housing 48, the moving motor causes the receiver housing 48 to vibrate. Other types of vibrators, such as disc-type vibrators may also be used, as are known in the art.

g. Alert Selection Device

The alert selection device 118 is an input device that permits the second diver 20 to determine which alert device among multiple alert devices to activate or how a particular alert device is activated. The alert selection device 118 generates an alert selection signal 142 for receipt by the receiver controller 106 responsive to a selection being made. Any type of alert selection device 118 may be used including, without limitation, switches, keypads, voice recognition, and the like, as are well known in the art. For example, a set of three switches will permit the second diver 20 to select any one combination among the eight combinations of the three alert devices 110. The alert selection device 118 may be respond to either manual or automatic selection. The second diver 20 preferably performs the manual selection. Automatic selection may be responsive to the location of the receiver assembly 16. For example, the audible alert device 112 is automatically selected when the receiver assembly 16 is above the water (when the second diver 20 is not likely wearing the mask) and the tactile alert device 116 is automatically selected when the receiver assembly 16 is under the water (when the second diver 20 is likely to be wearing the mask). In another example, the visual alert device 112 is automatically selected when the receiver assembly 16 is attached to the mask 18, and the audible alert device 114 is automatically selected when the receiver assembly 16 is removed from the mask 18. The automatic selection is preferably performed with appropriate sensor, as are well known in the art.

h. Receiver Dive Computer Interface

The receiver dive computer interface 130 permits the information and data associated with the second diver's dive computer or gauges to be received by the receiver assembly 16. The receiver dive computer interface 130 generates a dive computer signal 160 representative of the information and data associated with the second diver's dive computer or gauges. The receiver dive computer interface 130 may be a wired interface or a wireless interface, such as radio frequency, infrared, acoustic, ultra-acoustic, sonic or ultrasonic. Hence, the receiver dive computer interface 130 advantageously permits the second diver 20 to perceive the information and data using an appropriate alert device 110 of the receiver assembly 16.

6. Transmitter Assembly—Method

Figure 6:
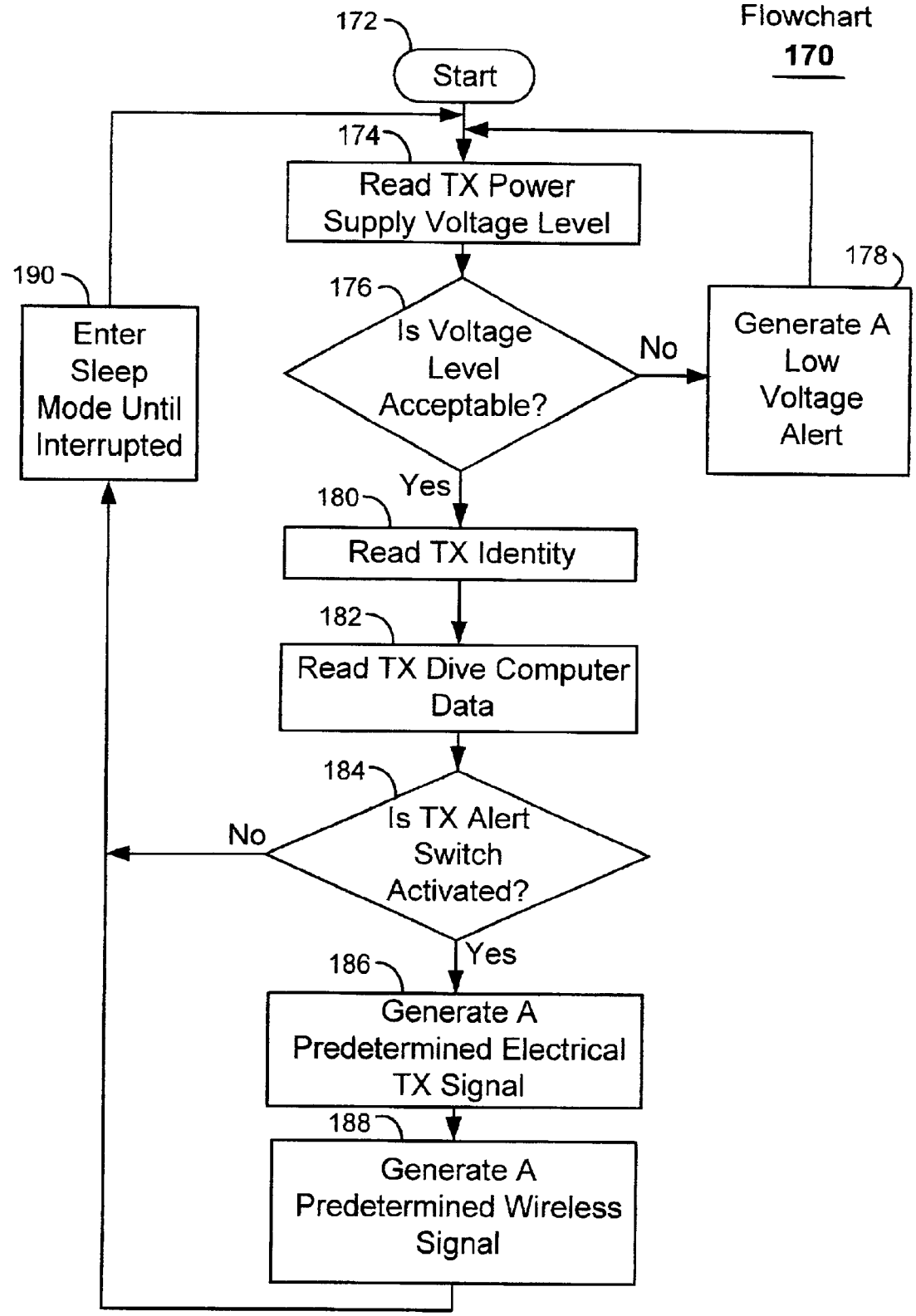
FIG. 6 illustrates a flowchart describing steps of a method of operation performed by the first transmitter assembly, shown in FIGS. 1, 2 and 4, in accordance with the first preferred embodiment of the present invention.

FIG. 6 illustrates a flowchart 170 describing steps of a method of operation performed by the first transmitter assembly 12, shown in FIGS. 1, 2 and 4, in accordance with the first preferred embodiment of the present invention. Practically, the steps of the flowchart 170 are representative of instructions or commands embodied within the computer program stored in the transmitter memory device 76 upon which the transmitter controller 64 operates.

At step 172, the transmitter controller 64 starts the method of operation. At step 172, the transmitter assembly 12 is assumed to be powered on by the transmitter power on/off switch 33, which is typically a hardware function.

At step 174, the transmitter controller 64 reads the voltage level of the electrical power 102 provided by the transmitter power supply 82.

At step 176, the transmitter controller 64 determines whether the voltage level of the electrical power 102 is acceptable to operate the transmitter assembly 12. If the determination at step 176 is negative, then the method continues to step 178. Otherwise, if the determination at step 176 is positive, then the method continues to step 180.

At step 178, the transmitter controller 64 generates a transmitter alert signal 83 to activate the transmitter alert device 81 to indicate to the first diver 14 a low voltage condition of the transmitter power supply 82. After step 178, the method returns to step 174.

At step 180, the transmitter controller 64 reads the transmitter identity 77 from the transmitter memory device 76. Step 180 assumes that the transmitter controller 64 has already read and stored the selected the transmitter identity 77 from the transmitter identity selection device 74.

At step 182, the transmitter controller 64 reads the dive computer data 90 from the dive computer interface 72.

At step 184, the transmitter controller 64 waits for the alert switch 68 to be activated.

At step 186, the transmitter controller 64 causes the transmitter 66 to generate the predetermined electrical transmit signal 98 responsive to the alert switch 68 being actuated, which, in turn, causes the predetermined wireless signal 36 to be generated at step 188.

At step 190, the transmitter controller 64 places the transmitter assembly 12 into a sleep mode to conserve the electrical power 102 provided by the transmitter power supply 82, until the transmitter controller 64 is interrupted from the sleep mode in a manner that is well known in the art.

The transmitter controller 64 performs other method steps not shown in the flowchart 170 but described herein such as, without limitation, functions associated with the transmitter charging circuit 84, selecting the transmitter identity 77, and the like. Further, the method steps shown in the flowchart 170 are not limited only to the combination of steps shown and described, but may be rearranged in another combination that remains suitable for operation of the transmitter assembly 12.

7. Receiver Assembly—Method

Figure 7:
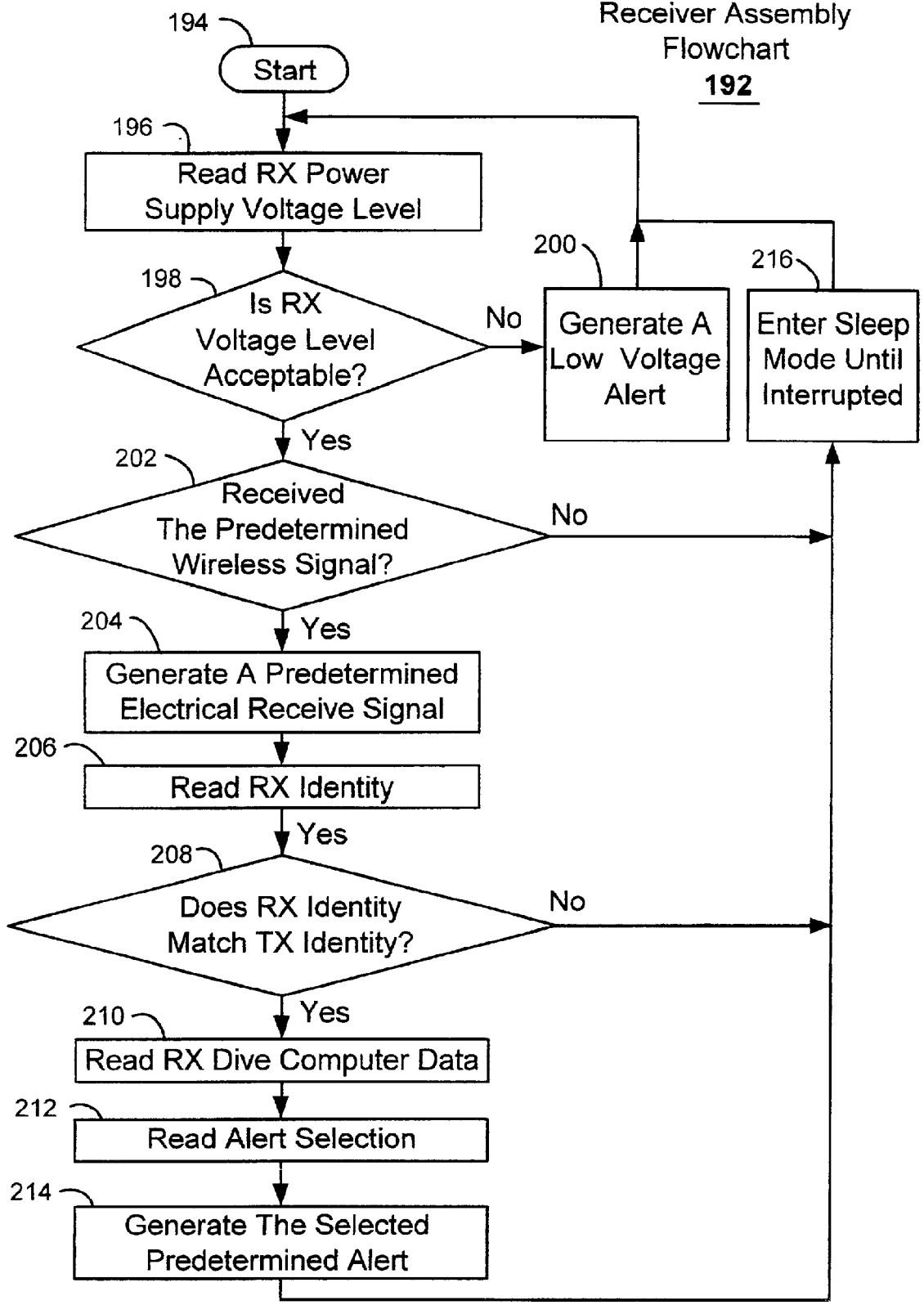
FIG. 7 illustrates a flowchart describing steps of a method of operation performed by the first receiver assembly, shown in FIGS. 1, 3 and 5, in accordance with the first preferred embodiment of the present invention.

FIG. 7 illustrates a flowchart 192 describing steps of a method of operation performed by the first receiver assembly 16, shown in FIGS. 1, 3 and 5, in accordance with the first preferred embodiment of the present invention. Practically, the steps of the flowchart 192 are representative of instructions or commands embodied within the computer program stored in the receiver memory device 124 upon which the receiver controller 106 operates.

At step 194, the receiver controller 106 starts the method of operation. At step 194, the receiver assembly 16 is assumed to be powered on by the receiver power on/off switch 49, which is typically a hardware function.

At step 196, the receiver controller 106 reads the voltage level of the electrical power 158 provided by the receiver power supply 132.

At step 198, the receiver controller 106 determines whether the voltage level of the electrical power 158 is acceptable to operate the receiver assembly 16. If the determination at step 198 is negative, then the method continues to step 200. Otherwise, if the determination at step 198 is positive, then the method continues to step 202.

At step 200, the receiver controller 106 generates the predetermined electrical alert attention signal 135 to activate the alert device 110 to indicate to the second diver 20 a low voltage condition of the receiver power supply 132. After step 200, the method returns to step 196.

At step 202, the receiver controller 106 determines whether the predetermined wireless signal 36 has been received. If the determination at step 202 is negative, then the method continues to step 216. Otherwise, if the determination at step 202 is positive, then the method continues to step 204.

At step 204, the receiver controller 106 the receiver 128 generates the predetermined electrical alert attention signal 156 responsive to receiving the predetermined wireless signal 36.

At step 206, the receiver controller 106 reads the receiver identity 125 from the receiver memory device 124. Step 206 assumes that the receiver controller 106 has already read and stored the selected the receiver identity 125 from the receiver identity selection device 122.

At step 208, the receiver controller 106 determines whether the receiver identity 125 matches the transmitter identity 77. If the determination at step 208 is negative, then the method continues to step 216. Otherwise, if the determination at step 208 is positive, then the method continues to step 210.

At step 210, the receiver controller 106 reads the dive computer data 160 from the dive computer interface 130.

At step 212, the receiver controller 106 reads the alert selection signal 142 from the alert selection device 118.

At step 214, the receiver controller 106 causes the predetermined alert 161 to be generated.

At step 216, the receiver controller 106 places the receiver assembly 16 into a sleep mode, responsive to method steps 202, 208 and 214, to conserve the electrical power 158 provided by the receiver power supply 132, until the receiver controller 106 is interrupted from the sleep mode in a manner that is well known in the art.

The receiver controller 106 performs other method steps not shown in the flowchart 192 but described herein such as, without limitation, functions associated with the receiver charging circuit 134, selecting the receiver identity 125, and the like. Further, the method steps shown in the flowchart 192 are not limited only to the combination of steps shown and described, but may be rearranged in another combination that remains suitable for operation of the receiver assembly 16.

8. Receiver Assembly Carried by the Mask a. Overview

Figure 8:
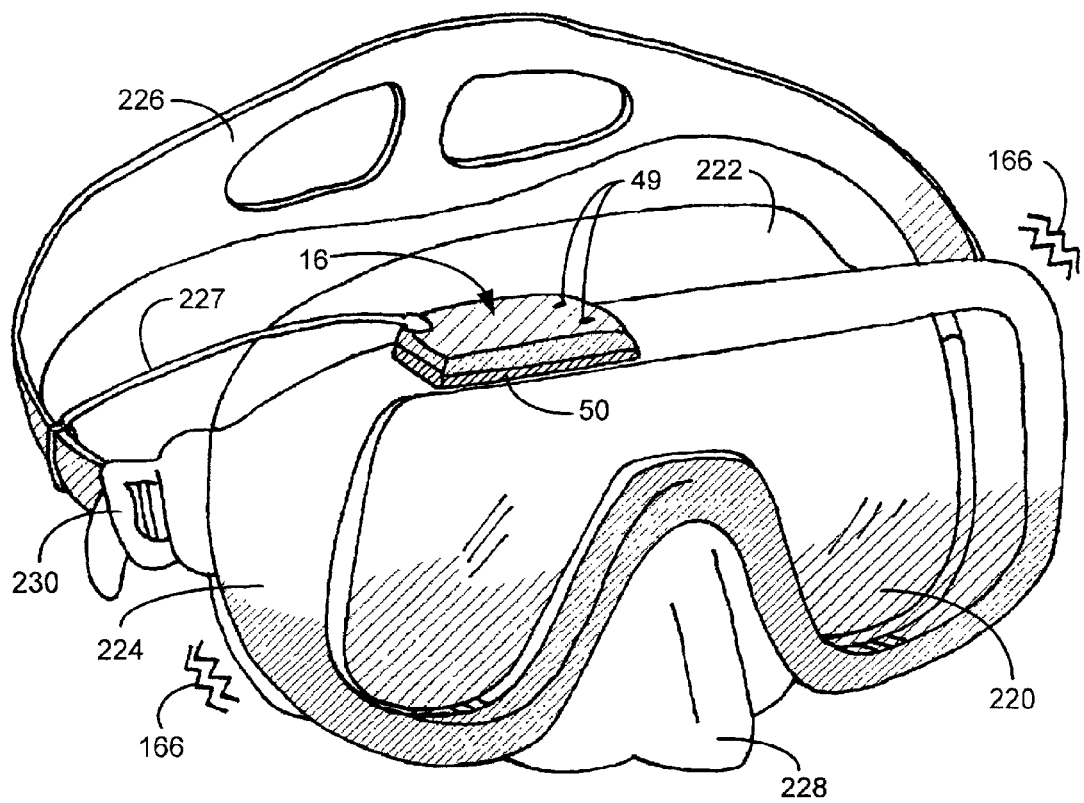
FIG. 8 illustrates a front, left and top side perspective view of the first receiver assembly, shown in FIGS. 1, 3 and 5, attached to a frame of the first mask, in accordance with the first preferred embodiment of the present invention.
Figure 9:
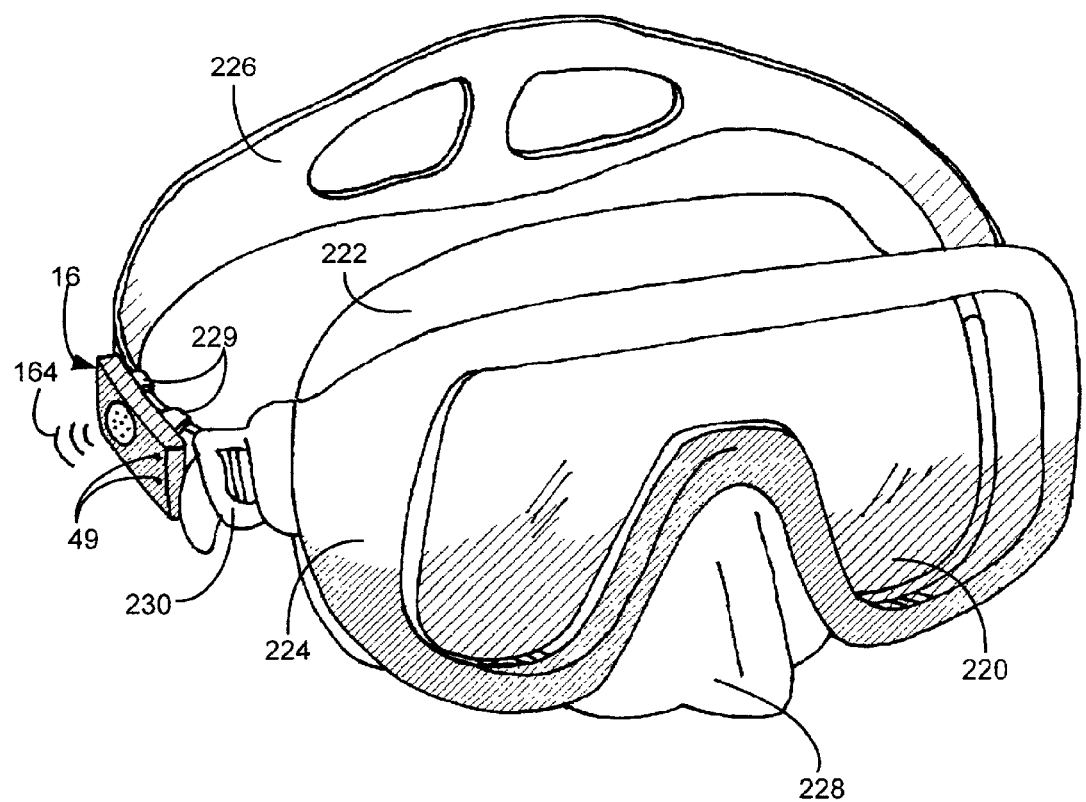
FIG. 9 illustrates a front, top and left side perspective view of the first receiver assembly, shown in FIGS. 1, 3 and 5, attached to a strap of the first mask, in accordance with the first preferred embodiment of the present invention.
Figure 10:
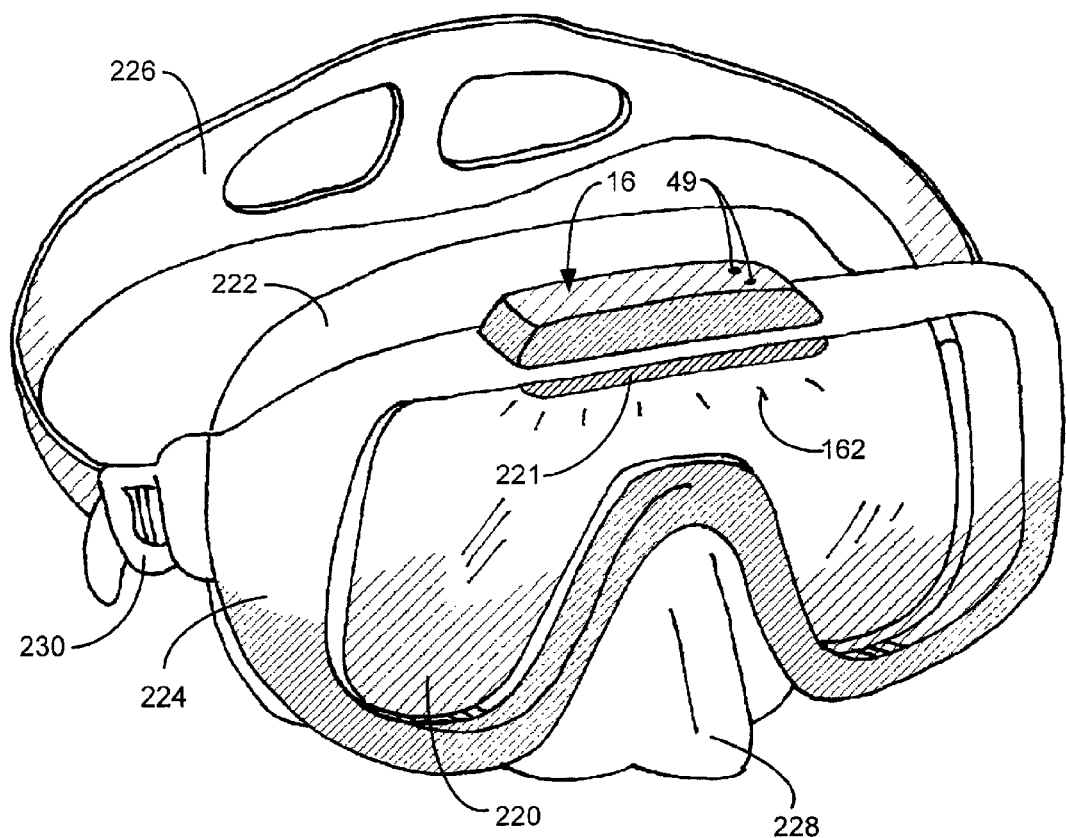
FIG. 10 illustrates a front, top and left side perspective view of the first receiver assembly, shown in FIGS. 1, 3 and 5, integrally formed with the first mask, in accordance with the first preferred embodiment of the present invention.

FIGS. 8, 9 and 10 generally each illustrate a front, left and top side perspective view of the receiver assembly 16, shown in FIGS. 1, 3 and 5, carried by the second diver's mask 18, in accordance with the first preferred embodiment of the present invention. FIG. 8 illustrates the receiver assembly 16 attached to the second diver's mask 18 and activating the tactile alert device 116. FIG. 9 illustrates the receiver assembly 16 attached to the strap of the second diver's mask 18 and activating the audible alert device 114. FIG. 10 illustrates the receiver assembly 16 integrated with the second diver's mask 18 and activating the visual alert device 112. FIGS. 8, 9 and 10 illustrate three implementation examples and do not limit the many ways that the receiver assembly 16 may be carried by the second diver's mask 18 in a manner that permits the alert device 110 of the receiver assembly 16 to discreetly and immediately gain the attention of the second diver 20 when the second diver 20 wears the mask 18.

b. Mask Design

The mask 18 is a diver's window to the underwater environment. Divers must wear masks because of the physical characteristics between air and water. The human eye is designed to function in air. Water, being significantly denser, conducts light differently than air does. This difference in refraction distorts underwater vision. The mask 18 allows a diver to see clearly underwater by maintaining an air space in front of the divers eyes. Numerous styles and shapes of masks are available, and the type selected is a matter of diver preference after other selection factors have been considered. The most important factors in the selection of the mask are fit and comfort.

The mask 18 generally includes a faceplate or lens 220, a skirt 222, a frame 224, a strap 226 and strap buckles or fastenings 230. When equalization is necessary, a nose pocket 228 is incorporated into the skirt 222.

The skirt 222 may be made of silicone or neoprene. Presently, the majority of masks on the market have a skirt 222 made of silicone. Neoprene is a synthetic material derived from natural gum latex. Carbon is generally added to neoprene as both a coloring agent and as a block against ultraviolet (UV) radiation. The carbon is what makes most neoprene black in color when color dyes are not used. Neoprene breaks down with sufficient exposure to UV or ozone. Silicone is not a rubber but a synthetic compound derived from silicone. Silicone is naturally translucent, virtually impervious to damage by ozone or ultraviolet (UV) rays, tends not to deteriorate over time, is hypoallergenic, is soft, and is aesthetically pleasing. Skirts made of silicone are more expensive than skirts made of neoprene, but the advantages of the silicone typically outweigh the differences in price. Preferably, the skirt will gradually thin as it approaches the edge of the skirt. This makes the edge of the skirt more flexible when it comes in contact with the diver's face, thus ensuring a better fit.

Nose or finger pockets are typically integrally formed with the skirt. The nose pocket 228 is a nose-shaped cavity located inside of the mask 18 and extending outside of the mask 18 to receive a diver's nose when the diver wears the mask 18. Finger pockets (not shown) are two cavities located outside of the mask 18 and extending inside of the mask 18, one on each side of the diver's nose position, to receiver a diver's finger or thumb. The finger pockets provide a convenient way for a diver to pinch off their nostrils through the skirt 222 while equalizing pressure in their ears. Typically, a diver pinches off his nostril using his thumb and index finger of one hand or the index fingers of both hands.

The strap 226 secures and positions the mask 18 against the diver's head. Typically, masks have quick release strap buckles or fastenings 230 one or both sides of the mask 18 to permit a diver to quickly change the length of the strap thereby ensuring a proper fit.

The lens 220, typically made of tempered glass, resist scratches and, to a degree, breakage. If broken, however, tempered glass will generally crumble into a number of small, dull pieces that are less dangerous than large, sharp pieces. Diver's with impaired vision may be able to see properly by purchasing masks with lenses that are pre-ground to the diver's approximate prescription, having an optician bond lenses with the diver's precise prescription to the inside of the lens 220, or by simply wearing contact lenses in conjunction with an unaltered mask.

The frame 224 joins the lens 220 and the skirt 222 together and is typically made of a non-corrosive material. Preferably, the skirt 222 is integrally formed with a gasket as a unitary unit that provides a waterproof seal for the lens 220.

A wraparound mask (not shown) has two additional panes of lens disposed on each side of the mask to improve a diver's peripheral vision.

c. Receiver Assembly Attached to the Frame of the Mask

FIG. 8 illustrates a front, left and top side perspective view of the first receiver assembly 16, shown in FIGS. 1, 3 and 5, attached to a first mask 18, in accordance with the first preferred embodiment of the present invention. In FIG. 8, the receiver assembly 16 is attached to the mask 18 as shown and described in FIG. 3.

Generally, the receiver assembly 16 may be attached to the outside or the inside of the mask 18, on the frame 224 or the lens 220. Typically, the receiver assembly 16 is attached to the frame 224, the lens 220 or the strap 226.

The receiver assembly 16 may be further tethered to the mask 18, such as the strap 226, by a lanyard 227 to provide a redundant attachment mechanism in case the receiver assembly 16 separates from the adhesive or the bracket 52. Hence, the lanyard 227 advantageously prevents the receiver assembly 16 from becoming lost.

The receiver assembly 16 in FIG. 8 is implemented with the tactile alert device 116 that vibrates the mask 18, as shown by the vibrating alert 166, responsive to the receiver assembly 16 receiving the predetermined wireless signal 36. The vibrating alert 166 is sufficiently strong enough to be noticeable to the diver but not so strong as to break the air seal of the skirt 222 against the diver's face.

d. Receiver Assembly Attached to the Strap of the Mask

FIG. 9 illustrates a front, top and left side perspective view of the first receiver assembly, shown in FIGS. 1, 3 and 5, attached to a strap of the first mask, in accordance with the first preferred embodiment of the present invention. In FIG. 9, the receiver assembly 16 is attached to the strap 226 of the mask 18 using one or more bands 229. The receiver assembly 16 is attached to the outside of the strap 226 to provide a comfortable fit of the strap 226 against the diver's head. The receiver assembly 16 is positioned on the strap 226 so that the receiver assembly 16 is near the diver's ear.

The receiver assembly 16 in FIG. 9 is implemented with the audible alert device 114 that generates an audible alert 164 that the diver can hear responsive to the receiver assembly 16 receiving the predetermined wireless signal 36. The audible alert 164 is sufficiently strong enough to be noticeable to the diver but not so strong as to disturb other divers or underwater wildlife in the vicinity. The receiver assembly 16 may be positioned so that the audible alert device 114 directs the audible alert 164 towards the diver's ear or away from the diver's ear, as shown in FIG. 9.

e. Receiver Assembly Integrally Formed with the Frame of the Mask

FIG. 10 illustrates a front, top and left side perspective view of the first receiver assembly 16, shown in FIGS. 1, 3 and 5, integrally formed with the frame 224 of the mask 18, in accordance with the first preferred embodiment of the present invention. The receiver assembly 16 is disposed on the center of the top surface of the frame 224 of the mask 18. The frame 224 is formed to extend above the mask 18 to create a cavity of sufficient volume to hold the electrical components and circuitry associated with the receiver assembly 16. By extending the frame 224 above the mask 18, the diver's view through the lens 220 is not obstructed.

The receiver assembly 16 in FIG. 10 is implemented with the visual alert device 112 that generates an visual alert 162, via an optical fiber light guide 221, disposed along a part of the perimeter of the inside of the lens 220, that the diver can see responsive to the receiver assembly 16 receiving the predetermined wireless signal 36. The visual alert 162 is sufficiently strong enough to be noticeable to the diver but not so strong as to disturb other divers or underwater wildlife in the vicinity.

C. Underwater Alert System of the Second Preferred Embodiment

FIG. 11 illustrates a schematic diagram of a transceiver assembly 232, in accordance with a second preferred embodiment of the present invention. The transceiver assembly 232 generally includes a transceiver controller 234, a transceiver power supply 236, a transceiver charging circuit interface 238, a transceiving element 240, a transceiver identity selection device 242, a transceiver memory device 244, a transceiver dive computer interface 246, a transceiver housing 248, a transceiver power on/off switch 250, the alert switch 68, the alert device 110, the transmitter 66, the transmitter amplifier 78, the receiver 128, the receiver amplifier 108, the alert selection device 118. The alert device 110 further includes at least one of the visual alert device 112, the audible alert device 114 and the tactile alert device 116. The transceiver memory device 244 includes a transceiver identity 252.

Generally, the transceiver assembly 232 is a combination of a transmitter assembly 12, as shown in FIG. 4, and a receiver assembly 16, as shown in FIG. 5. Hence, the transceiver assembly 232 has the function of both the transmitter assembly 12 and the receiver assembly 16. The alert switch 68, the transmitter 66 and the transmitter amplifier 78, are the same as shown and described for the transmitter assembly 12 of FIGS. 4 and 6. The receiver 128, the receiver amplifier 108, the alert selection device 118, and the alert device 110 are the same as shown and described for the receiver assembly 16 of FIGS. 5 and 7. The transceiver controller 234, the transceiver power supply 236, the transceiver charging circuit 238, the transceiving element 240, the transceiver identity selection device 242, the transceiver memory device 244, the transceiver dive computer interface 246, the transceiver housing 248, and the transceiver power on/off switch 250 are unique to the transceiver assembly 232 but represent combinations or substitutes of analogous elements in the transmitter assembly 12 of FIGS. 4 and 6 and in the receiver assembly 16 of FIGS. 5 and 7. For example, the transceiver controller 234 represents a combination of the functions of the transmitter controller 64 and the receiver controller 106. The transceiver power supply 236 represents a combination or substitution of the functions of transmitter power supply 82 and the receiver power supply 132. The transceiver charging circuit 238 represents a combination or substitution of the functions of transmitter charging circuit 84 and the receiver charging circuit 134. The transceiving element 240 represents a combination or substitution of the functions of transmitting element 80 and the receiving element 126. The transceiver identity selection device 242 represents a combination or substitution of the functions of transmitter identity selection device 74 and the receiver identity selection device 122. The transceiver memory device 244 represents a combination of the functions of transmitter memory device 76 and the receiver memory device 124. The transceiver dive computer interface 246 represents a combination of the functions of transmitter dive computer interface 72 and the receiver dive computer interface 130. The transceiver housing 248 represents a combination of the functions of transmitter housing 38 and the receiver housing 48. The transceiver power on/off switch 250 represents a combination or substitution of the functions of transmitter power on/off switch 33 and the receiver power on/off switch 49.

The transceiver assembly 232 advantageously permits a diver to both send and receive the predetermined wireless communication signal 36. In operation, the transceiver assembly 232 provides two-way communications, as distinguished from the separate combination of the transmitter assembly 12 and receiver assembly 16 that provides one-way communication. In application, the first diver 14 carries a first transceiver assembly 232, preferably on the first diver's mask, and the second diver 20 carries a second transceiver assembly (not shown), preferably on the second diver's mask, to permit both divers to both send and receive alert signals. Of course, two divers may effectively obtain two-way communications using the separate combination of the transmitter assembly 12 and receiver assembly 16 when two sets of the combination are used. In this example, the first diver 14 carries both the first transmitter assembly 12 and a second receiver assembly (not shown), and the second diver carries both a second transmitter assembly (not shown) and the first receiver assembly 16. The first transmitter assembly 12 and the second transmitter assembly are preferably carried on the first diver's wrist and the second diver's wrist, respectively. The first receiver assembly 16 and the second receiver assembly are preferably carried on the second diver's mask 18 and the first diver's mask, respectively.

FIG. 12 illustrates a front, top and left side perspective view of the transceiver assembly 232, as shown in FIG. 11, attached to a frame 224 of a mask 18, in accordance with the second preferred embodiment of the present invention. Although the transceiver assembly 232 is preferably attached to the top side of the frame 224 using the carrier 50 with adhesive, as shown and described with reference to FIG. 3, any attachment mechanism and any location on the mask, as shown or described herein may alternatively be used.

The pushbutton 68 has a location and size that permits the diver to easily find and press the pushbutton 68 with his finger or palm while wearing the mask 18. Preferably, the pushbutton 68 is located on the left side of the transceiver assembly 232, but may alternatively be located on the top side or front side of the transceiver assembly 232.

An overhang or plenum 233 is attached to the transceiver housing 248 of the transceiver assembly 232. The overhang 233 extends away from the front side of the mask 18 and then down along the front side of the mask 18 so that a portion of the overhand 233 is positioned in front of the lens 220 of the mask 18. The visual alert device 112, such as an LED, is positioned at a distal end of the overhang 233 in such a manner that a diver can view the visual alert device 112 through the lens 220 of the mask 18 when the diver is wearing the mask 18. Hence, FIG. 12 provides an example of the visual alert device 112 being used as the alert device 110 on the mask 18.

Alternatively, the transceiver assembly 232 may be integrally formed with the mask 18 as a single unitary unit in an analogous manner as shown and described with reference to FIG. 10.

D. Underwater Alert System of the Third Preferred Embodiment

FIG. 13 illustrates a schematic diagram of an dive computer system 251 including the first transceiver assembly 232, electrically coupled to a first dive computer 252 carried by the first diver 14, and a second transceiver assembly 254, electrically coupled to a second dive computer 256 carried by the second diver 20, in accordance with a third preferred embodiment of the present invention. The dive computer system 251 in FIG. 13 generally includes the first transceiver assembly 232, a first receiver 258, the first dive computer 252, a first display 253, a first housing 260, a second transceiver assembly 254, a second receiver 262, the second dive computer 256, a second display 255, and a second housing 264. The first diver 14 carries the first transceiver assembly 232, the first receiver 258, the first dive computer 252, the first display 253, and the first housing 260. The second diver 20 carries the second transceiver assembly 254, the second receiver 262, the second dive computer 256, the second display 255, and the second housing 264.

The first transceiver assembly 232 is electrically coupled to the first dive computer 252 to permit dive computer data, associated with the first diver 14, to be transmitted by the first transceiver assembly 232 as the predetermined wireless signal 36 to the second diver 20, and to permit dive computer data, associated with the second diver 20, to be received by the first transceiver assembly 232 as the predetermined wireless signal 36 from the second diver 20.

The first display 253 and the second display each display dive computer data associated with the first diver 14 and the second diver 20. In FIG. 13, the dive computer data for the first diver matches on each of the first display 253 and the second display 255, and the dive computer data for the second diver matches on each of the first display 253 and the second display 255. Hence, a point of reference for the dive computer data is from the point of view of one diver. Alternatively, the point of reference for the dive computer data may be from the point of view of each diver. In this alternative case, the dive computer data for the first diver on the first display 253 matches the dive computer data for the second diver on the second display 255, and the dive computer data for the second diver on the first display 253 matches the dive computer data for the first diver on the second display 255.

Each one of the first display 253 and the second display 255 may operate in a variety of ways depending on various engineering factors including, without limitation, the size of the display, the data to be displayed, etc. For example, the display may be large enough to display all of the dive computer data associated with both the first diver 14 and the second diver 20, as shown in FIG. 13. Alternatively, the display may be configured to display the dive computer data of only one diver at a time. Further, alternatively, the display may be configured to display portions of the dive computer data at a time. Various types, sizes, control, etc. of displays are well known in the art. The first display 253 may be a separate device or may be integrated with either the dive computer 252 or the first transceiver assembly 232.

Hence, the first display 253 displays dive computer data related not only to the first diver 14, but also related to the second diver 20. The mutual sharing of dive computer data between buddy divers increases the safety and the enjoyment of the dive because the divers can electronically monitor various dive conditions related to the other diver. Therefore, the divers no longer need to rely on conventional communication techniques such as hand signals, or even alerts or under water voice communications to relay dive computer related information between each other. Further, with each diver monitoring the status of the other diver's dive computer data, one diver may become aware of a critical situation, such as a low air supply level for the other diver, which the other diver does not realize.

The dive computer data that is shared between divers may be related to the diver, the diver's equipment and the diver's environment. The dive computer data includes, without limitation, dive table time limits, dive time duration, depth limits, air supply limits, direction, distance, water temperature, assent rates, heart rate, breathing rate, and the like. Alternatively, an alarm, similar to the alert device 110, carried with the dive computer, the transceiver, or the display may be activated if the dive computer data is an undesirable, predetermined value, such as being outside a predetermined range of permitted dive computer data.

The first transceiver 232 and the second transceiver 254 communicate over a long-range wireless communication link. The link has a long range in that is long enough to relay a signal between a transmitter and a receiver, both being located on different divers separated by a distance. Hence, the long-range wireless communication link may be described as being not personal to one diver, but as being personal between two divers. The long-range wireless communication link preferably has a range of 50 to 100 meters, but may be any distance.

The first receiver 258 receives a signal 270 from a first transmitter (shown in FIG. 14), worn on another part of the first diver 14, and relays data carried by the signal 270 to the first dive computer 252. The transmitter is preferably coupled to the first diver's air tank and transmits a signal representative of the air supply level in the air tank. The first receiver 258 and the first transmitter communicate over a short-range wireless communication link. The link has a short range in that is long enough to relay a signal between a transmitter and a receiver, both being located on the same diver. Hence, the short-range wireless communication link may be described as being personal to the diver. The short-range wireless communication link preferably has a range of 3 meters, but may be any distance.

The first transceiver 232, the first dive computer 252, the first display 253 and the first receiver 258 may be separate modules carried by separate housings and electrically coupled to each other, or may be integrated as a single unit carried within a single housing. Any combination of modules or integration may be implemented among the elements depending on various engineering and business factors. Further, when the modules are separate, they may be carried on different parts of the diver or the diver's equipment. For example, the first dive computer 252, the first transceiver 232, and the first receiver 258 may be carried on the first diver's wrist, but the first display 253 may be carried on the first diver's mask.

The second transceiver 234, the second dive computer 256, the second display 255 and the second receiver 262 are constructed and operate in an analogous manner as shown and described with reference to the first transceiver 232, the first dive computer 252, the first display 253 and the first receiver 258. In other words, the first group of elements is a duplicate of the second group of elements, and together they comprise the dive computer system 251 of the third preferred embodiment of the present invention.

FIG. 14 illustrates the dive computer system 251, shown in FIG. 13, carried by the first diver 14 and the second diver 20, in accordance with the third preferred embodiment of the present invention. The first transceiver 232, the first dive computer 252, the first display 253 and the first receiver 258 are carried in the first housing 260 on the first diver's wrist or forearm. The second transceiver 254, the second dive computer 256, the second display 255 and the second receiver 262 are carried in the second housing 264 on the second 274. A low pressure hose, carried by the second diver's air tank, carries the second transmitter 276.

E. Users of the Underwater Alert System

The underwater alert system 10 of the first, second and third preferred embodiments of the present invention, as shown and described herein, are preferably used by scuba divers, as explained herein above. The underwater alert system 10 of the first and second preferred embodiments of the present invention, as shown and described herein, may also be used by skin divers and swimmers. Although skin divers and swimmers typically do not have a need for using the third preferred embodiment of the present invention because they typically do not carry or use dive computers, they may also use the third preferred embodiment of the present invention, if desired.

Skin divers, otherwise known as snorkel divers, typically use a mask, fins and a snorkel as they float on the surface of the water, such as in a pool, lake or ocean, or make shallow dives in the water, without using a compressed air supply. Skin divers preferably carry the receiver assembly 16 or the transceiver assembly 232 on the skin diver's mask.

Swimmers sometimes use a mask, otherwise called goggles, while swimming in water, such as in a pool, lake or ocean, to keep the water away from their eyes. Swimmers preferably carry the receiver assembly 16 or the transceiver assembly 232 on the swimmer's goggles.

F. Applications of the Underwater Alert System

The underwater alert system 10 of the first, second and third preferred embodiments of the present invention, as shown and described herein, are preferably used in water-based applications, such as scuba diving, snorkeling and swimming. Water-based applications include, without limitation, applications such as sport, training, commercial, military, scientific, search and recovery, professional underwater photography, and movie making.

However, the first, second and third preferred embodiments of the present invention, as shown and described herein, may also be applied in an analogous manner to applications above water, such as on land. In this case, other types of eyewear, rather than the underwater mask, carry the receiver assembly 16 or the transceiver assembly 232. The other types of eyewear include, without limitation, sun glasses, prescription eye glasses, safety glasses, goggles, and the like. Applications on land include, without limitation, recreational activities such as motorcycling, bicycling, hiking, hunting, running, skiing, canoeing, kayaking, climbing, fishing and walking.

G. Commercial Sales of the Underwater Alert System

The underwater alert system 10 of the first, second and third preferred embodiments of the present invention, as shown and described herein, may be sold commercially in a variety of ways depending on factors related to engineering, business and customer preference. Several examples, without limitation, of how the underwater alert system 10 may be sold are described as follows.

In the first preferred embodiment of the present invention, the transmitter assembly 12 and the receiver assembly 16 are sold as a set in a single package, along with an appropriate attachment mechanism. If two divers desire two-way communication, then two sets are purchased. However, the transmitter assembly 12 and the receiver assembly 16 may also be sold separately, as well, to accommodate customer applications, such as the one transmitter assembly 12 to multiple receiver assemblies or the multiple transmitter assemblies to the one receiver assembly 16, as described herein. Further, the attachment mechanism may also be sold separately, as well, or just with the associate receiver assembly in the same package.

In the second preferred embodiment of the present invention, the first transceiver 232 and the second transceiver 254 are preferably sold as a set in a single package, along with appropriate corresponding attachment mechanisms. Alternatively, the transceivers may be sold separately to accommodate various customer applications.

In both the first and the second preferred embodiments of the present invention, the receiver assembly 16 or the transceiver assembly 232 may be integrally formed with the mask, as shown and described herein. In this case, a mask integrally formed with the receiver assembly 16 or the first transceiver assembly 232 may be sold either separately or in combination with the transmitter assembly 12 or the second transceiver assembly 254, respectively, in a single package.

In the third preferred embodiment of the present invention, the first transceiver 232 is integrated with the first dive computer 252, the first display device 253 and the first receiver 258 in a single housing 260. Alternatively, the first dive computer 252 and the first display device 253 may be integrated into a single housing and a second housing may carry the first transceiver 232, with or without the first receiver 258.

Further, a design of various components, systems or assemblies described herein may be duplicated among the various embodiments to achieve design and manufacturing economies of scale. For example, a transceiver designed for the second preferred embodiment of the present invention may also be used for the third preferred embodiment of the present invention. A single manufacturer having lines of diving equipment, including masks and dive computers, may achieve this economy of scale alone. Alternatively, different manufacturers having different lines of diving equipment, including one manufacturer making masks and another manufacturer making dive computers, may achieve this economy of scale together.

H. Electronic Integration of the Underwater Alert System

In the first, second and third preferred embodiments of the present invention, as shown and described herein, the various electrical elements may be made from discrete electrical components, in an integrated circuit or any combination thereof depending on such engineering design considerations such as cost, complexity, performance, reliability, size, weight, etc., as are well known in the art.

I. Summary of the Detailed Description of the Preferred Embodiments

In the first preferred embodiment, the underwater alert system 10 comprises the transmitter assembly 12, the receiver assembly 16, and the mask 18. The transmitter assembly 12, carried by the first diver 14, has the waterproof transmitter housing 38 for carrying the alert switch 68, the transmitter 66, and the transmitting element 80. The alert switch 68 generates the electrical alert actuation signal 86 responsive to the alert switch 68 being actuated, either manually by the first diver 14 or automatically by the first diver's equipment. The transmitter 66 generates the predetermined electrical transmit signal 98 responsive to receiving the electrical alert actuation signal 86. The transmitting element 80 generates the predetermined wireless signal 36 responsive to receiving the predetermined electrical transmit signal 98. The receiver assembly 16, carried by the second diver 20, has the waterproof receiver housing 48 for carrying the receiving element 126, the receiver 108, and the alert device 110. The receiving element 126 generates the electrical receive signal 152 responsive to receiving the predetermined wireless signal 36. The receiver 108 generates the predetermined electrical alert attention signal 154 responsive to receiving the electrical receive signal 152. The alert device 110, such as the visual 112, the audible 114 or the tactile 116 alert device, generates the predetermined alert 161, such as light 162, sound 164 or vibration 166, respectively, responsive to receiving the predetermined electrical alert attention signal 154. The mask 18 carries the first receiver assembly 16, either separate from or integral with the first mask 18, in the way that permits the predetermined alert 161 to gain the attention of the second diver 20 when the mask 18 is worn on the second diver's head. Preferably, the transmitter assembly 12 and the receiver assembly 16 share the common electrical identity 77, 125, such as the frequency channel, the address or the code, to provide discreet communications between divers.

In the second preferred embodiment, the underwater alert system 10 includes the first transceiver assembly 232, carried by, integrally to or attached to, the first diver's mask, and the second transceiver assembly 254, carried by, integrally to or attached to, the second diver's mask.

In the third preferred embodiment, the underwater alert system 10 includes, the transmitter assembly 12 or the first transceiver assembly 232 electrically coupled to the first diver's dive computer 252 to permit dive computer data, associated with the first diver 14, or the alarm associated with the dive computer data to be transmitted to and received by the receiver assembly 16 or the second transceiver assembly 254, respectively, carried by the second diver 20.

J. Expanded Embodiments of the Underwater Alert System

Hence, while the present invention has been described with reference to various illustrative embodiments thereof, the present invention is not intended that the invention be limited to these specific embodiments. Those skilled in the art will recognize that variations; modifications and combinations of the disclosed subject matter can be made without departing from the spirit and scope of the invention as set forth in the appended claims.

What is claimed is:

1. An underwater alert system comprising:
    a first transmitter assembly, adapted to be carried by a first diver, including:
        at least a first alert switch adapted to generate at least a first electrical alert actuation signal responsive to the at least the first alert switch being actuated;
        a first transmitter electrically coupled to the at least the first alert switch and adapted to generate at least a first predetermined electrical transmit signal responsive to receiving the at least the first electrical alert actuation signal, respectively;
        a first transmitting element electrically coupled to the first transmitter and adapted to generate at least a first predetermined wireless signal responsive to receiving the at least the first predetermined electrical transmit signal, respectively; and
        a first waterproof transmitter housing adapted to carry at least one of the at least the first alert switch, the first transmitter and the first transmitting element; and a first receiver assembly, adapted to be carried by a second diver having a first mask adapted to be worn on the second diver's head, including:
- a first receiving element adapted to generate at least a first electrical receive signal responsive to receiving the at least the first predetermined wireless signal, respectively;
- a first receiver electrically coupled to the first receiving element and adapted to generate at least a first predetermined electrical alert attention signal responsive to receiving the at least the first electrical receive signal, respectively;
- at least a first alert device electrically coupled to the first receiver and adapted to generate at least a first predetermined alert responsive to receiving the at least the first predetermined electrical alert attention signal; and
- a first waterproof receiver housing adapted to carry at least one of the first receiving element, the first receiver and the at least the first alert device;
- wherein the first mask is adapted to carry at least the at least the first alert device of the first receiver assembly in a way that permits the at least the first predetermined alert to gain the attention of the second diver when the first mask is worn on the second diver's head.

2. The underwater alert system according to claim 1, wherein the at least the first alert switch further comprises:
at least a first pushbutton switch adapted to generate the at least the first electrical alert actuation signal responsive to the at least the first pushbutton switch being manually actuated by the first diver.

3. The underwater alert system according to claim 1, wherein the first transmitter assembly further comprises:
a light source carried by the first transmitter housing and adapted to illuminate at least a portion of the pushbutton.

4. The underwater alert system according to claim 1, wherein the at least the first alert device further comprises:
a visual alert device adapted to generate a predetermined visual alert, as the at least the first predetermined alert, that the second diver can see when wearing the first mask.

5. The underwater alert system according to claim 4, wherein the visual alert device further comprises:
a first light source adapted to generate a predetermined visible light signal, as the predetermined visual alert.

6. The underwater alert system according to claim 1, wherein the at least the first alert device further comprises:
an audible alert device adapted to generate a predetermined audible alert, as the at least the first predetermined alert, that the second diver can hear when wearing the first mask.

7. The underwater alert system according to claim 6, wherein the audible alert device further comprises:
an electro-acoustic transducer adapted to generate a predetermined audible acoustic signal, as the predetermined audible alert.

8. The underwater alert system according to claim 1, wherein the at least the first alert device further comprises:
a tactile alert device adapted to generate a predetermined tactile alert, as the at least the first predetermined alert, that the second diver can feel when wearing the first mask.

9. The underwater alert system according to claim 8, wherein the tactile alert device further comprises:
a vibrator adapted to generate a predetermined vibration signal, as the predetermined tactile alert.

10. The underwater alert system according to claim 1 further comprising:
a second transmitter assembly adapted to be carried by the second diver and including:
- at least a second alert switch adapted to generate at least a second electrical alert actuation signal responsive to the at least the second alert switch being actuated;
- a second transmitter electrically coupled to the at least the second alert switch and adapted to generate at least a second predetermined electrical transmit signal responsive to receiving the at least the second electrical alert actuation signal, respectively;
- a second transmitting element electrically coupled to the second transmitter and adapted to generate at least a second predetermined wireless signal responsive to receiving the at least the second predetermined electrical transmit signal, respectively; and
- a second waterproof transmitter housing adapted to carry at least one of the at least the second alert switch, the second transmitter and the second transmitting element; and a second receiver assembly, adapted to be carried by the first diver having a second mask adapted to be worn on the first diver's head, including:
- a second receiving element adapted to generate at least a second electrical receive signal responsive to receiving the at least the second predetermined wireless signal, respectively;
- a second receiver electrically coupled to the second receiving element and adapted to generate at least a second predetermined electrical alert attention signal responsive to receiving the at least the second electrical receive signal, respectively;
- at least a second alert device electrically coupled to the second receiver and adapted to generate at least a second predetermined alert responsive to receiving the at least the second predetermined electrical alert attention signal; and
- a second waterproof receiver housing adapted to carry at least one of the second receiving element, the second receiver and the at least the second alert device; and
- wherein the second mask is adapted to carry at least the at least the second alert device of the second receiver assembly in a way that permits the at least the second predetermined alert to gain the attention of the first diver when the second mask is worn on the first diver's head.

11. The underwater alert system according to claim 10, wherein the first waterproof transmitter housing and the second waterproof receiver housing are integrally formed together to provide a first transceiver housing adapted to be carried by the second mask, and
wherein the second waterproof transmitter housing and the first waterproof receiver housing are integrally formed together to provide a second transceiver housing adapted to be carried by the first mask.

12. The underwater alert system according to claim 11, wherein the first transceiver housing is integrally formed with the second mask, and
wherein the second transceiver housing is integrally formed with the first mask.

13. The underwater alert system according to claim 1 further comprising:
a first attachment mechanism adapted to permit the first waterproof receiver housing to be mechanically coupled to the first mask.

14. The underwater alert system according to claim 13, wherein the first attachment mechanism further comprises:
a first bracket adapted to be carried by the first mask and having a first mounting interface adapted to mechanically engage and disengage a first mounting interface on the first waterproof receiver housing to permit the first waterproof receiver housing to be attached to and removed from, respectively, the first bracket.

15. The underwater alert system according to claim 14, wherein the first bracket further comprises:
a second mounting interface having an adhesive disposed thereon to permit the second mounting interface of the first bracket to be mechanically coupled to the first mask.

16. The underwater alert system according to claim 14, wherein the first bracket is integrally formed with the first mask.

17. The underwater alert system according to claim 13, wherein the at least the first alert device generates the first predetermined alert when the first waterproof receiver housing is mechanically coupled to the first mask, and wherein the at least the first alert device generates a second predetermined alert when the first waterproof receiver housing is mechanically decoupled from the first mask.

18. The underwater alert system according to claim 1, wherein the first waterproof receiver housing is integrally formed with the first mask.

19. The underwater alert system according to claim 1,
wherein the first transmitter assembly further comprises a first transmitter identity selection device adapted to provide the first transmitter with at least a first transmitter identity, and
wherein the first receiver assembly further comprises a first receiver identity selection device adapted to provide the first receiver with the at least the first transmitter identity to permit the first receiver to communicate with the first transmitter.

20. The underwater alert system according to claim 1,
wherein the first transmitter assembly further comprises:
a first power supply adapted to provide a first supply of electrical power; and
a first power switch adapted to electrically couple the first supply of electrical power to at least one of the at least the first alert switch, the first transmitter and the first transmitting element responsive to the first power switch being actuated; and
wherein the first receiver assembly further comprises:
a second power supply adapted to provide a second supply of electrical power; and
a second power switch adapted to electrically couple the second supply of electrical power to at least one of the first receiving element, the first receiver and the at least the first alert device responsive to the second power switch being actuated.

21. The underwater alert system according to claim 20, wherein at least one of the first power switch and the second power switch further comprises:
a water-activated switch adapted to be actuated responsive to the water-activated switch being located underwater.

22. The underwater alert system according to claim 1, further comprising:
a dive computer adapted to generate dive computer data, electrically coupled to the first transmitter, and adapted to be carried by the first diver,
wherein the at least the first alert switch further comprises:
an electronic switch electrically coupled to the dive computer and adapted to generate the at least the first electrical alert actuation signal responsive to the dive computer data being an undesirable, predetermined value.

23. The underwater alert system according to claim 1 further comprising:
a dive computer adapted to generate dive computer data, electrically coupled to the first transmitter, and adapted to be carried by the first diver,
wherein the first transmitter is adapted to transmit dive computer data, associated with the dive computer, to the first receiver.

24. The underwater alert system according to claim 1, wherein the first transmitter assembly further comprises:
a transmitter alert device adapted to generate at least a second predetermined alert responsive to a function of the first transmitter assembly.

25. The underwater alert system according to claim 24, wherein the function of the first transmitter assembly further comprises at least one of:
a low voltage warning, a verification of operation, a confirmation of transmitter identity selection, a confirmation of activation of the first alert switch, a confirmation of activation of the power on/off switch, and a condition of the charging circuit.

26. The underwater alert system according to claim 24, wherein the transmitter alert device further comprises at least one of:
a visual alert device adapted to generate a predetermined visual alert, as the at least the second predetermined alert, that the first diver can see when wearing the first transmitter assembly;
an audible alert device adapted to generate a predetermined audible alert, as the at least the second predetermined alert, that the first diver can hear when wearing the first transmitter assembly; and
a tactile alert device adapted to generate a predetermined tactile alert, as the at least the second predetermined alert, that the first diver can feel when wearing the first transmitter assembly.

27. The underwater alert system according to claim 1, wherein the at least the first alert switch is automatically actuated responsive to information related to at least one of the first diver's body, equipment and environment.

28. The underwater alert system according to claim 1, wherein the at least the first alert device generates the first predetermined alert when the first waterproof receiver housing is above water, and wherein the at least the first alert device generates a second predetermined alert when the first waterproof receiver housing is underwater.

29. An underwater alert system comprising:
a first transmitter assembly, adapted to be carried by a first diver, including:
at least a first alert switch adapted to generate at least a first electrical alert actuation signal responsive to the at least the first alert switch being actuated, wherein the at least the first alert switch further comprises:
at least a first pushbutton switch adapted to generate the at least the first electrical alert actuation signal responsive to the at least the first pushbutton switch being manually actuated by the first diver;
a first transmitter electrically coupled to the at least the first alert switch and adapted to generate at least a first predetermined electrical transmit signal responsive to receiving the at least the first electrical alert actuation signal, respectively;

a first transmitting element electrically coupled to the first transmitter and adapted to generate at least a first predetermined wireless signal responsive to receiving the at least the first predetermined electrical transmit signal, respectively;

a first power supply adapted to provide a first supply of electrical power;

a first power switch adapted to electrically couple the first supply of electrical power to at least one of the at least the first alert switch, the first transmitter and the first transmitting element responsive to the first power switch being actuated; and a first waterproof transmitter housing adapted to carry at least one of the at least the first alert switch, the first transmitter, the first transmitting element, the first power supply and the first power switch; and a first receiver assembly, adapted to be carried by a second diver having a first mask adapted to be worn on the second diver's head, including:

a first receiving element adapted to generate at least a first electrical receive signal responsive to receiving the at least the first predetermined wireless signal, respectively;

a first receiver electrically coupled to the first receiving element and adapted to generate at least a first predetermined electrical alert attention signal responsive to receiving the at least the first electrical receive signal, respectively;

at least a first alert device electrically coupled to the first receiver and adapted to generate at least a first predetermined alert responsive to receiving the at least the first predetermined electrical alert attention signal, wherein the at least the first alert device further comprises:

a first visual alert device adapted to generate a first predetermined visual alert, as the at least the first predetermined alert, that the second diver can see when wearing the first mask, wherein the first visual alert device further comprises:

a first light source adapted to generate a first predetermined visible light signal, as the first predetermined visual alert;

a second power supply adapted to provide a second supply of electrical power;

a second power switch adapted to electrically couple the second supply of electrical power to at least one of the first receiving element, the first receiver and the at least the first alert device responsive to the second power switch being actuated; and a first waterproof receiver housing adapted to carry at least one of the first receiving element, the first receiver, the at least the first alert device, the second power supply and the second power switch;

wherein the first mask is adapted to carry at least the at least the first alert device of the first receiver assembly in a way that permits the at least the first predetermined alert to gain the attention of the second diver when the first mask is worn on the second diver's head; and a first attachment mechanism adapted to permit the first waterproof receiver housing to be mechanically coupled to the first mask.

30. The underwater alert system according to claim 29 further comprising:

a second transmitter assembly, adapted to be carried by the second diver, including:

at least a second alert switch adapted to generate at least a second electrical alert actuation signal responsive to the at least the second alert switch being actuated, wherein the at least the second alert switch further comprises:

at least a second pushbutton switch adapted to generate the at least the second electrical alert actuation signal responsive to the at least the second pushbutton switch being manually actuated by the second diver;

a second transmitter electrically coupled to the at least the second alert switch and adapted to generate at least a second predetermined electrical transmit signal responsive to receiving the at least the second electrical alert actuation signal, respectively;

a second transmitting element electrically coupled to the second transmitter and adapted to generate at least a second predetermined wireless signal responsive to receiving the at least the second predetermined electrical transmit signal, respectively;

a third power supply adapted to provide a third supply of electrical power;

a third power switch adapted to electrically couple the second supply of electrical power to at least one of the at least the second alert switch, the second transmitter and the second transmitting element responsive to the third power switch being actuated; and a second waterproof transmitter housing adapted to carry at least one of the at least the second alert switch, the second transmitter, the second transmitting element, the third power supply and the third power switch;

a second receiver assembly, adapted to be carried by the first diver having a second mask adapted to be worn on the first diver's head, including:

a second receiving element adapted to generate at least a second electrical receive signal responsive to receiving the at least the second predetermined wireless signal, respectively;

a second receiver electrically coupled to the second receiving element and adapted to generate at least a second predetermined electrical alert attention signal responsive to receiving the at least the second electrical receive signal, respectively;

at least a second alert device electrically coupled to the second receiver and adapted to generate at least a second predetermined alert responsive to receiving the at least the second predetermined electrical alert attention signal, wherein the at least the second alert device further comprises:

a second visual alert device adapted to generate a predetermined visual alert, as the at least the second predetermined alert, that the first diver can see when wearing the second mask, wherein the second visual alert device further comprises:

a second light source adapted to generate a second predetermined visible light signal, as the second predetermined visual alert;

a fourth power supply adapted to provide a fourth supply of electrical power;

a fourth power switch adapted to electrically couple the fourth supply of electrical power to at least one of the second receiving element, the second receiver and the at least the second alert device responsive to the fourth power switch being actuated; and a second waterproof receiver housing adapted to carry at least one of the second receiving element, the second receiver, the at least the second alert device, the fourth power supply and the fourth power switch;

wherein the second mask is adapted to carry at least the at least the second alert device of the second receiver assembly in a way that permits the at least the second predetermined alert to gain the attention of the first diver when the second mask is worn on the first diver's head; and a second attachment mechanism adapted to permit the second waterproof receiver housing to be mechanically coupled to the second mask.

31. The underwater alert system according to claim 30, wherein the first waterproof transmitter housing and the second waterproof receiver housing are integrally formed together to provide a first transceiver housing adapted to be carried by the second mask, wherein the first power supply and the fourth power supply are integrally formed together to provide a first transceiver power supply adapted to be carried by the first transceiver housing;

wherein the first power switch and the fourth power switch are integrally formed together to provide a first transceiver power switch adapted to be carried by the first transceiver housing;

wherein the second waterproof transmitter housing and the first waterproof receiver housing are integrally formed together to provide a second transceiver housing adapted to be carried by the first mask;

wherein the second power supply and the third power supply are integrally formed together to provide a second transceiver power supply adapted to be carried by the second transceiver housing; and wherein the second power switch and the third power switch are integrally formed together to provide a second transceiver power switch adapted to be carried by the second transceiver housing.

32. The underwater alert system according to claim 31, wherein the first transceiver housing is integrally formed with the second mask, and wherein the second transceiver housing is integrally formed with the first mask.

33. The underwater alert system according to claim 29, wherein the first attachment mechanism further comprises:

a first bracket adapted to be carried by the first mask and having a first mounting interface adapted to mechanically engage and disengage a first mounting interface on the first waterproof receiver housing to permit the first waterproof receiver housing to be attached to and removed from, respectively, the first bracket.

34. The underwater alert system according to claim 33, wherein the first bracket further comprises:

a second mounting interface having an adhesive disposed thereon to permit the second mounting interface of the first bracket to be mechanically coupled to the first mask.

35. The underwater alert system according to claim 33, wherein the first bracket is integrally formed with the first mask.

36. The underwater alert system according to claim 29, wherein the first light source generates the first predetermined visible light signal when the first waterproof receiver housing is mechanically coupled to the first mask, and wherein a second alert device generates a second predetermined alert when the first waterproof receiver housing is mechanically decoupled from the first mask.

37. The underwater alert system according to claim 29:

wherein the first transmitter assembly further comprises a first transmitter identity selection device adapted to provide the first transmitter with at least a first transmitter identity, and wherein the first receiver assembly further comprises a first receiver identity selection device adapted to provide the first receiver with the at least the first transmitter identity to permit the first receiver to communicate with the first transmitter.

38. The underwater alert system according to claim 29, wherein at least one of the first power switch and the second power switch further comprises:

a water-activated switch adapted to be actuated responsive to the water-activated switch being located underwater.

39. The underwater alert system according to claim 29, further comprising:

a dive computer adapted to generate dive computer data, electrically coupled to the first transmitter, and adapted to be carried by the first diver, wherein the at least the first alert switch further comprises:

an electronic switch electrically coupled to the dive computer and adapted to generate the at least the first electrical alert actuation signal responsive to the dive computer data being an undesirable, predetermined value.

40. The underwater alert system according to claim 29, further comprising:

a dive computer adapted to generate dive computer data, electrically coupled to the first transmitter, and adapted to be carried by the first diver, wherein the first transmitter is adapted to transmit dive computer data, associated with the dive computer, to the first receiver.

41. The underwater alert system according to claim 29, wherein the first transmitter assembly further comprises:

a light source carried by the first transmitter housing and adapted to illuminate at least a portion of the pushbutton.

42. The underwater alert system according to claim 29, wherein the first transmitter assembly further comprises:

a transmitter alert device adapted to generate at least a second predetermined alert responsive to a function of the first transmitter assembly.

43. The underwater alert system according to claim 42, wherein the function of the first transmitter assembly further comprises at least one of:

a low voltage warning, a verification of operation, a confirmation of transmitter identity selection, a confirmation of activation of the first alert switch, a confirmation of activation of the power on/off switch, and a condition of the charging circuit.

44. The underwater alert system according to claim 42, wherein the transmitter alert device further comprises at least one of:

a visual alert device adapted to generate a predetermined visual alert, as the at least the second predetermined alert, that the first diver can see when wearing the first transmitter assembly;

an audible alert device adapted to generate a predetermined audible alert, as the at least the second predetermined alert, that the first diver can hear when wearing the first transmitter assembly; and a tactile alert device adapted to generate a predetermined tactile alert, as the at least the second predetermined alert, that the first diver can feel when wearing the first transmitter assembly.

45. The underwater alert system according to claim 29, wherein the at least the first alert switch is automatically actuated responsive to information related to at least one of the first diver's body, equipment and environment.

46. The underwater alert system according to claim 29, wherein the at least the first alert device generates the first predetermined alert when the first waterproof receiver housing is above water, and wherein the at least the first alert device generates a second predetermined alert when the first waterproof receiver housing is underwater.

47. An underwater alert system comprising:

a first transmitter assembly, adapted to be carried by a first diver, including:
  at least a first alert switch adapted to generate at least a first electrical alert actuation signal responsive to the at least the first alert switch being actuated;
  a first transmitter electrically coupled to the at least the first alert switch and adapted to generate at least a first predetermined electrical transmit signal responsive to receiving the at least the first electrical alert actuation signal, respectively;
  a first transmitting element electrically coupled to the first transmitter and adapted to generate at least a first predetermined wireless signal responsive to receiving the at least the first predetermined electrical transmit signal, respectively;
  a first waterproof transmitter housing adapted to carry at least one of the at least the first alert switch, the first transmitter and the first transmitting element;

a first receiver assembly, adapted to be carried by a second diver, including:
  a first receiving element adapted to generate at least a first electrical receive signal responsive to receiving the at least the first predetermined wireless signal, respectively;
  a first receiver electrically coupled to the first receiving element and adapted to generate at least a first predetermined electrical alert attention signal responsive to receiving the at least the first electrical receive signal, respectively;
  at least a first alert device electrically coupled to the first receiver and adapted to generate at least a first predetermined alert responsive to receiving the at least the first predetermined electrical alert attention signal;
  a first waterproof receiver housing adapted to carry at least one of the first receiving element, the first receiver and the at least the first alert device; and
a first mask adapted to be worn on the second diver's head and adapted to carry at least the at least the first alert device of the first receiver assembly in a way that permits the at least the first predetermined alert to gain the attention of the second diver when the first mask is worn on the second diver's head, wherein the first waterproof receiver housing is integrally formed with the first mask.

48. The underwater alert system according to claim 47, wherein the at least the first alert switch further comprises:
  at least a first pushbutton switch adapted to generate the at least the first electrical alert actuation signal responsive to the at least the first pushbutton switch being manually actuated by the first diver.

49. The underwater alert system according to claim 47, wherein the at least the first alert device further comprises:
  a visual alert device adapted to generate a predetermined visual alert, as the at least the first predetermined alert, that the second diver can see when wearing the first mask.

50. The underwater alert system according to claim 49, wherein the visual alert device further comprises:
  a first light source adapted to generate a predetermined visible light signal, as the predetermined visual alert.

51. The underwater alert system according to claim 47, wherein the at least the first alert device further comprises:
  an audible alert device adapted to generate a predetermined audible alert, as the at least the first predetermined alert, that the second diver can hear when wearing the first mask.

52. The underwater alert system according to claim 51, wherein the audible alert device further comprises:
  an electro-acoustic transducer adapted to generate a predetermined audible acoustic signal, as the predetermined audible alert.

53. The underwater alert system according to claim 47, wherein the at least the first alert device further comprises:
  a tactile alert device adapted to generate a predetermined tactile alert, as the at least the first predetermined alert, that the second diver can feel when wearing the first mask.

54. The underwater alert system according to claim 53, wherein the tactile alert device further comprises:
  a vibrator adapted to generate a predetermined vibration signal, as the predetermined tactile alert.

55. The underwater alert system according to claim 47 further comprising:
  a second transmitter assembly adapted to be carried by the second diver and including:
    at least a second alert switch adapted to generate at least a second electrical alert actuation signal responsive to the at least the second alert switch being actuated;
    a second transmitter electrically coupled to the at least the second alert switch and adapted to generate at least a second predetermined electrical transmit signal responsive to receiving the at least the second electrical alert actuation signal, respectively;
    a second transmitting element electrically coupled to the second transmitter and adapted to generate at least a second predetermined wireless signal responsive to receiving the at least the second predetermined electrical transmit signal, respectively; and
    a second waterproof transmitter housing adapted to carry at least one of the at least the second alert switch, the second transmitter and the second transmitting element;
  a second receiver assembly, adapted to be carried by the first diver, including:
    a second receiving element adapted to generate at least a second electrical receive signal responsive to receiving the at least the second predetermined wireless signal, respectively;
    a second receiver electrically coupled to the second receiving element and adapted to generate at least a second predetermined electrical alert attention signal responsive to receiving the at least the second electrical receive signal, respectively;
    at least a second alert device electrically coupled to the second receiver and adapted to generate at least a second predetermined alert responsive to receiving the at least the second predetermined electrical alert attention signal; and
    a second waterproof receiver housing adapted to carry at least one of the second receiving element, the second receiver and the at least the second alert device; and a second mask adapted to be worn on the first diver's head and adapted to carry at least the at least the second alert device of the second receiver assembly in a way that permits the at least the second predetermined alert to gain the attention of the first diver when the second mask is worn on the first diver's head, wherein the second waterproof receiver housing is integrally formed with the second mask.

56. The underwater alert system according to claim 55, wherein the first waterproof transmitter housing and the second waterproof receiver housing are integrally formed with the second mask to provide a first transceiver housing, and wherein the second waterproof transmitter housing and the first waterproof receiver housing are integrally formed with the first mask to provide a second transceiver housing.

57. The underwater alert system according to claim 47, wherein the first transmitter assembly further comprises a first transmitter identity selection device adapted to provide the first transmitter with at least a first transmitter identity, and wherein the first receiver assembly further comprises a first receiver identity selection device adapted to provide the first receiver with the at least the first transmitter identity to permit the first receiver to communicate with the first transmitter.

58. The underwater alert system according to claim 47, wherein the first transmitter assembly further comprises:
  a first power supply adapted to provide a first supply of electrical power; and
  a first power switch adapted to electrically couple the first supply of electrical power to at least one of the at least the first alert switch, the first transmitter and the first transmitting element responsive to the first power switch being actuated; and wherein the first receiver assembly further comprises:
  a second power supply adapted to provide a second supply of electrical power; and
  a second power switch adapted to electrically couple the second supply of electrical power to at least one of the first receiving element, the first receiver and the at least the first alert device responsive to the second power switch being actuated.

59. The underwater alert system according to claim 58, wherein at least one of the first power switch and the second power switch further comprises:
  a water-activated switch adapted to be actuated responsive to the water-activated switch being located underwater.

60. The underwater alert system according to claim 47 further comprising:
  a dive computer adapted to generate dive computer data, electrically coupled to the first transmitter, and adapted to be carried by the first diver,
  wherein the at least the first alert switch further comprises:
    an electronic switch electrically coupled to the dive computer and adapted to generate the at least the first electrical alert actuation signal responsive to the dive computer data being an undesirable, predetermined value.

61. The underwater alert system according to claim 47 further comprising:
  a dive computer adapted to generate dive computer data, electrically coupled to the first transmitter, and adapted to be carried by the first diver, wherein the first transmitter is adapted to transmit dive computer data, associated with the dive computer, to the first receiver.

62. In an underwater alert system including a first transmitter assembly adapted to be carried by a first diver and a first receiver assembly adapted to be carried by a second diver having a first mask adapted to be worn on the second diver's head, the first transmitter assembly comprising:
  at least a first alert switch adapted to generate at least a first electrical alert actuation signal responsive to the at least the first alert switch being actuated;
  a first transmitter electrically coupled to the at least the first alert switch and adapted to generate at least a first predetermined electrical transmit signal responsive to receiving the at least the first electrical alert actuation signal, respectively;
  a first transmitting element electrically coupled to the first transmitter and adapted to generate at least a first predetermined wireless signal responsive to receiving the at least the first predetermined electrical transmit signal, respectively; and
  a first waterproof transmitter housing adapted to carry at least one of the at least the first alert switch, the first transmitter and the first transmitting element;
  wherein the first receiver assembly includes:
    a first receiving element adapted to generate at least a first electrical receive signal responsive to receiving the at least the first predetermined wireless signal, respectively;
    a first receiver electrically coupled to the first receiving element and adapted to generate at least a first predetermined electrical alert attention signal responsive to receiving the at least the first electrical receive signal, respectively;
    at least a first alert device electrically coupled to the first receiver and adapted to generate at least a first predetermined alert responsive to receiving the at least the first predetermined electrical alert attention signal; and
    a first waterproof receiver housing adapted to carry at least one of the first receiving element, the first receiver and the at least the first alert device;
    wherein the first mask is adapted to carry at least the at least the first alert device of the first receiver assembly in a way that permits the at least the first predetermined alert to gain the attention of the second diver when the first mask is worn on the second diver's head.

63. The first transmitter assembly according to claim 62, wherein the at least the first alert switch further comprises:
  at least a first pushbutton switch adapted to generate the at least the first electrical alert actuation signal responsive to the at least the first pushbutton switch being manually actuated by the first diver.

64. The first transmitter assembly according to claim 62:
  wherein the first diver has a second mask adapted to be worn on the first diver's head, and
  wherein the first waterproof transmitter housing is adapted to be carried by the second mask.

65. The first transmitter assembly according to claim 64:
  wherein the first waterproof transmitter housing is integrally formed with the second mask.

66. The first transmitter assembly according to claim 62 further comprising:
  a first transmitter identity selection device adapted to provide the first transmitter with at least a first transmitter identity, wherein the first receiver assembly further comprises a first receiver identity selection device adapted to provide the first receiver with the at least the first transmitter identity to permit the first receiver to communicate with the first transmitter.

67. The first transmitter assembly according to claim 62 further comprising:
   a first power supply adapted to provide a first supply of electrical power; and
   a first power switch adapted to electrically couple the first supply of electrical power to at least one of the at least the first alert switch, the first transmitter and the first transmitting element responsive to the first power switch being actuated.

68. The first transmitter assembly according to claim 67, wherein at least one of the first power switch and the second power switch further comprises:
   a water-activated switch adapted to be actuated responsive to the water-activated switch being located underwater.

69. The first transmitter assembly according to claim 62 further comprising:
   a dive computer adapted to generate dive computer data, electrically coupled to the first transmitter, and adapted to be carried by the first diver,
   wherein the at least the first alert switch further comprises:
      an electronic switch electrically coupled to the dive computer and adapted to generate the at least the first electrical alert actuation signal responsive to the dive computer data being an undesirable, predetermined value.

70. The first transmitter assembly according to claim 62 further comprising:
   a dive computer adapted to generate dive computer data, electrically coupled to the first transmitter, and adapted to be carried by the first diver,
   wherein the first transmitter is adapted to transmit dive computer data, associated with the dive computer, to the first receiver.

71. The first transmitter assembly according to claim 62 further comprising:
   a light source carried by the first transmitter housing and adapted to illuminate at least a portion of the pushbutton.

72. The first transmitter assembly according to claim 62 further comprising:
   a transmitter alert device adapted to generate at least a second predetermined alert responsive to a function of the first transmitter assembly.

73. The first transmitter assembly according to claim 72, wherein the function of the first transmitter assembly further comprises at least one of:
   a low voltage warning, a verification of operation, a confirmation of transmitter identity selection, a confirmation of activation of the first alert switch, a confirmation of activation of the power on/off switch, and a condition of the charging circuit.

74. The first transmitter assembly according to claim 72, wherein the transmitter alert device further comprises at least one of:
   a visual alert device adapted to generate a predetermined visual alert, as the at least the second predetermined alert, that the first diver can see when wearing the first transmitter assembly;
   an audible alert device adapted to generate a predetermined audible alert, as the at least the second predetermined alert, that the first diver can hear when wearing the first transmitter assembly; and
   a tactile alert device adapted to generate a predetermined tactile alert, as the at least the second predetermined alert, that the first diver can feel when wearing the first transmitter assembly.

75. The first transmitter assembly according to claim 62, wherein the at least the first alert switch is automatically actuated responsive to information related to at least one of the first diver's body, equipment and environment.

76. In an underwater alert system including a first transmitter assembly adapted to be carried by a first diver and a first receiver assembly adapted to be carried by a second diver having a first mask adapted to be worn on the second diver's head, the first receiver assembly comprising:
   a first receiving element adapted to generate at least a first electrical receive signal responsive to receiving at least a first predetermined wireless signal, respectively, generated by the first transmitter assembly;
   a first receiver electrically coupled to the first receiving element and adapted to generate at least a first predetermined electrical alert attention signal responsive to receiving the at least the first electrical receive signal, respectively;
   at least a first alert device electrically coupled to the first receiver and adapted to generate at least a first predetermined alert responsive to receiving the at least the first predetermined electrical alert attention signal; and
   a first waterproof receiver housing adapted to carry at least one of the first receiving element, the first receiver and the at least the first alert device,
   wherein the first mask is adapted to carry at least the at least the first alert device of the first receiver assembly in a way that permits the at least the first predetermined alert to gain the attention of the second diver when the first mask is worn on the second diver's head.

77. The first receiver assembly according to claim 76, wherein the at least the first alert device further comprises:
   a visual alert device adapted to generate a predetermined visual alert, as the at least the first predetermined alert, that the second diver can see when wearing the first mask.

78. The first receiver assembly according to claim 77, wherein the visual alert device further comprises:
   a first light source adapted to generate a predetermined visible light signal, as the predetermined visual alert.

79. The first receiver assembly according to claim 76, wherein the at least the first alert device further comprises:
   an audible alert device adapted to generate a predetermined audible alert, as the at least the first predetermined alert, that the second diver can hear when wearing the first mask.

80. The first receiver assembly according to claim 79, wherein the audible alert device further comprises:
   an electro-acoustic transducer adapted to generate a predetermined audible acoustic signal, as the predetermined audible alert.

81. The first receiver assembly according to claim 76, wherein the at least the first alert device further comprises:
   a tactile alert device adapted to generate a predetermined tactile alert, as the at least the first predetermined alert, that the second diver can feel when wearing the first mask.

82. The first receiver assembly according to claim 81, wherein the tactile alert device further comprises:
a vibrator adapted to generate a predetermined vibration signal, as the predetermined tactile alert.

83. The first receiver assembly according to claim 76, further comprising:
a first attachment mechanism adapted to permit the first waterproof receiver housing to be mechanically coupled to the first mask.

84. The first receiver assembly according to claim 83, wherein the first attachment mechanism further comprises:
a first bracket adapted to be carried by the first mask and having a first mounting interface adapted to mechanically engage and disengage a first mounting interface on the first waterproof receiver housing to permit the first waterproof receiver housing to be attached to and removed from, respectively, the first bracket.

85. The first receiver assembly according to claim 84, wherein the first bracket further comprises:
a second mounting interface having an adhesive disposed thereon to permit the second mounting interface of the first bracket to be mechanically coupled to the first mask.

86. The first receiver assembly according to claim 84, wherein the first bracket is integrally formed with the first mask.

87. The first receiver assembly according to claim 83, wherein the at least the first alert device generates the first predetermined alert when the first waterproof receiver housing is mechanically coupled to the first mask, and wherein the at least the first alert device generates a second predetermined alert when the first waterproof receiver housing is mechanically decoupled from the first mask.

88. The first receiver assembly according to claim 76, wherein the first waterproof receiver housing is integrally formed with the first mask.

89. The first receiver assembly according to claim 76, wherein the first receiver assembly further comprises a first receiver identity selection device adapted to provide the first receiver with the at least the first transmitter identity, associated with the first transmitter, to permit the first receiver to communicate with the first transmitter.

90. The first receiver assembly according to claim 76, further comprising:
a second power supply adapted to provide a second supply of electrical power; and
a second power switch adapted to electrically couple the second supply of electrical power to at least one of the first receiving element, the first receiver and the at least the first alert device responsive to the second power switch being actuated.

91. The first receiver assembly according to claim 90, wherein the second power switch further comprises:
a water-activated switch adapted to be actuated responsive to the water-activated switch being located underwater.

92. The first receiver assembly according to claim 76, wherein the first predetermined electrical alert attention signal is representative of dive computer data, having an undesirable, predetermined value, associated with a dive computer, electrically coupled to the first transmitter assembly and adapted to be carried by the first diver.

93. The first receiver assembly according to claim 76, wherein the first receiver is adapted to receive dive computer data associated with a dive computer, electrically coupled to the first transmitter assembly and adapted to be carried by the first diver.

94. The first receiver assembly according to claim 76, wherein the at least the first alert device generates the first predetermined alert when the first waterproof receiver housing is above water, and wherein the at least the first alert device generates a second predetermined alert when the first waterproof receiver housing is underwater.

95. In an underwater alert system including a first transmitter assembly adapted to be carried by a first diver, a first receiver assembly adapted to be carried by a second diver and a mask adapted to be worn on the second diver's head, the mask comprising:
a first receiving element adapted to generate at least a first electrical receive signal responsive to receiving at least a first predetermined wireless signal, respectively, generated by the first transmitter assembly;
a first receiver electrically coupled to the first receiving element and adapted to generate at least a first predetermined electrical alert attention signal responsive to receiving the at least the first electrical receive signal, respectively;
at least a first alert device electrically coupled to the first receiver and adapted to generate at least a first predetermined alert responsive to receiving the at least the first predetermined electrical alert attention signal; and
a first waterproof receiver housing adapted to carry at least one of the first receiving element, the first receiver and the at least the first alert device,
wherein at least the at least the first alert device of the first receiver assembly is carried on the mask in a way that permits the at least the first predetermined alert to gain the attention of the second diver when the mask is worn on the second diver's head.

96. An underwater alert system comprising:
means for providing a first transmitter assembly, adapted to be carried by a first diver, including:
means for generating at least a first electrical alert actuation signal;
means for generating at least a first predetermined electrical transmit signal responsive to receiving the at least the first electrical alert actuation signal, respectively;
means for generating at least a first predetermined wireless signal responsive to receiving the at least the first predetermined electrical transmit signal, respectively; and
means for carrying at least one of the means for generating the at least a first electrical alert actuation signal, the means for generating the at least the first predetermined electrical transmit signal, and the means for generating the at least the first predetermined wireless signal; and
means for providing a receiver assembly, adapted to be carried by a second diver having an mask adapted to be worn on the second diver's head, including:
means for generating at least a first electrical receive signal responsive to receiving the at least the first predetermined wireless signal, respectively;
means for generating at least a first predetermined electrical alert attention signal responsive to receiving the at least the first electrical receive signal, respectively;
means for generating at least a first predetermined alert responsive to receiving the at least the first predetermined electrical alert attention signal; and
means for carrying at least one of the means for generating the at least the first electrical receive signal, the means for generating the at least the first predetermined electrical alert attention signal, and the means for generating the at least the first predetermined alert, wherein the first mask is adapted to carry at least the at least the means for generating the at least the first predetermined alert in a way that permits the at least the first predetermined alert to gain the attention of the second diver when the first mask is worn on the second diver's head.

97. An underwater alert system comprising:
a first transmitter assembly, adapted to be carried by a first diver while the first diver is underwater, for transmitting a first predetermined wireless signal; and
a first receiver assembly, adapted to be carried by a second diver while the second diver is underwater, including:
a first alert device, adapted to be carried by a first mask to be worn on the second diver's head, for generating a first predetermined alert that gains the attention of the second diver when the first mask is worn on the second diver's head responsive to receiving the first predetermined wireless signal.

98. The underwater alert system according to claim 97, wherein the at least the first transmitter assembly further comprises:
a pushbutton switch adapted to generate the an electrical alert actuation signal responsive to the pushbutton switch being manually actuated by the first diver.

99. The underwater alert system according to claim 97, wherein the first alert device further comprises:
a visual alert device adapted to generate a predetermined visual alert, as the first predetermined alert, which the second diver can see when wearing the first mask.

100. The underwater alert system according to claim 97, wherein the first alert device further comprises:
an audible alert device adapted to generate a predetermined audible alert, as the first predetermined alert, which the second diver can hear when wearing the first mask.

101. The underwater alert system according to claim 97, wherein the first alert device further comprises:
a tactile alert device adapted to generate a predetermined tactile alert, as the first predetermined alert, which the second diver can feel when wearing the first mask.

102. The underwater alert system according to claim 97, further comprising:
a second transmitter assembly, adapted to be carried by the second diver while the second diver is underwater, for transmitting a second predetermined wireless signal; and
a second receiver assembly, adapted to be carried by the first diver while the first diver is underwater, including:
a second alert device, adapted to be carried by a second mask to be worn on the first diver's head, for generating a second predetermined alert that gains the attention of the first diver when the second mask is worn on the first diver's head responsive to receiving the second predetermined wireless signal.

103. The underwater alert system according to claim 97, further comprising:
a first attachment mechanism adapted to permit the first receiver assembly to be mechanically coupled to the first mask.

104. The underwater alert system according to claim 103, wherein the first alert device generates the first predetermined alert when the first receiver assembly is mechanically coupled to the first mask, and wherein the first alert device generates a second predetermined alert when the first receiver assembly is mechanically decoupled from the first mask.

105. The underwater alert system according to claim 97, wherein the first receiver assembly is integrally formed with the first mask.

106. The underwater alert system according to claim 97, wherein the first transmitter assembly further comprises a first transmitter identity selection device adapted to provide the first transmitter assembly with at least a first transmitter identity, and
wherein the first receiver assembly further comprises a first receiver identity selection device adapted to provide the first receiver assembly with the at least the first transmitter identity to permit the first receiver assembly to communicate with the first transmitter assembly.

107. The underwater alert system according to claim 97; wherein the first transmitter assembly further comprises:
a first power supply adapted to provide a first supply of electrical power; and
a first power switch adapted to electrically couple the first supply of electrical power to at least one of the at least the first alert switch, the first transmitter and the first transmitting element responsive to the first power switch being actuated; and
wherein the first receiver assembly further comprises:
a second power supply adapted to provide a second supply of electrical power; and
a second power switch adapted to electrically couple the second supply of electrical power to at least one of the first receiving element, the first receiver and the at least the first alert device responsive to the second power switch being actuated.

108. The underwater alert system according to claim 97 further comprising:
a dive computer adapted to generate dive computer data, electrically coupled to the first transmitter, and adapted to be carried by the first diver,
wherein the at least the first alert switch further comprises:
an electronic switch electrically coupled to the dive computer and adapted to generate the at least the first electrical alert actuation signal responsive to the dive computer data being an undesirable, predetermined value.

109. The underwater alert system according to claim 97 further comprising:
a dive computer adapted to generate dive computer data, electrically coupled to the first transmitter, and adapted to be carried by the first diver,
wherein the first transmitter is adapted to transmit dive computer data, associated with the dive computer, to the first receiver.

110. The underwater alert system according to claim 97, wherein the first transmitter assembly further comprises:
a transmitter alert device adapted to generate at least a second predetermined alert responsive to a function of the first transmitter assembly.

111. The underwater alert system according to claim 97, wherein the first predetermined wireless signal is automatically transmitted responsive to information related to at least one of the first diver's body, equipment and environment.

112. The underwater alert system according to claim 97, wherein the first alert device generates the first predetermined alert when the first receiver assembly is above water, and wherein the first alert device generates a second predetermined alert when the first receiver assembly is underwater.

113. The underwater alert system according to any one of the preceding one hundred twelve claims numbered 1 to 112, wherein the first transmitter assembly further comprises:
a second attachment mechanism adapted to permit the first transmitter assembly to be mechanically coupled to the first diver's body or to equipment worn on the first diver's body at a location disposed below the first diver's head relative to the first diver being in an upright, standing position.

114. The underwater alert system according to claim 113, wherein the second attachment mechanism further comprises at least one of:
a wristband, a strap, a cord, a band, a belt, a clip, and a clamp.

115. An underwater alert system comprising:
a first transmitter assembly, adapted to be carried by a first diver, including:
at least a first alert switch adapted to generate at least a first electrical alert actuation signal responsive to the at least the first alert switch being actuated, wherein the at least the first alert switch further comprises:
at least a first pushbutton switch adapted to generate the at least the first electrical alert actuation signal responsive to the at least the first pushbutton switch being manually actuated by the first diver;
a first transmitter electrically coupled to the at least the first alert switch and adapted to generate at least a first predetermined electrical transmit signal responsive to receiving the at least the first electrical alert actuation signal, respectively;
a first transmitting element electrically coupled to the first transmitter and adapted to generate at least a first predetermined wireless signal responsive to receiving the at least the first predetermined electrical transmit signal, respectively;
a first waterproof transmitter housing adapted to carry at least one of the at least the first alert switch, the first transmitter and the first transmitting element; and
a second attachment mechanism adapted to permit the first waterproof transmitter housing to be mechanically coupled to the first diver's body to the first diver being in an upright, standing position, wherein the second attachment mechanism or to equipment worn on the first diver's body at a location disposed below the first diver's head relative further comprises at least one of:
a wristband, a strap, a cord, a band, a belt, a clip, and a clamp; and
a first receiver assembly, adapted to be carried by a second diver having a first mask adapted to be worn on the second diver's head, including:
a first receiving element adapted to generate at least a first electrical receive signal responsive to receiving the at least the first predetermined wireless signal, respectively;
a first receiver electrically coupled to the first receiving element and adapted to generate at least a first predetermined electrical alert attention signal responsive to receiving the at least the first electrical receive signal, respectively;
at least a first alert device electrically coupled to the first receiver and adapted to generate at least a first predetermined alert responsive to receiving the at least the first predetermined electrical alert attention signal; and
a first waterproof receiver housing adapted to carry at least one of the first receiving element, the first receiver and the at least the first alert device;
wherein the first mask is adapted to carry at least the at least the first alert device of the first receiver assembly in a way that permits the at least the first predetermined alert to gain the attention of the second diver when the first mask is worn on the second diver's head.

116. The underwater alert system according to claim 115, wherein the at least the first alert device further comprises:
a visual alert device adapted to generate a predetermined visual alert, as the at least the first predetermined alert, that the second diver can see when wearing the first mask.

117. The underwater alert system according to claim 116, wherein the visual alert device further comprises:
a first light source adapted to generate a predetermined visible light signal, as the predetermined visual alert.

118. The underwater alert system according to claim 115, wherein the at least the first alert device further comprises:
an audible alert device adapted to generate a predetermined audible alert, as the at least the first predetermined alert, that the second diver can hear when wearing the first mask.

119. The underwater alert system according to claim 118, wherein the audible alert device further comprises:
an electro-acoustic transducer adapted to generate a predetermined audible acoustic signal, as the predetermined audible alert.

120. The underwater alert system according to claim 115, wherein the at least the first alert device further comprises:
a tactile alert device adapted to generate a predetermined tactile alert, as the at least the first predetermined alert, that the second diver can feel when wearing the first mask.

121. The underwater alert system according to claim 120, wherein the tactile alert device further comprises:
a vibrator adapted to generate a predetermined vibration signal, as the predetermined tactile alert.

122. The underwater alert system according to claim 115, further comprising:
a second transmitter assembly adapted to be carried by the second diver and including:
at least a second alert switch adapted to generate at least a second electrical alert actuation signal responsive to the at least the second alert switch being actuated, wherein the at least the second alert switch further comprises:
at least a second pushbutton switch adapted to generate the at least the second electrical alert actuation signal responsive to the at least the second pushbutton switch being manually actuated by the second diver;
a second transmitter electrically coupled to the at least the second alert switch and adapted to generate at least a second predetermined electrical transmit signal responsive to receiving the at least the second electrical alert actuation signal, respectively;
a second transmitting element electrically coupled to the second transmitter and adapted to generate at least a second predetermined wireless signal responsive to receiving the at least the second predetermined electrical transmit signal, respectively;

a second waterproof transmitter housing adapted to carry at least one of the at least the second alert switch, the second transmitter and the second transmitting element; and a second attachment mechanism adapted to permit the second waterproof transmitter housing to be mechanically coupled to the second diver's body or to equipment worn on the second diver's body at a location disposed below the second diver's head relative to the second diver being in an upright, standing position, wherein the second attachment mechanism further comprises at least one of:

a wristband, a strap, a cord, a band, a belt, a clip, and a clamp; and a second receiver assembly, adapted to be carried by the first diver having a second mask adapted to be worn on the first diver's head, including:

a second receiving element adapted to generate at least a second electrical receive signal responsive to receiving the at least the second predetermined wireless signal, respectively;

a second receiver electrically coupled to the second receiving element and adapted to generate at least a second predetermined electrical alert attention signal responsive to receiving the at least the second electrical receive signal, respectively;

at least a second alert device electrically coupled to the second receiver and adapted to generate at least a second predetermined alert responsive to receiving the at least the second predetermined electrical alert attention signal; and a second waterproof receiver housing adapted to carry at least one of the second receiving element, the second receiver and the at least the second alert device; and wherein the second mask is adapted to carry at least the at least the second alert device of the second receiver assembly in a way that permits the at least the second predetermined alert to gain the attention of the first diver when the second mask is worn on the first diver's head.

123. The underwater alert system according to claim 115, further comprising:

a first attachment mechanism adapted to permit the first waterproof receiver housing to be mechanically coupled to the first mask.

124. The underwater alert system according to claim 115, wherein the first attachment mechanism further comprises:

a first bracket adapted to be carried by the first mask and having a first mounting interface adapted to mechanically engage and disengage a first mounting interface on the first waterproof receiver housing to permit the first waterproof receiver housing to be attached to and removed from, respectively, the first bracket.

125. The underwater alert system according to claim 124, wherein the first bracket further comprises:

a second mounting interface having an adhesive disposed thereon to permit the second mounting interface of the first bracket to be mechanically coupled to the first mask.

126. The underwater alert system according to claim 124, wherein the first bracket is integrally formed with the first mask.

127. The underwater alert system according to claim 123, wherein the at least the first alert device generates the first predetermined alert when the first waterproof receiver housing is mechanically coupled to the first mask, and wherein the at least the first alert device generates a second predetermined alert when the first waterproof receiver housing is mechanically decoupled from the first mask.

128. The underwater alert system according to claim 115, wherein the first waterproof receiver housing is integrally formed with the first mask.

129. The underwater alert system according to claim 115, wherein the first transmitter assembly further comprises a first transmitter identity selection device adapted to provide the first transmitter with at least a first transmitter identity, and wherein the first receiver assembly further comprises a first receiver identity selection device adapted to provide the first receiver with the at least the first transmitter identity to permit the first receiver to communicate with the first transmitter.

130. The underwater alert system according to claim 115, wherein the first transmitter assembly further comprises:

a first power supply adapted to provide a first supply of electrical power; and a first power switch adapted to electrically couple the first supply of electrical power to at least one of the at least the first alert switch, the first transmitter and the first transmitting element responsive to the first power switch being actuated; and wherein the first receiver assembly further comprises:

a second power supply adapted to provide a second supply of electrical power; and a second power switch adapted to electrically couple the second supply of electrical power to at least one of the first receiving element, the first receiver and the at least the first alert device responsive to the second power switch being actuated.

131. The underwater alert system according to claim 130, wherein at least one of the first power switch and the second power switch further comprises:

a water-activated switch adapted to be actuated responsive to the water-activated switch being located underwater.

132. The underwater alert system according to claim 115 further comprising:

a dive computer adapted to generate dive computer data, electrically coupled to the first transmitter, and adapted to be carried by the first diver, wherein the at least the first alert switch further comprises:

an electronic switch electrically coupled to the dive computer and adapted to generate the at least the first electrical alert actuation signal responsive to the dive computer data being an undesirable, predetermined value.

133. The underwater alert system according to claim 115 further comprising:

a dive computer adapted to generate dive computer data, electrically coupled to the first transmitter, and adapted to be carried by the first diver, wherein the first transmitter is adapted to transmit dive computer data, associated with the dive computer, to the first receiver.

134. The underwater alert system according to claim 115, wherein the first transmitter assembly further comprises:

a light source carried by the first transmitter housing and adapted to illuminate at least a portion of the pushbutton.

135. The underwater alert system according to claim 115, wherein the first transmitter assembly further comprises:

a transmitter alert device adapted to generate at least a second predetermined alert responsive to a function of the first transmitter assembly.

136. The underwater alert system according to claim 135, wherein the function of the first transmitter assembly further comprises at least one of:
a low voltage warning, a verification of operation, a confirmation of transmitter identity selection, a confirmation of activation of the first alert switch, a confirmation of activation of the power on/off switch, and a condition of the charging circuit.

137. The underwater alert system according to claim 135, wherein the transmitter alert device further comprises at least one of:
a visual alert device adapted to generate a predetermined visual alert, as the at least the second predetermined alert, that the first diver can see when wearing the first transmitter assembly;
an audible alert device adapted to generate a predetermined audible alert, as the at least the second predetermined alert, that the first diver can hear when wearing the first transmitter assembly; and
a tactile alert device adapted to generate a predetermined tactile alert, as the at least the second predetermined alert, that the first diver can feel when wearing the first transmitter assembly.

138. The underwater alert system according to claim 115, wherein the at least the first alert switch is automatically actuated responsive to information related to at least one of the first diver's body, equipment and environment.

139. The underwater alert system according to claim 115, wherein the at least the first alert device generates the first predetermined alert when the first waterproof receiver housing is above water, and wherein the at least the first alert device generates a second predetermined alert when the first waterproof receiver housing is underwater.

140. An underwater alert system comprising:
at least a one transmitter assembly, adapted to be carried by a first diver while the first diver is underwater, for transmitting at least one wireless signal responsive to receiving first dive computer data related to at least one of the first diver's body, equipment, and environment;
a first receiver assembly, adapted to be carried by a second diver while the second diver is underwater, for communicating to the second diver first information related to the first dive computer data responsive to receiving the at least one wireless signal over a first wireless communication link, having a first range, between the at least one transmitter assembly and the first receiver assembly; and
a second receiver assembly, adapted to be carried by the first diver while the first diver is underwater, for communicating to the first diver second information related to the first dive computer data responsive to receiving the at least one wireless signal over a second wireless communication link, having a second range, between the at least one transmitter assembly and the second receiver assembly.

141. The underwater alert system according to claim 140, wherein at least one of the first receiver assembly and the second receiver assembly further comprises:
at least a first alert device electrically adapted to generate at least a first alert responsive to receiving the at least one wireless signal.

142. The underwater alert system according to claim 140, wherein the at least the first alert device further comprises:
a visual alert device adapted to generate a visual alert, as the at least the first alert, that a diver can see.

143. The underwater alert system according to claim 142, wherein the visual alert device further comprises:
a first light source adapted to generate a visible light signal, as the visual alert.

144. The underwater alert system according to claim 142, wherein the visual alert device further comprises:
a first display adapted to display the first dive computer data, as the visual alert.

145. The underwater alert system according to claim 141, wherein the at least the first alert device further comprises:
an audible alert device adapted to generate an audible alert, as the at least the first alert, that a diver can hear.

146. The underwater alert system according to claim 145, wherein the audible alert device further comprises:
an electro-acoustic transducer adapted to generate an audible acoustic signal, as the audible alert.

147. The underwater alert system according to claim 141, wherein the at least the first alert device further comprises:
a tactile alert device adapted to generate a tactile alert, as the at least the first alert, that a diver can feel.

148. The underwater alert system according to claim 147, wherein the tactile alert device further comprises:
a vibrator adapted to generate a vibration signal, as the tactile alert.

149. The underwater alert system according to claim 141 further comprising:
a second transmitter assembly, adapted to be carried by the second diver while the second diver is underwater, for transmitting a third wireless signal responsive to receiving second dive computer data related to at least one of the second diver's body, equipment, and environment; and
a third receiver assembly, adapted to be carried by the first diver while the first diver is underwater, for communicating to the first diver third information related to the second dive computer data responsive to receiving the third wireless signal over a third wireless communication link, having a third range, between the second transmitter assembly and the third receiver assembly.

150. The underwater alert system according to claim 149, wherein the second receiver assembly is formed separate from the third receiver assembly to provide two receiver assemblies.

151. The underwater alert system according to claim 149, wherein the second receiver assembly is integrally formed with the third receiver assembly to provide one receiver assembly.

152. The underwater alert system according to claim 151, wherein the one receiver assembly further comprises:
a second display adapted to display at least one of the second information and the third information.

153. The underwater alert system according to claim 152, wherein the second display is adapted to display at least one of:
all of each of the second information and the third information at the same time;
a portion of each of the second information and the third information at the same time;
at least a portion of the second information at a first time and at least a portion of the third information at a second time, different from the first time.

154. The underwater alert system according to claim 149, wherein at least one of:

the first transmitter assembly and the third receiver assembly are integrally formed together to provide a first transceiver assembly adapted to be carried by the first diver, and the second transmitter assembly and the first receiver assembly are integrally formed together to provide a second transceiver assembly adapted to be carried by the second diver.

155. The underwater alert system according to claim 154, wherein at least one of:

the first transceiver assembly is integrally formed with a second mask adapted to be worn by the first diver, and the second transceiver assembly is integrally formed with a first mask adapted to be worn by the second diver.

156. The underwater alert system according to claim 140 further comprising at least one of:

a first attachment mechanism adapted to permit the first receiver assembly to be mechanically coupled to a first mask adapted to be worn by the second diver; and a second attachment mechanism adapted to permit the second receiver assembly to be mechanically coupled to a second mask adapted to be worn by the first diver.

157. The underwater alert system according to claim 156 wherein at least one of:

the first attachment mechanism further comprises:

a first bracket adapted to be carried by the first mask and having a first mounting interface adapted to mechanically engage and disengage a first mounting interface on the first receiver assembly to permit the first receiver assembly to be attached to and removed from, respectively, the first bracket; and the second attachment mechanism further comprises:

a second bracket adapted to be carried by the second mask and having a first mounting interface adapted to mechanically engage and disengage a first mounting interface on the second receiver assembly to permit the second receiver assembly to be attached to and removed from, respectively, the second bracket.

158. The underwater alert system according to claim 157, wherein at least one of:

the first bracket further comprises:

a second mounting interface having an adhesive disposed thereon to permit the second mounting interface of the first bracket to be mechanically coupled to the first mask; and the second bracket further comprises:

a second mounting interface having an adhesive disposed thereon to permit the second mounting interface of the second bracket to be mechanically coupled to the second mask.

159. The underwater alert system according to claim 157, wherein at least one of:

the first bracket is integrally formed with the first mask, and the second bracket is integrally formed with the second mask.

160. The underwater alert system according to claim 140, wherein at least one of:

the first receiver assembly is integrally formed with a first mask adapted to be worn by the second diver, and the second receiver assembly is integrally formed with a second mask adapted to be worn by the first diver.

161. The underwater alert system according to claim 140, wherein at least one of:

the first transmitter assembly further comprises:

a first transmitter identity selection device adapted to provide the first transmitter assembly with at least a first transmitter identity;

the first receiver assembly further comprises:

a first receiver identity selection device adapted to provide the first receiver assembly with the at least the first transmitter identity to permit the first receiver assembly to communicate with the first transmitter assembly; and the second receiver assembly further comprises:

a second receiver identity selection device adapted to provide the second receiver assembly with the at least the first transmitter identity to permit the second receiver assembly to communicate with the first transmitter assembly.

162. The underwater alert system according to claim 140, wherein at least one of:

the first transmitter assembly further comprises:

a first power supply adapted to provide a first supply of electrical power; and a first power switch adapted to electrically couple the first supply of electrical power to at the first transmitter assembly;

the first receiver assembly further comprises:

a second power supply adapted to provide a second supply of electrical power; and a second power switch adapted to electrically couple the second supply of electrical power to the first receiver assembly; and the second receiver assembly further comprises:

a third power supply adapted to provide a third supply of electrical power; and a third power switch adapted to electrically couple the third supply of electrical power to the second receiver assembly.

163. The underwater alert system according to claim 162, wherein at least one of the first power switch, the second power switch, and the third power switch further comprises:

a water-activated switch adapted to be actuated responsive to the water-activated switch being located underwater.

164. The underwater alert system according to claim 140, wherein the first transmitter assembly generates the at least one wireless signal responsive to receiving the first dive computer data having an undesirable, predetermined value.

165. The underwater alert system according to claim 140, wherein the first transmitter assembly generates the at least one wireless signal, representing the first dive computer data responsive to receiving the first dive computer data.

166. The underwater alert system according to claim 140 wherein the first dive computer data further comprises at least one of:

dive table time limits, dive time duration, dive depth, air supply level, direction, distance, water temperature, assent rate, heart rate, and breathing rate.

167. An underwater alert system comprising:

at least one transmitter assembly, adapted to be carried by a first diver, including:

at least one dive computer adapted to generate first dive computer data responsive to receiving information related to at least one of the first diver's body, equipment, and environment;

at least one transmitter electrically coupled to the at least one dive computer and adapted to generate at least one electrical transmit signal, representing the first dive computer data, responsive to receiving the first dive computer data;

at least one transmitting element electrically coupled to the at least one transmitter and adapted to generate at least one wireless signal responsive to receiving the at least one electrical transmit signal; and at least one waterproof transmitter housing adapted to carry at least one of the at least one dive computer, the at least one transmitter, and the at least one transmitting element; and a first receiver assembly, adapted to be carried by a second diver, including:

a first receiving element adapted to generate at least a first electrical receive signal responsive to receiving the at least one wireless signal over a first wireless communication link, having a first range, between the at least one transmitter assembly and the first receiver assembly;

a first receiver electrically coupled to the first receiving element and adapted to generate at least a first electrical alert attention signal responsive to receiving the at least the first electrical receive signal;

at least a first alert device electrically coupled to the first receiver and adapted to generate at least a first alert responsive to receiving the at least the first electrical alert attention signal, wherein the at least the first alert device further comprises:

a first visual alert device adapted to generate a first visual alert, as the at least the first alert, that the second diver can see, wherein the first visual alert device further comprises:

a first display adapted to display the first dive computer data, as the visual alert; and a first waterproof receiver housing adapted to carry at least one of the first receiving element, the first receiver, and the at least the first alert device; and a second receiver assembly, adapted to be carried by the first diver, including:

a second receiving element adapted to generate at least a second electrical receive signal responsive to receiving the at least one wireless signal over a second wireless communication link, having a second range, between the at least one transmitter assembly and the second receiver assembly;

a second receiver electrically coupled to the second receiving element and adapted to generate at least a second electrical alert attention signal responsive to receiving the at least the second electrical receive signal;

at least a second alert device electrically coupled to the second receiver and adapted to generate at least a second alert responsive to receiving the at least the second electrical alert attention signal, wherein the at least the second alert device further comprises:

a second visual alert device adapted to generate a second visual alert, as the at least the second alert, that the first diver can see, wherein the second visual alert device further comprises:

a second display adapted to display the dive computer data, as the second visual alert; and a second waterproof receiver housing adapted to carry at least one of the second receiving element, the second receiver, and the at least the second alert device.

168. The underwater alert system according to claim 167, further comprising:

a second transmitter assembly, adapted to be carried by the second diver, including:

a second dive computer adapted to generate second dive computer data responsive to receiving information related to at least one of the second diver's body, equipment, and environment;

a second transmitter electrically coupled to the second dive computer and adapted to generate at least a second electrical transmit signal responsive to receiving the second dive computer data;

a second transmitting element electrically coupled to the second transmitter and adapted to generate at least a second wireless signal responsive to receiving the at least the second electrical transmit signal; and a second waterproof transmitter housing adapted to carry at least one of the second dive computer, the second transmitter, and the second transmitting element; and a third receiver assembly, adapted to be carried by the first diver, and adapted to be integrally formed with the second receiver assembly to provide a single receiver assembly or separately formed the second receiver assembly to provide two receiver assemblies, including:

a third receiving element adapted to generate at least a third electrical receive signal responsive to receiving the at least the second wireless signal;

a third receiver electrically coupled to the third receiving element and adapted to generate at least a third electrical alert attention signal responsive to receiving the at least the third electrical receive signal;

at least a third alert device electrically coupled to the third receiver and adapted to generate at least a third alert responsive to receiving the at least the third electrical alert attention signal, wherein the at least the third alert device further comprises:

a second display adapted to display the second dive computer data; and a third waterproof receiver housing adapted to carry at least one of the third receiving element, the third receiver, and the at least the third alert device.

169. The underwater alert system according to claim 168 wherein at least one of the first display and the second display displays at least one of:

all of each of the first dive computer data and the second computer data at the same time;

a portion of each of the first dive computer data and the second dive computer data at the same time;

at least a portion of the first dive computer data at a first time and at least a portion of the second dive computer data at a second time, different from the first time.

170. The underwater alert system according to claim 168:

wherein the first waterproof transmitter housing and the second waterproof receiver housing are integrally formed together to provide a first transceiver housing adapted to be carried by the first diver, and wherein the second waterproof transmitter housing and the first waterproof receiver housing are integrally formed together to provide a second transceiver housing adapted to be carried by the second diver.

171. The underwater alert system according to claim 167:

wherein the at least one transmitter assembly further comprises a transmitter identity selection device adapted to provide the at least one transmitter assembly with at least a transmitter identity, and wherein the first receiver assembly further comprises a receiver identity selection device adapted to provide the first receiver assembly with the at least the transmitter identity to permit the first receiver assembly to communicate with the at least one transmitter assembly.

172. The underwater alert system according to claim 167, wherein the first dive computer data further comprises at least one of:
dive table time limits, dive time duration, dive depth, air supply level, direction, distance, water temperature, assent rate, heart rate, and breathing rate.

173. An underwater alert system comprising:
at least a first transmitter assembly, adapted to be carried by a first diver while the first diver is underwater, for transmitting at least one wireless signal responsive to receiving first dive computer data, related to at least one of the first diver's body, equipment, and environment, having a predetermined value; and
a first receiver assembly, adapted to be carried by a second diver while the second diver is underwater, for communicating to the second diver first information related to the first dive computer data responsive to receiving the at least one wireless signal over a first wireless communication link, having a first range, between the at least one transmitter assembly and the first receiver assembly.

174. The underwater alert system according to claim 173, further comprising:
a second receiver assembly, adapted to be carried by the first diver while the first diver is underwater, for communicating to the first diver second information related to the first dive computer data responsive to receiving the at least one wireless signal over a second wireless communication link, having a second range, between the at least one transmitter assembly and the second receiver assembly.

175. The underwater alert system according to claim 173, wherein the at least one wireless signal is predetermined.

176. The underwater alert system according to claim 173, wherein the at least one wireless signal represents the first dive computer data.

177. The underwater alert system according to claim 173, wherein the first receiver assembly further comprises:
at least a first alert device electrically adapted to generate at least a first alert responsive to receiving the at least one wireless signal.

178. The underwater alert system according to claim 177, wherein the first alert is predetermined.

179. The underwater alert system according to claim 177, wherein the at least the first alert device further comprises:
a visual alert device adapted to generate a visual alert, as the at least the first alert, that the second diver can see.

180. The underwater alert system according to claim 179, wherein the visual alert device further comprises:
a first light source adapted to generate a visible light signal, as the visual alert.

181. The underwater alert system according to claim 177, wherein the at least the first alert device further comprises:
an audible alert device adapted to generate a audible alert, as the at least the first alert, that the second diver can hear.

182. The underwater alert system according to claim 181, wherein the audible alert device further comprises:
an electro-acoustic transducer adapted to generate a audible acoustic signal, as the audible alert.

183. The underwater alert system according to claim 177, wherein the at least the first alert device further comprises:
a tactile alert device adapted to generate a tactile alert, as the at least the first alert, that the second diver can feel.

184. The underwater alert system according to claim 183, wherein the tactile alert device further comprises:
a vibrator adapted to generate a vibration signal, as the tactile alert.

185. The underwater alert system according to claim 173 further comprising:
a second transmitter assembly, adapted to be carried by the second diver while the second diver is underwater, for transmitting a third wireless signal responsive to receiving second dive computer data, related to at least one of the second diver's body, equipment, and environment, having a predetermined value; and
a third receiver assembly, adapted to be carried by the first diver while the first diver is underwater, for communicating to the first diver third information related to the second dive computer data responsive to receiving the third wireless signal over a third wireless communication link, having a third range, between the second transmitter assembly and the third receiver assembly.

186. The underwater alert system according to claim 185, wherein the first transmitter assembly and the second receiver assembly are integrally formed together to provide a first transceiver assembly adapted to be carried by the first diver, and
wherein the second transmitter assembly and the first receiver assembly are integrally formed together to provide a second transceiver assembly adapted to be carried by the second diver.

187. The underwater alert system according to claim 186, wherein the first transceiver assembly is integrally formed with a second mask adapted to be worn by the first diver, and
wherein the second transceiver assembly is integrally formed with a first mask adapted to be worn by the second diver.

188. The underwater alert system according to claim 173, wherein the first transmitter assembly further comprises a first transmitter identity selection device adapted to provide the first transmitter assembly with at least a first transmitter identity, and
wherein the first receiver assembly further comprises a first receiver identity selection device adapted to provide the first receiver with the at least the first transmitter identity to permit the first receiver assembly to communicate with the first transmitter assembly.

189. The underwater alert system according to claim 173, wherein the first dive computer data further comprises at least one of:
dive table time limits, dive time duration, dive depth, air supply level, direction, distance, water temperature, assent rate, heart rate, and breathing rate.

190. The underwater alert system according to claim 173, wherein the at least the first transmitter assembly further comprises:
a first dive computer adapted to generate the first dive computer data responsive to receiving information related to at least one of the first diver's body, equipment, and environment;
a first transmitter electrically coupled to the first dive computer and adapted to generate at least one electrical transmit signal responsive to receiving the first dive computer data, respectively, having the predetermined value;
a first transmitting element electrically coupled to the first transmitter and adapted to generate the at least one wireless signal responsive to receiving the at least one electrical transmit signal, respectively; and
a first waterproof transmitter housing adapted to carry at least one of the first dive computer, the first transmitter, and the first transmitting element; and a first receiver assembly, adapted to be carried by a second diver, including:
  a first receiving element adapted to generate at least one electrical receive signal responsive to receiving the at least one wireless signal, respectively;
  a first receiver electrically coupled to the first receiving element and adapted to generate at least one electrical alert attention signal responsive to receiving the at least one electrical receive signal, respectively;
  at least a first alert device electrically coupled to the first receiver and adapted to generate at least one alert responsive to receiving the at least one electrical alert attention signal; and
  a first waterproof receiver housing adapted to carry at least one of the first receiving element, the first receiver, and the at least the first alert device.

191. An underwater alert system comprising:
at least a one transmitter assembly, adapted to be carried by a first diver while the first diver is underwater, for transmitting at least one wireless signal responsive to receiving first dive computer data related to at least one of the first diver's body, equipment, and environment;
wherein the at least a one transmitter assembly is adapted to transmit the at least one wireless signal to a first receiver assembly, adapted to be carried by a second diver while the second diver is underwater, for communicating to the second diver first information related to the first dive computer data responsive to receiving the at least one wireless signal over a first wireless communication link, having a first range, between the at least one transmitter assembly and the first receiver assembly; and
wherein the at least a one transmitter assembly is adapted to transmit the at least one wireless signal to a second receiver assembly, adapted to be carried by the first diver while the first diver is underwater, for communicating to the first diver second information related to the first dive computer data responsive to receiving the at least one wireless signal over a second wireless communication link, having a second range, between the at least one transmitter assembly and the second receiver assembly.

192. An underwater alert system including at least one transmitter assembly, adapted to be carried by a first diver while the first diver is underwater, for transmitting at least one wireless signal responsive to receiving first dive computer data related to at least one of the first diver's body, equipment, and environment, the underwater alert system comprising:
  a first receiver assembly, adapted to be carried by a second diver while the second diver is underwater, for communicating to the second diver first information related to the first dive computer data responsive to receiving at least one wireless signal over a first wireless communication link, having a first range, between the at least one transmitter assembly and the first receiver assembly; and
  a second receiver assembly, adapted to be carried by the first diver while the first diver is underwater, for communicating to the first diver second information related to the first dive computer data responsive to receiving the at least one wireless signal over a second wireless communication link, having a second range, between the at least one transmitter assembly and the second receiver assembly.

193. An underwater alert system comprising:
  at least one means for transmitting, adapted to be carried by a first diver while the first diver is underwater, at least one wireless signal responsive to receiving first dive computer data related to at least one of the first diver's body, equipment, and environment;
  first means for receiving, adapted to be carried by a second diver while the second diver is underwater, the at least one wireless signal over a first wireless communication link, having a first range, between the at least one means for transmitting and the first means for receiving to communicate to the second diver first information related to the first dive computer data; and
  second means for receiving, adapted to be carried by the first diver while the first diver is underwater, the at least one wireless signal over a second wireless communication link, having a second range, between the at least one means for transmitting and the second means for receiving to communicate to the first diver second information related to the first dive computer data.

194. The underwater alert system according to any one of claims 140 to 193, wherein the first range is substantially longer than the second range.

195. The underwater alert system according to any one of claims 140 to 193, wherein the first range is substantially the same as the second range.

196. The underwater alert system according to any one of claims 140 to 193, wherein the at least one wireless signal further comprises:
  a first wireless signal adapted to be transmitted over the first wireless communication link; and
  a second wireless signal, substantially the same as the first wireless signal, adapted to be transmitted over the second wireless communication link.

197. The underwater alert system according to any one of claims 140 to 193, wherein the at least one wireless signal further comprises:
  a first wireless signal adapted to be transmitted over the first wireless communication link; and
  a second wireless signal, substantially the different from the first wireless signal, adapted to be transmitted over the second wireless communication link.

198. The underwater alert system according to any one of claims 140 to 192, wherein the at least one transmitter assembly further comprises:
  a first transmitter assembly for transmitting a first wireless signal representing the at least one wireless signal, and
  a second transmitter assembly for transmitting a second wireless signal representing the at least one wireless signal.

199. The underwater alert system according to any one of claim 140 to 192,
  wherein the at least one transmitter assembly further comprises:
    at least one dive computer adapted to generate the first dive computer data responsive to receiving information related to at least one of the diver's body, equipment, and environment;
    at least one transmitter electrically coupled to the at least one dive computer and adapted to generate at least one electrical transmit signal responsive to receiving the first dive computer data;
    at least one transmitting element electrically coupled to the at least one transmitter and adapted to generate the at least one wireless signal responsive to receiving the at least one electrical transmit signal; and at least one waterproof transmitter housing adapted to carry at least one of the at least one dive computer, the at least one transmitter, and the at least one transmitting element, wherein the first receiver assembly further comprises:
a first receiving element adapted to generate at least a first electrical receive signal responsive to receiving the at least one wireless signal;
a first receiver electrically coupled to the first receiving element and adapted to generate at least a first electrical alert attention signal responsive to receiving the at least the first electrical receive signal;
a first alert device electrically coupled to the first receiver and adapted to generate at least a first alert responsive to receiving the at least the first electrical alert attention signal; and
a first waterproof receiver housing adapted to carry at least one of the first receiving element, the first receiver, and the first alert device; and wherein the second receiver assembly further comprises:
a second receiving element adapted to generate at least a second electrical receive signal responsive to receiving the at least one wireless signal;
a second receiver electrically coupled to the second receiving element and adapted to generate at least a second electrical alert attention signal responsive to receiving the at least the second electrical receive signal;
a second alert device electrically coupled to the second receiver and adapted to generate at least a second alert responsive to receiving the at least the second electrical alert attention signal; and
a second waterproof receiver housing adapted to carry at least one of the second receiving element, the second receiver, and the second alert device.

200. An underwater alert system comprising:
a transmitter assembly, adapted to be carried by a first diver while the first diver is underwater, for transmitting a wireless signal responsive to receiving dive computer data related to at least one of the first diver's body, equipment, and environment; and
a receiver assembly, adapted to be carried by a mask worn by a second diver while the second diver is underwater, for communicating to the second diver information related to the dive computer data responsive to receiving the wireless signal.

201. The underwater alert system according to claim 200 further comprising:
an attachment mechanism adapted to permit the receiver assembly to be mechanically coupled to the mask.

202. The underwater alert system according to claim 201, wherein the attachment mechanism further comprises:
a bracket adapted to be carried by the mask and having a first mounting interface adapted to mechanically engage and disengage a first mounting interface on the receiver assembly to permit the receiver assembly to be attached to and removed from, respectively, the bracket.

203. The underwater alert system according to claim 202, wherein the bracket further comprises:
a second mounting interface having an adhesive disposed thereon to permit the second mounting interface of the bracket to be mechanically coupled to the mask.

204. The underwater alert system according to claim 202, wherein the bracket is integrally formed with the mask.

205. The underwater alert system according to claim 200, wherein the receiver assembly is integrally formed with the mask.

206. An underwater alert system comprising:
a transmitter assembly, adapted to be carried by a first diver while the first diver is underwater, for transmitting a wireless signal responsive to receiving dive computer data related to at least one of the first diver's body, equipment, and environment; and
a receiver assembly, adapted to be carried by a second diver while the second diver is underwater, for communicating to the second diver information related to the dive computer data responsive to receiving the wireless signal, wherein the receiver assembly includes:
a tactile alert device adapted to generate a tactile alert, representing the information, which the second diver can feel.

207. The underwater alert system according to claim 206, wherein the tactile alert device further comprises:
a vibrator adapted to generate a vibration signal representing the tactile alert.

208. The underwater alert system according to claim 206, wherein the transmitter assembly further comprises:
a dive computer adapted to generate the dive computer data responsive to receiving information related to at least one of the first diver's body, equipment, and environment;
a transmitter electrically coupled to the first dive computer and adapted to generate an electrical transmit signal responsive to receiving the dive computer data;
a transmitting element electrically coupled to the first transmitter and adapted to generate the wireless signal responsive to receiving the electrical transmit signal; and
a waterproof transmitter housing adapted to carry at least one of the dive computer, the transmitter, and the transmitting element; and wherein the receiver assembly further comprises:
a receiving element adapted to generate an electrical receive signal responsive to receiving the wireless signal;
a receiver electrically coupled to the receiving element and adapted to generate an electrical alert attention signal responsive to receiving the electrical receive signal; and
a waterproof receiver housing adapted to carry at least one of the receiving element, the receiver, and the tactile alert device.

209. An underwater alert system comprising:
a first transmitter assembly, adapted to be carried by a first diver while the first diver is underwater, for transmitting a first wireless signal responsive to receiving first dive computer data related to at least one of the first diver's body, equipment, and environment;
a first receiver assembly, adapted to be carried by a second diver while the second diver is underwater, for communicating to the second diver first information related to the first dive computer data responsive to receiving the first wireless signal;
a second transmitter assembly, adapted to be carried by the second diver while the second diver is underwater, for transmitting a second wireless signal responsive to receiving second dive computer data related to at least one of the second diver's body, equipment, and environment; and
a second receiver assembly, adapted to be carried by the first diver while the first diver is underwater, for communicating to the first diver second information related to the second dive computer data responsive to receiving the second wireless signal.

210. The underwater alert system according to claim 209, wherein at least one of:
the first transmitter assembly and the second receiver assembly are integrally formed together to provide a first transceiver assembly adapted to be carried by the first diver, and
the second transmitter assembly and the first receiver assembly are integrally formed together to provide a second transceiver assembly adapted to be carried by the second diver.

211. The underwater alert system according to claim 210, wherein at least one of:
the first transceiver assembly is integrally formed with a second mask adapted to be worn by the first diver, and
the second transceiver assembly is integrally formed with a first mask adapted to be worn by the second diver.

212. The underwater alert system according to claim 209 further comprising at least one of:
a first attachment mechanism adapted to permit the first receiver assembly to be mechanically coupled to a first mask adapted to be worn by the second diver; and
a second attachment mechanism adapted to permit the second receiver assembly to be mechanically coupled to a second mask adapted to be worn by the first diver.

213. The underwater alert system according to claim 212, wherein at least one of:
the first attachment mechanism is integrally formed with the first mask, and
the second attachment mechanism is integrally formed with the second mask.

214. The underwater alert system according to claim 209, wherein at least one of:
the first receiver assembly is integrally formed with a first mask adapted to be worn by the second diver, and
the second receiver assembly is integrally formed with a second mask adapted to be worn by the first diver.

215. An underwater alert system comprising:
a transmitter assembly, adapted to be carried by a first diver while the first diver is underwater, for transmitting a wireless signal responsive to receiving dive computer data related to at least one of the first diver's body, equipment, and environment, wherein the transmitter assembly further comprises:
a transmitter power supply adapted to provide electrical power for electrical elements of the transmitter assembly; and
a transmitter power switch adapted to electrically couple the transmitter power supply to electrical elements of the transmitter assembly responsive to the transmitter power switch being actuated; and
a receiver assembly, adapted to be carried by a second diver while the second diver is underwater, for communicating to the second diver information related to the dive computer data responsive to receiving the wireless signal, wherein the receiver assembly further comprises:
a receiver power supply adapted to provide electrical power for electrical elements of the receiver assembly; and
a receiver power switch adapted to electrically couple the receiver power supply to at least one of the electrical elements of the receiver assembly responsive to the receiver power switch being actuated,
wherein at least one of the transmitter power switch and the receiver power switch further comprises:
a water-activated switch adapted to be actuated responsive to the water-activated switch being located underwater.

216. An underwater alert system comprising:
a transmitter assembly, adapted to be carried by a first diver while the first diver is underwater, for transmitting a wireless signal responsive to receiving dive computer data related to at least one of the first diver's body, equipment, and environment, wherein the transmitter assembly further comprises:
a first identity selection device, including a first plurality of discrete hardware elements adapted to control software stored in memory in the transmitter assembly, adapted to program the transmitter assembly with at least at least one electronic identity responsive to predetermined selections of the first plurality of discrete hardware elements; and
a receiver assembly, adapted to be carried by one of the first diver and a second diver while one of the first diver and the second diver, respectively, is underwater, for communicating to one of the first diver and the second diver, respectively, information related to the dive computer data responsive to receiving the wireless signal, wherein the receiver assembly further comprises:
a second identity selection device, including a second plurality of discrete hardware receiver elements adapted to control software stored in memory in the receiver assembly, adapted to program the receiver assembly with the at least one electronic identity, responsive to predetermined selections of the second plurality of discrete hardware elements, to permit the receiver assembly to communicate with the transmitter assembly.

217. The underwater alert system according to claim 216, wherein the at least one electronic identity further comprises at least one of:
a frequency channel, an address, and a code.

218. The underwater alert system according to claim 216, wherein at least one of the first plurality of discrete hardware elements and the second plurality of discrete hardware elements further comprises:
three discrete hardware elements.

219. An underwater alert system comprising:
a transmitter assembly, adapted to be carried by a diver while the diver is underwater, further comprising:
a first dive computer adapted to generate first dive computer data responsive to receiving first information related to at least one of the diver's body, equipment, and environment;
a transmitter electrically coupled to the first dive computer and adapted to generate at least one electrical transmit signal responsive to receiving the first dive computer data;
a transmitting element electrically coupled to the transmitter and adapted to generate at least one wireless signal responsive to receiving the at least one electrical transmit signal; and
a waterproof transmitter housing adapted to carry at least one of the first dive computer, the transmitter, and the transmitting element; and
a receiver assembly, adapted to be carried by the diver while the diver is underwater, further comprising:
a second dive computer adapted to generate second dive computer data responsive to receiving second information related to at least one of the diver's body, equipment, and environment;

a receiving element adapted to generate at least one electrical receive signal responsive to receiving the at least one wireless signal over a first wireless communication link, having a first range, between the transmitter assembly and the receiver assembly;

a receiver electrically coupled to the receiving element and adapted to generate at least one electrical alert attention signal responsive to receiving the at least one electrical receive signal;

a display device electrically coupled to the second dive computer and the receiver and adapted to display at least one of the first dive computer data and the second dive computer data responsive to receiving the at least one electrical alert attention signal and the second dive computer data, respectively; and a waterproof receiver housing adapted to carry at least one of the second dive computer, the, receiving element, the receiver, and the display device.

220. An underwater alert system according to claim 219, wherein the display device displays the first dive computer data responsive to receiving the at least the first electrical alert attention signal when the receiver assembly is in the first range of the transmitter assembly, which permits the receiver assembly to receive the at least one wireless signal, representing the first dive computer data, and wherein the display device displays the second dive computer data responsive to receiving the second dive computer data when the receiver assembly is out of the first range of the transmitter assembly, which prevents the receiver assembly from receiving the at least one wireless signal, representing the first dive computer data.

221. The underwater alert system according to claim 220, wherein the transmitter assembly is carried on an air supply tank carried by the diver, and wherein the receiver assembly is carried by the diver's body or equipment worn by the diver.

222. The underwater alert system according to claim 221 further comprising:

an attachment mechanism, adapted to mechanically couple the receiver assembly to the diver's body or equipment worn by the diver, further comprising at least one of:
  a wristband, a strap, a cord, a band, a belt, a clip, and a clamp.

223. The underwater alert system according to claim 222, wherein the receiver assembly is carried by the diver's wrist using the wristband.

224. The underwater alert system according to claim 219, wherein at least one of the first dive computer data and the second dive computer data further comprises at least one of:
  dive table time limits, dive time duration, dive depth, air supply level, direction, distance, water temperature, assent rate, heart rate, and breathing rate.

225. An underwater alert system comprising:

a receiver assembly, adapted to be carried by a first diver while the first diver is underwater, further comprising:
  a second dive computer adapted to generate second dive computer data responsive to receiving second information related to at least one of the first diver's body, equipment, and environment;
  a receiving element adapted to generate at least one electrical receive signal responsive to receiving from a transmitter assembly at least one wireless signal, representing first dive computer data;
  a receiver electrically coupled to the receiving element and adapted to generate at least one electrical alert attention signal responsive to receiving the at least one electrical receive signal;
  a display device electrically coupled to the second dive computer and the receiver and adapted to display at least one of first dive computer data and the second dive computer data responsive to receiving the at least one electrical alert attention signal and the second dive computer data, respectively; and
  a waterproof receiver housing adapted to carry at least one of the second dive computer, the receiving element, the receiver, and the display device.

226. The underwater alert system according to claim 225, wherein the transmitter assembly is carried by the first diver, and wherein the transmitter assembly transmits the at least one wireless signal, representing first dive computer data related to at least one of the first diver's body, equipment, and environment, to the receiver assembly over a first wireless communication link, having a first range, between the transmitter assembly and the receiver assembly.

227. The underwater alert system according to claim 225, wherein the transmitter assembly is carried by a second diver, and wherein the transmitter assembly transmits the at least one wireless signal, representing first dive computer data related to at least one of the second diver's body, equipment, and environment, to the receiver assembly over a second wireless communication link, having a second range, between the transmitter assembly and the receiver assembly.

228. The underwater alert system according to claim 225, wherein the display device displays the first dive computer data responsive to receiving the at least the first electrical alert attention signal when the receiver assembly is in range of the transmitter assembly, which permits the receiver assembly to receive the at least one wireless signal, representing the first dive computer data, and wherein the display device displays the second dive computer data responsive to receiving the second dive computer data when the receiver assembly is out of range of the transmitter assembly, which prevents the receiver assembly from receiving the at least one wireless signal, representing the first dive computer data.

229. The underwater alert system according to claim 225, wherein the transmitter assembly is carried on an air supply tank carried a diver, and wherein the receiver assembly is carried by the diver's body or equipment worn by the first diver.

230. The underwater alert system according to claim 225, further comprising:

an attachment mechanism, adapted to mechanically couple the receiver assembly to the first diver's body or equipment worn by the first diver, further comprising at least one of:
  a wristband, a strap, a cord, a band, a belt, a clip, and a clamp.

* * * * *